(12) United States Patent
Fukagawa et al.

(10) Patent No.: US 6,188,913 B1
(45) Date of Patent: Feb. 13, 2001

(54) DIRECTIVITY CONTROL ANTENNA APPARATUS FOR SHAPING THE RADIATION PATTERN OF ANTENNA OF BASE STATION IN MOBILE COMMUNICATION SYSTEM IN ACCORDANCE WITH ESTIMATED DIRECTIONS OR POSITIONS OF MOBILE STATIONS WITH WHICH COMMUNICATION IS IN PROGRESS

(75) Inventors: Takashi Fukagawa, Ichikawa; Makoto Hasegawa, Tokyo; Akihiko Matsuoka, Yokohama; Naoki Adachi, Kawasaki, all of (JP)

(73) Assignee: Matsushita Electric Industrial Co., Ltd., Osaka (JP)

( * ) Notice: Under 35 U.S.C. 154(b), the term of this patent shall be extended for 0 days.

(21) Appl. No.: 08/917,596

(22) Filed: Aug. 26, 1997

(30) Foreign Application Priority Data

Aug. 28, 1996 (JP) .................................................. 8-226345

(51) Int. Cl.⁷ ............................... H04B 1/38; H01Q 3/00
(52) U.S. Cl. ......................... 455/562; 342/359; 342/372; 343/824
(58) Field of Search .................................. 455/562, 561, 455/507, 524, 525, 65, 67, 3, 447, 456, 448, 277.1; 342/359, 173, 174, 372, 373, 374, 375; 343/890, 891, 892

(56) References Cited

U.S. PATENT DOCUMENTS

| 5,260,968 |   | 11/1993 | Gardner et al. |         |
|-----------|---|---------|---------------|---------|
| 5,596,333 | * | 1/1997  | Bruckert      | 342/457 |
| 5,603,089 | * | 2/1997  | Searle et al. | 455/507 |
| 5,680,142 | * | 10/1997 | Smith et al.  | 342/372 |
| 5,708,441 | * | 1/1998  | Kanai         | 342/359 |
| 5,778,324 | * | 7/1998  | Smith         | 455/562 |
| 5,815,116 | * | 9/1998  | Dunbridge et al. | 342/373 |
| 5,818,386 | * | 10/1998 | Belisle       | 342/372 |
| 5,861,843 | * | 1/1999  | Sorace et al. | 342/372 |
| 5,873,048 | * | 2/1999  | Yun           | 455/562 |
| 5,893,033 | * | 4/1999  | Keskitalo et al. | 455/437 |
| 5,914,946 | * | 6/1999  | Avidor et al. | 370/336 |
| 5,924,040 | * | 7/1999  | Trompower     | 455/456 |
| 5,936,569 | * | 8/1999  | Stahle et al. | 342/174 |

FOREIGN PATENT DOCUMENTS

| 0595247  | 5/1994  | (EP) . |
| 2266998  | 11/1993 | (GB) . |
| 2305578  | 4/1997  | (GB) . |
| 5-41607  | 2/1993  | (JP) . |
| 9409568  | 4/1994  | (WO) . |
| 9700543  | 1/1997  | (WO) . |

* cited by examiner

Primary Examiner—Dwayne D. Bost
Assistant Examiner—Charles R Craver

(57) ABSTRACT

In a mobile communication system, each base station is provided with an array antenna, a section for estimating the respective directions of one or more mobile stations with which the base station is in communication, based on estimated incoming directions of radio waves received from these mobile stations, and sections for operating on respective signals of the antenna elements constituting the array antenna such as to shape the radiation pattern of the antenna to form peaks of directivity which are oriented in the estimated directions of these mobile stations, and can include a capability for shaping these peaks in accordance with estimated positions of these mobile stations, thereby minimizing interference between transmissions from that base station and communication being executed between other adjacent stations of the system, and minimizing the number of different transmission frequencies required in the overall system.

25 Claims, 56 Drawing Sheets

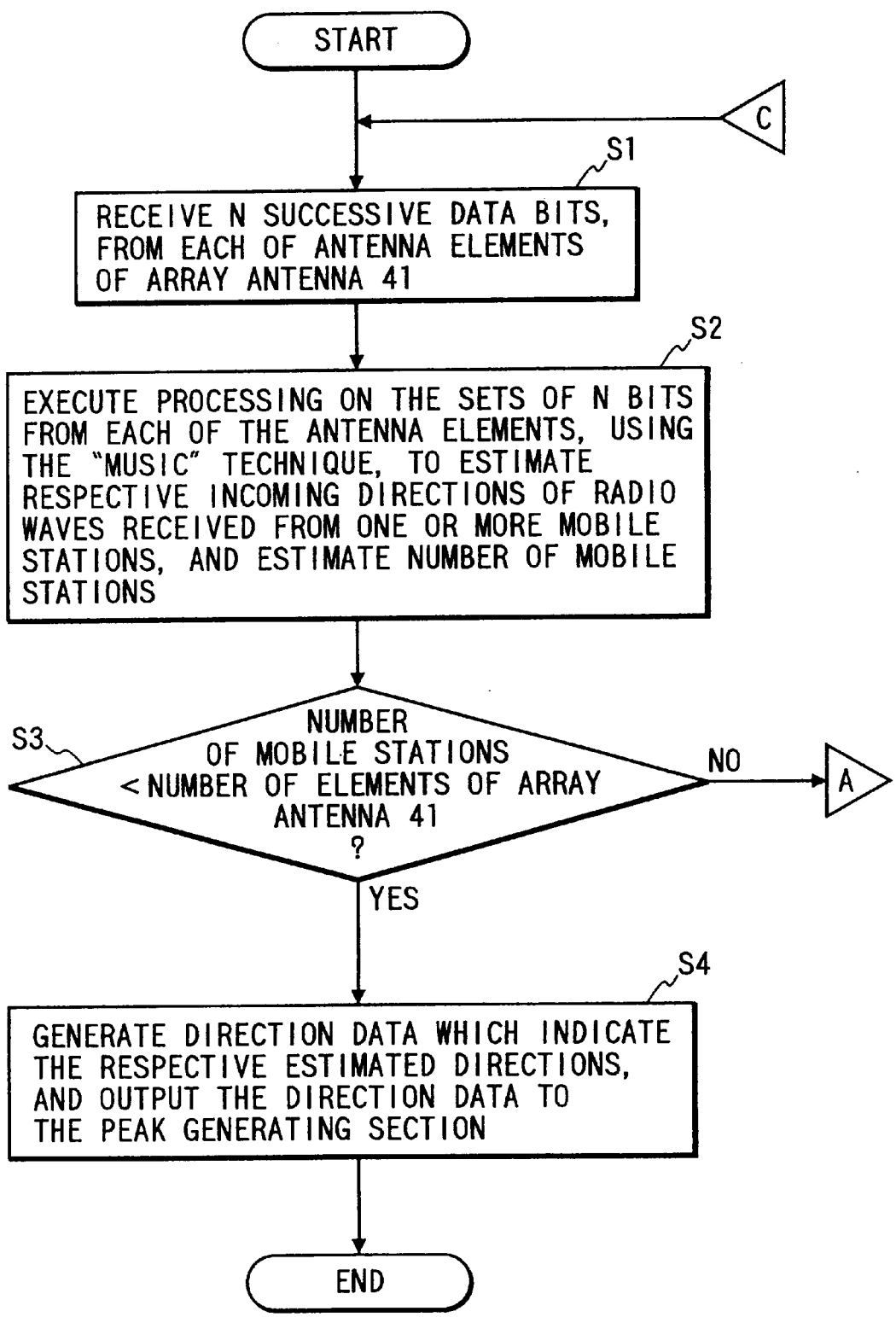

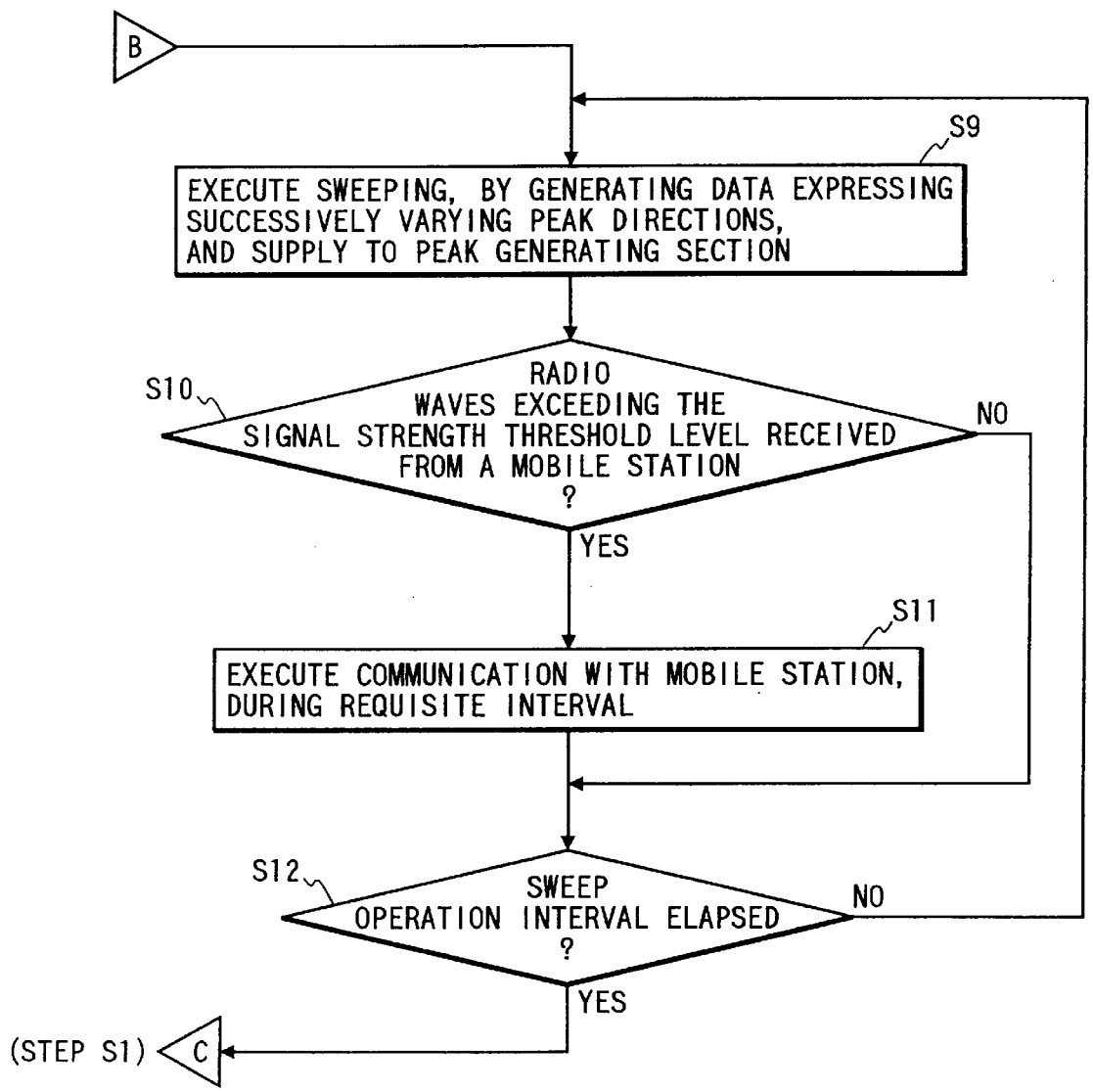

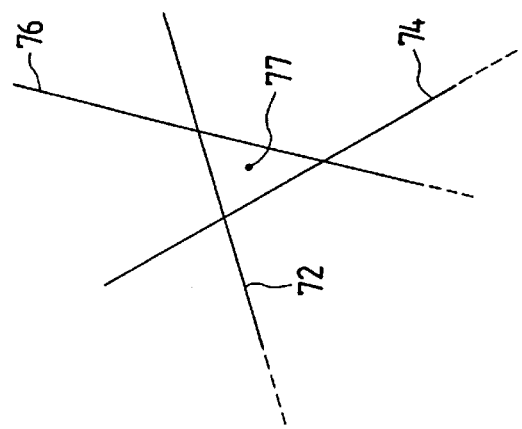
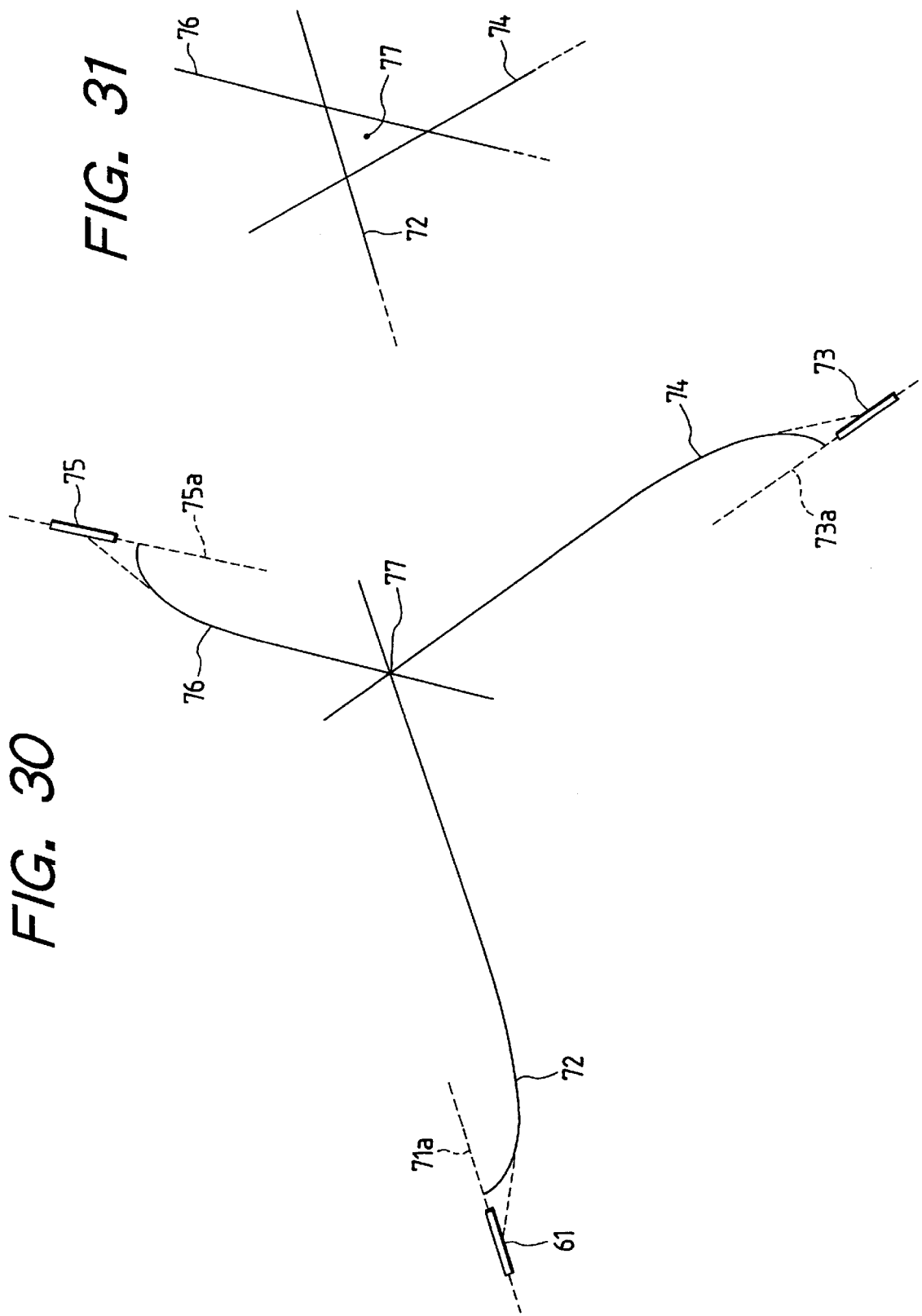

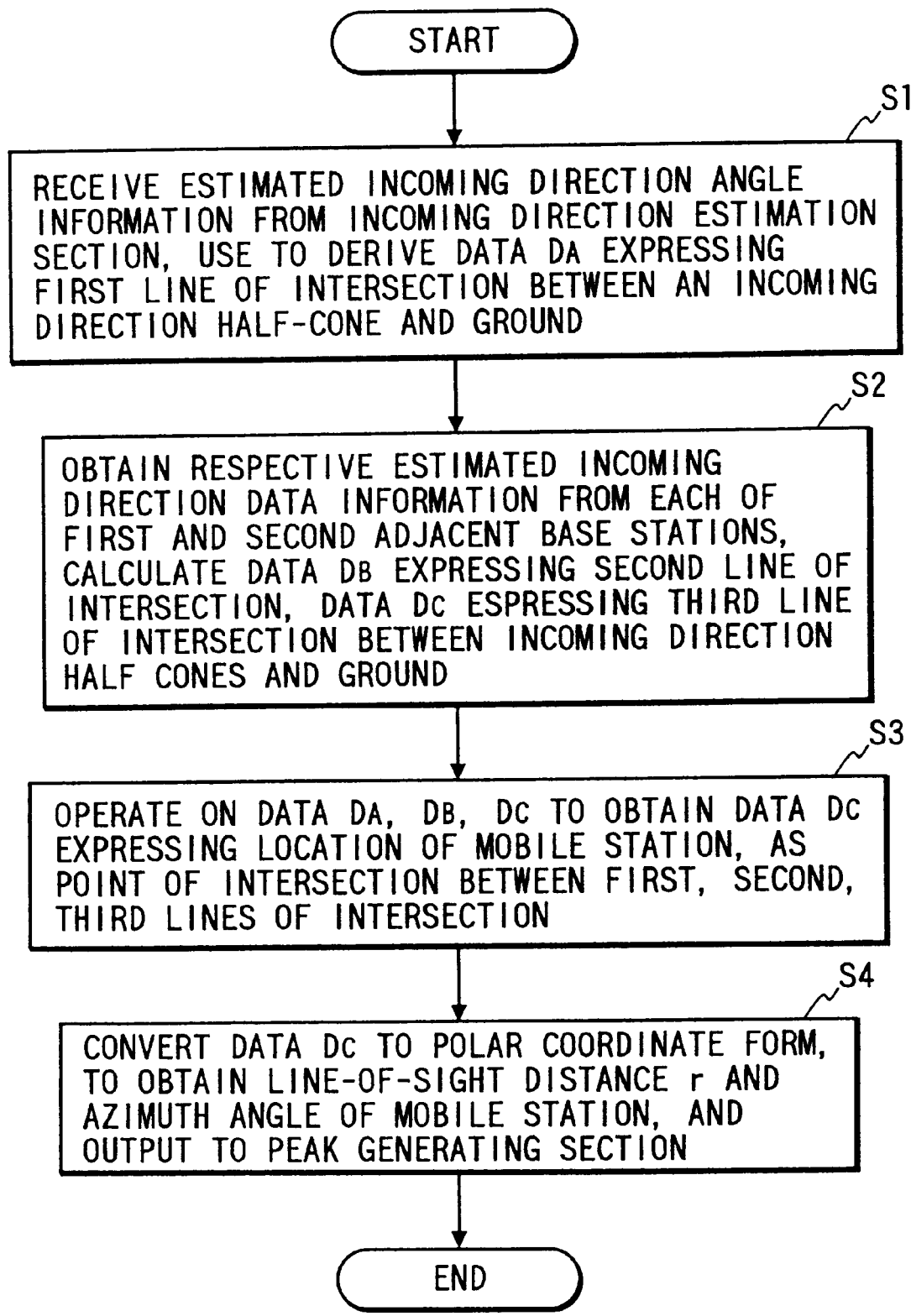

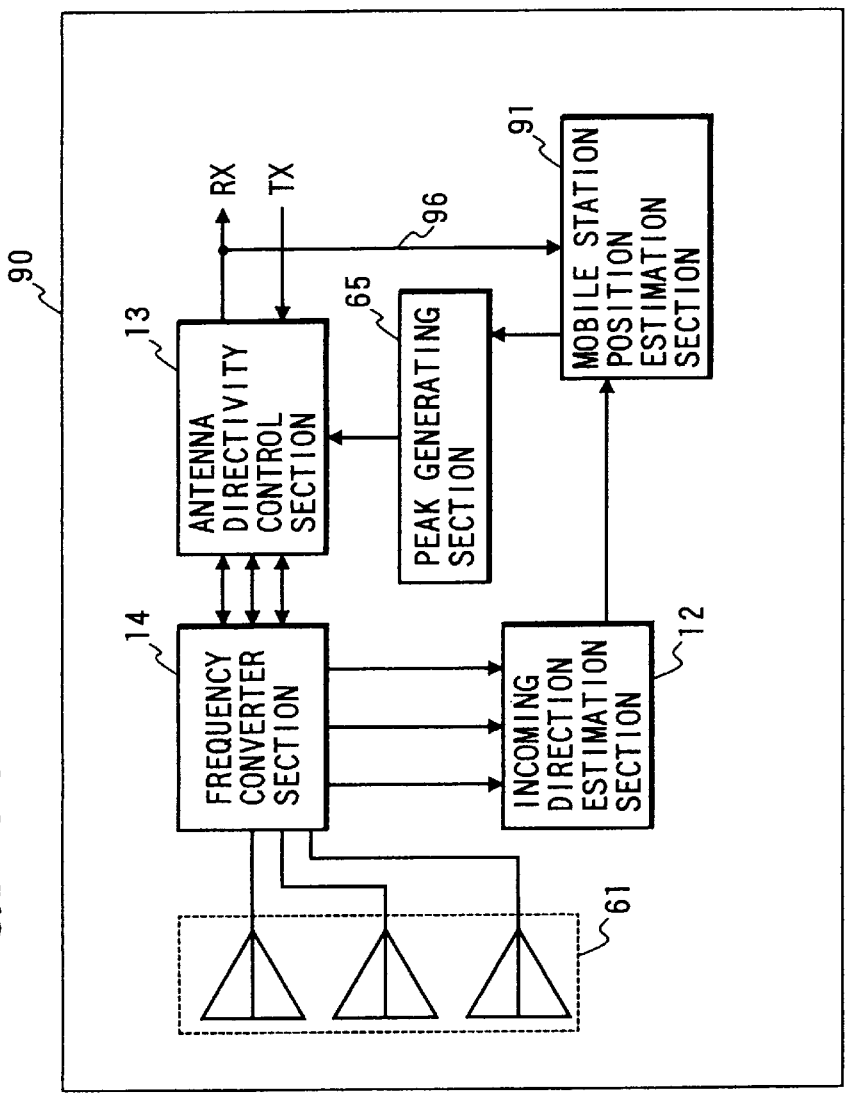
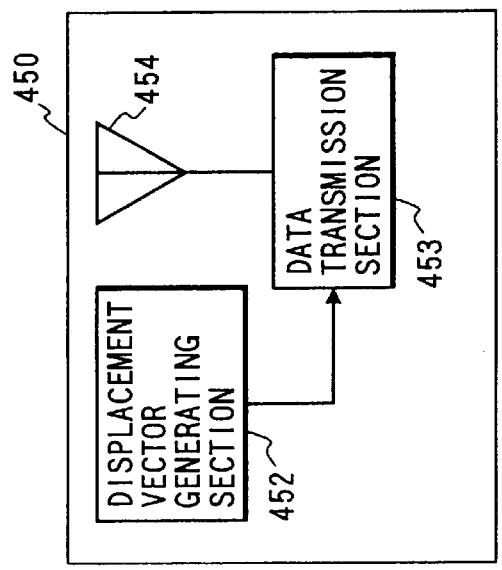
FIG. 36

DIRECTIVITY CONTROL ANTENNA APPARATUS FOR SHAPING THE RADIATION PATTERN OF ANTENNA OF BASE STATION IN MOBILE COMMUNICATION SYSTEM IN ACCORDANCE WITH ESTIMATED DIRECTIONS OR POSITIONS OF MOBILE STATIONS WITH WHICH COMMUNICATION IS IN PROGRESS

BACKGROUND OF THE INVENTION

1. Field of Application

The present invention relates to a directivity control antenna apparatus for use in base stations and mobile stations of a mobile communication system such as a radio paging system, cellular telephone system, etc.

2. Prior Art

In the prior art, methods such as time division multiplexing (TDMA), frequency division multiplexing (FDMA), code division multiplexing (CDMA), etc., have been used in the field of mobile communication, as methods for communicating with a plurality of mobile stations within areas which have been allocated to respective base stations of a mobile communication system. With time division multiplexing, a channel having a single frequency is divided into equidistant intervals along the time axis to provide communication slots, for enabling communication between a plurality of mobile stations and a base station, while with frequency division multiplexing this is accomplished by using a plurality of different frequency channels, Alternatively, with code division multiplexing, a plurality of mobile stations execute spectrum dispersion modulation by using data encoded such as to ensure there is no mutual correlation between the respective received signals which are obtained by a base station from the various mobile stations, to thereby enable communication between the mobile stations and the base station within the same frequency band.

With such a prior art system, in general communication is only possible between a base station and those mobile stations which are located within the service area of the base station, i.e. an area of nominally predetermined size. In practice, the level of signal strength received by a base station from a mobile station is usually employed as an indication of whether the mobile station is within the service area of that base station. Also, in general, the radio transmission frequencies which are used by a base station and by the mobile stations which are located within the service area of that base station are predetermined such that these will not result in interference with communication between any adjacent base station and those mobile stations which are within the service area of the adjacent base station.

When such prior art technology is used, the number of mobile stations which can be accommodated by the service area of a single base station is limited to the total number of communication slots that are allocated to the mobile stations, in the case of time division multiplexing, while that number of mobile stations is limited to the total number of frequency channels, in the case of frequency division multiplexing, and is limited by the degree of effectiveness of interference prevention (which is determined by the ratio of the data transfer rate to the spectrum dispersion chip rate) in the case of code division multiplexing. There are limitations on frequency resources, so that there are limitations on the number of channel frequencies and frequency bandwidth which can be allocated to mobile communication systems, and this places an upper limit on the number of mobile stations which can be accommodated by a mobile communication system. Moreover since the service area of a base station and the frequencies or number of TDMA slots which can be used by a base station for communication with mobile stations are fixed, cases can occur in which one of the base stations has communication channels available, while the slots or communication channels of an adjacent base station are completely filled. In the prior art, in such a case, i.e. in which there is communication channel capacity available in the overall system, it may not be possible to achieve communication in some instances due to lack of communication channel capacity in one or more base stations.

SUMMARY OF THE INVENTION

It is an objective of the present invention to overcome the above problems, by providing a mobile communication system having a high efficiency of utilizing communication channel resources.

To achieve the above objective, the present invention provides a mobile communication system whereby each base station includes incoming direction estimation means for estimating the incoming direction of radio waves which are received from a mobile station, to thereby estimate the direction of the mobile station with respect to the antenna of the base station. Based on the results of such estimation, the radiation pattern of the antenna of the base station is formed with a directivity peak which is oriented in the direction of that mobile station by antenna directivity control means. To achieve this, the antenna directivity control means appropriately controls the phase and amplitude of respective transmission/received signals that are supplied to/received from the array elements constituting the array antenna.

The emission of radio waves from a base station towards mobile stations other than those with which communication is being conducted can thereby be suppressed, thus enabling interference with other base stations and mobile stations to be eliminated, and enabling each base station to communicate with the respective mobile stations which are within its service area by using only a low level of transmission power, while enabling the number of communication channel frequencies which are required within the overall mobile communication system to be reduced. That is to say, with a prior art mobile communication system which uses FDM for example, it has been necessary to assign respectively different sets of frequency channels to base stations which are closely adjacent within the system, although identical sets of frequency channels can be assigned to base stations which are spaced sufficiently far apart to eliminate the danger of mutual interference.

In addition, the shaping of the antenna directivity is adaptively performed. That is to say, while a base station is in communication with a specific mobile station, the direction of the mobile station can be estimated during each of successive periods in which a signal is being received by the base station from that mobile station, so that the orientation of the antenna peak can be adaptively changed in accordance with successively estimated directions of that base station, while communication with a mobile station is in progress.

With the present invention, it is possible to utilize a simple linear array antenna (or set of array antennas, disposed to provide 360° of azimuth coverage) at each base station, to obtain the incoming direction of radio waves received from a mobile station, and assume that the (azimuth) direction of the mobile station with respect to the antenna is identical to that incoming direction of radio waves. The direction information thus obtained is then used to orient a corresponding directivity peak of the antenna. With such operation, the antenna directivity is shaped irrespective of the distance between the mobile station and the base station. Such operation provides substantially accurate direction information if the angle of elevation of the mobile station with respect to the base station is relatively small, for example if the mobile station is located at a sufficient distance from the base station.

Alternatively, in order to to achieve greater accuracy of shaping the radiation pattern of the base station, and to thereby obtain greater effectiveness in reducing the danger of interference with communication executed by adjacent base stations, it is possible with the present invention to estimate the actual position of a mobile station with respect to the base station, e.g. with the position expressed as an azimuth angle and line-of-sight distance, and to form a peak of the antenna directivity which is shaped in accordance with that position. In that case, more accurate estimation of mobile station directions can be achieved, and more accurate shaping can be performed of the antenna directivity, to ensure that the directivity peak is of appropriate magnitude for communication with a specific mobile station, while minimizing the danger of interference with communication executed by other base stations. Such position estimation also provides the advantage that the limits of each service area can be accurately determined, i.e. handover of a mobile station from one base station to an adjacent base station can be correctly performed, when the mobile station moves from the service area of one base station into that of another base station.

The present invention provides a directivity control antenna apparatus for a base station of a mobile communication system, the mobile communication system including at least one base station and a plurality of mobile stations, the apparatus comprising an array antenna having an array of antenna elements, for transmitting and receiving radio waves to and from a mobile station which is located within a predetermined service area of the base station, frequency conversion means for converting respective received signals from the antenna elements to corresponding intermediate frequency signals or baseband signals during a receiving mode of operation of the base station, and for converting a transmission signal at the intermediate frequency or baseband frequency to transmission signals, respectively corresponding to the antenna elements, at a transmission frequency, and supplying the transmission signals to the antenna elements during a transmission mode of operation of the base station, incoming direction estimation means for operating on the intermediate frequency signals or baseband signals from the frequency converter means during the receiving mode to estimate an incoming direction of radio waves from the mobile station, to thereby derive an estimated direction of the mobile station with respect to the base station, and for generating direction data indicative of the estimated direction, antenna directivity control means for controlling the phase and amplitude of the received signals corresponding to the antenna elements during the receiving mode and of the transmission signals respectively corresponding to the antenna elements during the transmission mode such as to determine a directivity of the array antenna, and peak generating means responsive to the direction data for generating control signals during the transmitting mode and the receiving mode to control the antenna directivity control means such as to form a peak of the directivity, oriented in the estimated direction of the mobile station.

The antenna directivity control means preferably comprises means responsive to the control signals from the peak generating means for controlling the phase and amplitude of respective received signals of the antenna elements and transmission signals of the antenna elements, when these signals are at the intermediate frequency or baseband frequency.

However it is also possible to configure the apparatus with means for periodically controlling the antenna directivity control means to establish substantially uniform directivity for the antenna, and to arrange that the incoming direction estimation means derives each estimated direction only while the condition of uniform directivity established. In that case, the antenna directivity control means can comprise means responsive to the control signals from the peak generating means for directly controlling the phase and amplitude of the respective signals which are supplied to or received from the antenna elements during transmission and receiving operation, i.e. when these signals are at the transmission frequency.

In addition to the fact that the respective incoming directions of radio waves can be used by incoming direction estimation means to estimate the respective directions, with respect to the base station, of mobile stations which are located within the service area of the base station, the total number of directions which are thereby obtained represent the number of mobile stations which are operating in that service area, so that this information can also be derived by the incoming direction estimation means. Such an apparatus can further be provided with:

means for judging whether the estimated number of mobile stations within the service area is equal to or greater than the total number of elements of the array antenna, and means functioning, when the number of mobile stations obtained as the estimate is judged to be equal to or greater than the total number of elements, for controlling the peak generating means to generate the control signals during the receiving mode of the base station such that the antenna directivity control means controls the phase and amplitude of the respective received signals of the antenna elements to produce a single peak of the directivity and to sweep the peak through an entire range of directivity variation of the array antenna.

In that way, respective directions of mobile stations within the service area are obtained by the incoming direction estimation means as corresponding directions at which the detection of received signals occur. The base station successively executes communication with each of the mobile stations for which respective directions are thereby detected, i.e. during successive intervals in which the peak has been swept to the respective directions of these mobile stations.

The invention is further applicable to a mobile communication system which comprises a plurality of base stations having respective mutually adjacent local areas, with the base stations being interconnected for exchanging data expressing estimated directions of mobile stations, wherein the array antenna of each base station is a linear array antenna having elements thereof spaced along an array axis, and wherein each base station further comprises:

mobile station position estimation means for receiving, from the incoming direction estimation means of the base station, first direction data indicative of the estimated incoming direction of radio waves received from a mobile station, for processing the direction data in conjunction with known data expressing a height of the array antenna above ground level to obtain first ground line data expressing a first range of possible positions of the mobile station, and for receiving, from respective incoming direction estimation means of at least two other base stations, second and third direction data indicative of respective incoming directions of radio waves from the mobile station with respect to the other base stations, for processing the second and third direction data to obtain second and third ground line data respectively indicative of a second and third ranges of possible positions of the mobile station, for deriving from the first, second and third ground line data an estimated position of the mobile station and generating position data indicative of the estimated position, and supplying the position data to the peak generating means;

and wherein the peak generating means is responsive to the position data for generating control signals supplied to the antenna directivity control means for controlling the antenna directivity control means such as to determine both the orientation of a peak of the directivity and the shape of the peak, in accordance with the estimated position.

The linear array antenna of such a base station is preferably configured to provide azimuth directivity within a range of 180°, with the range of possible positions of a mobile station being derived as an estimated line of intersection between the ground and one half of a conic surface having the array axis of the antenna as its central axis, with the conic surface having an apex angle which is twice the value of an angle formed between the direction of incoming radio waves from the mobile station and the array axis.

According to another aspect, the invention provides a directivity control antenna apparatus, wherein the array antenna of a base station is a linear array antenna having elements thereof spaced along an array axis, further comprising electric field strength measurement means for measuring a value of electric field strength of radio waves received from a mobile station, and position estimation means for converting the combined signal strength value to a value of estimated line-of-sight distance of the mobile station from the array antenna, for operating on the estimated distance value in conjunction with a known value of height of the array antenna above ground to obtain ground line data expressing a range of possible positions of the mobile station, for operating on the ground line data in conjunction with the estimated direction data for the mobile station supplied from the incoming direction estimation means, to obtain position data expressing an estimated position of the mobile station with respect to the array antenna, and supplying the position data to the peak generating means;

wherein the peak generating means is responsive to the position data for generating control signals supplied to the antenna directivity control means for controlling the antenna directivity control means such as to determine both the orientation of a peak of the directivity and a shape of the peak, in accordance with the estimated position.

Alternatively, each mobile station may comprise:

displacement vector generating means for deriving a displacement vector expressing a difference between a position of the mobile station at a first time point ($t_1$) and a position of the mobile station at a second time point ($t_2$) subsequent to the first time point, and means for transmitting data expressing the displacement vector to the base station by radio;

with the array antenna of the base station being a linear array antenna having elements thereof spaced along an array axis, and the base station further comprising mobile station position estimating means operating at the first time point ($t_1$) to operate on the estimated direction data for the mobile station, supplied from the incoming direction estimation means distance detection means, in conjunction with a known value of height of the array antenna above ground level, to derive first ground line data expressing a first range of possible positions of the mobile station, and operating at the second time point ($t_2$) to operate on the estimated direction data for the mobile station and the height value to derive second ground line data expressing a second range of possible positions of the mobile station, for operating on the displacement vector value in conjunction with the first ground line data and second ground line data to estimate the position of the mobile station at the second time point ($t_1$), for generating position data indicative of the estimated position and supplying the position data to the peak generating means; and with the peak generating means being responsive to the position data for generating control signals supplied to the antenna directivity control means for controlling the antenna directivity control means such as to determine both the orientation of a peak of the directivity and the shape of the peak, in accordance with the estimated position.

As a further aspect, such a directivity control antenna apparatus, wherein the array antenna of a base station is a linear array antenna having elements spaced along an array axis, may comprise antenna rotation means for rotating the array antenna with the array axis rotating within a horizontal plane, and position estimation means for receiving the direction information, and for operating on at least first direction data from the incoming direction estimation means expressing a first estimated direction, derived when the array axis is at a first angular position, and second direction data expressing a second estimated direction, derived when the array axis has rotated to a second angular position, to estimate the position of the mobile station and generate position data indicative of the estimated position;

with the peak generating means being responsive to the position data for generating control signals supplied to the antenna directivity control means for controlling the antenna directivity control means such as to determine both the orientation of a peak of the directivity and the shape of the peak, in accordance with the estimated position.

According to another aspect the invention provides a directivity control antenna apparatus for a base station, further comprising propagation delay time estimation means for estimating the propagation delay time of radio waves received from a mobile station, electric field strength measurement means for measuring the respective strengths of electric fields of radio waves received as direct waves and radio waves received as reflected waves, from the mobile station, and propagation path equalization means for receiving the incoming direction data from the incoming direction estimation means and an estimated value of propagation delay time from the propagation delay time estimation means, and functioning, when results of estimation of radio wave incoming direction by the incoming direction estimation means indicate that the mobile station is the only mobile station within the service area of the base station, to compensate a signal received from the mobile station for the effects of multi-path propagation signals, based on the estimated radio wave propagation delay time and a ratio of the electric field strengths of the direct waves and reflected waves.

With such an apparatus, the propagation path equalization means can comprise a plurality of delay elements connected in cascade for applying successive increments of delay to the received signal, and means for combining respective output signals of the delay elements in proportions which are determined in accordance with the estimated radio wave propagation delay time and the ratio of electric field strengths of direct waves and reflected waves.

According to another aspect, a directivity control antenna apparatus of a base station may also comprise null point generating means functioning, when respective incoming radio wave directions have been estimated for N mobile stations by the incoming direction estimation means, to establish null points of the radiation pattern of the array antenna, respectively oriented in the directions of (N-1) of the mobile stations, where N is an integer which is greater than one.

Such an apparatus can further reduce the possibility of interference between signals transmitted by a base station and communication which is being executed between other base stations and mobile stations of the system.

According to another aspect, the invention provides a directivity control antenna apparatus for a base station of a mobile communication system having at least one base station and a plurality of mobile stations, comprising a linear array antenna having elements thereof spaced along an array axis, at least one offset antenna element, having directivity in a direction which is offset from the array axis of the array antenna by a fixed angle, incoming direction estimation means for receiving respective received signals of the the offset antenna element and of a set of elements of the array antenna as received signals of a first antenna element set, and receiving respective received signals of remaining elements of the array antenna as received signals of a second antenna element set, for combining the received signals of the elements of the first antenna set and combining the received signals of respective elements of the second antenna set to thereby obtain two combined received signals, for obtaining the magnitude of the difference between these combined received signals, and for estimating the direction at which a mobile station is located, based on that difference between the magnitudes.

According to yet another aspect, the invention provides a directivity control antenna apparatus for a base station of a mobile communication system having a plurality of mobile stations wherein the base station is further provided with a first array antenna which is used for incoming direction estimation purposes a second array antenna which functions only as a data transmitting and receiving antenna.

With such a configuration in which first and second array antennas are utilized respectively for direction estimation and for data transmission/receiving, the base station can be provided with means whereby both of these antennas can be utilized for direction estimation, if necessary. More specifically, according to that aspect, the directivity control antenna apparatus of a base station further comprises:

means for judging whether an estimated number of mobile stations, derived by the incoming direction estimation means, may be greater than the number of elements of the first array antenna, means functioning, when it is judged that the number of mobile stations obtained as the estimate may be greater than the number of elements of the first array antenna, for executing control whereby respective received signals obtained from all the elements of the first array antenna and all the elements of the second array antenna receiving antenna are used in combination by the incoming direction estimation means for estimating the incoming direction of radio waves from mobile stations and for correcting the estimate of the number of the number of the mobile stations which are located within the local area.

With such an apparatus, if the number of mobile stations which is first obtained as the estimation results from the incoming direction estimation means (i.e. by using the first array antenna alone) may be greater than the number of elements of the first array antenna, then this signifies a possibility that the estimated results have not been correctly obtained. In that case, the elements of the second (i.e. data transmitting and receiving) array antenna can also be utilized, to thereby increase the total number of antenna elements which are used in estimating the number of mobile stations and their directions. The maximum number of mobile stations for which respective directions can be estimated concurrently by the incoming direction estimation means can thereby be increased.

With the present invention, the shaping of the antenna directivity of a base station antenna is not necessarily limited to forming a single peak, oriented in the direction of one specific mobile station. It is equally possible for a plurality of peaks to be formed concurrently, oriented in respective estimated directions of a number of mobile stations.

Furthermore, if estimated positions of respective mobile stations are derived by the apparatus, then it may be possible to form a single peak which is shaped such as to enable communication with each of a plurality of mobile stations that are located sufficiently adjacent to one another, while mininizing the danger of interference with communication between other base stations and mobile stations of the system.

BRIEF DESCRIPTION OF THE DRAWINGS

FIGS. 22A, 22B, 22C constitute a flow diagram of the operation of an incoming direction estimation section in the embodiment of FIG. 20, whereby direction estimation is executed based on successively scanning a directivity peak of an array antenna while detecting received signals from mobile stations, when an estimated number of mobile stations is judged to be equal to or greater than a total number of array antenna elements;

FIGS. 30, 31 are conceptual diagrams for illustrating the basic principles of the fourth embodiment;

FIG. 32 is a flow diagram of the operation of a mobile station position estimation section in the fourth embodiment of FIG. 29;

FIG. 36 is a general system block diagram of a sixth embodiment of the present invention, enabling estimation of respective positions of mobile stations by a base station;

DESCRIPTION OF PREFERRED EMBODIMENTS

Figure 1:
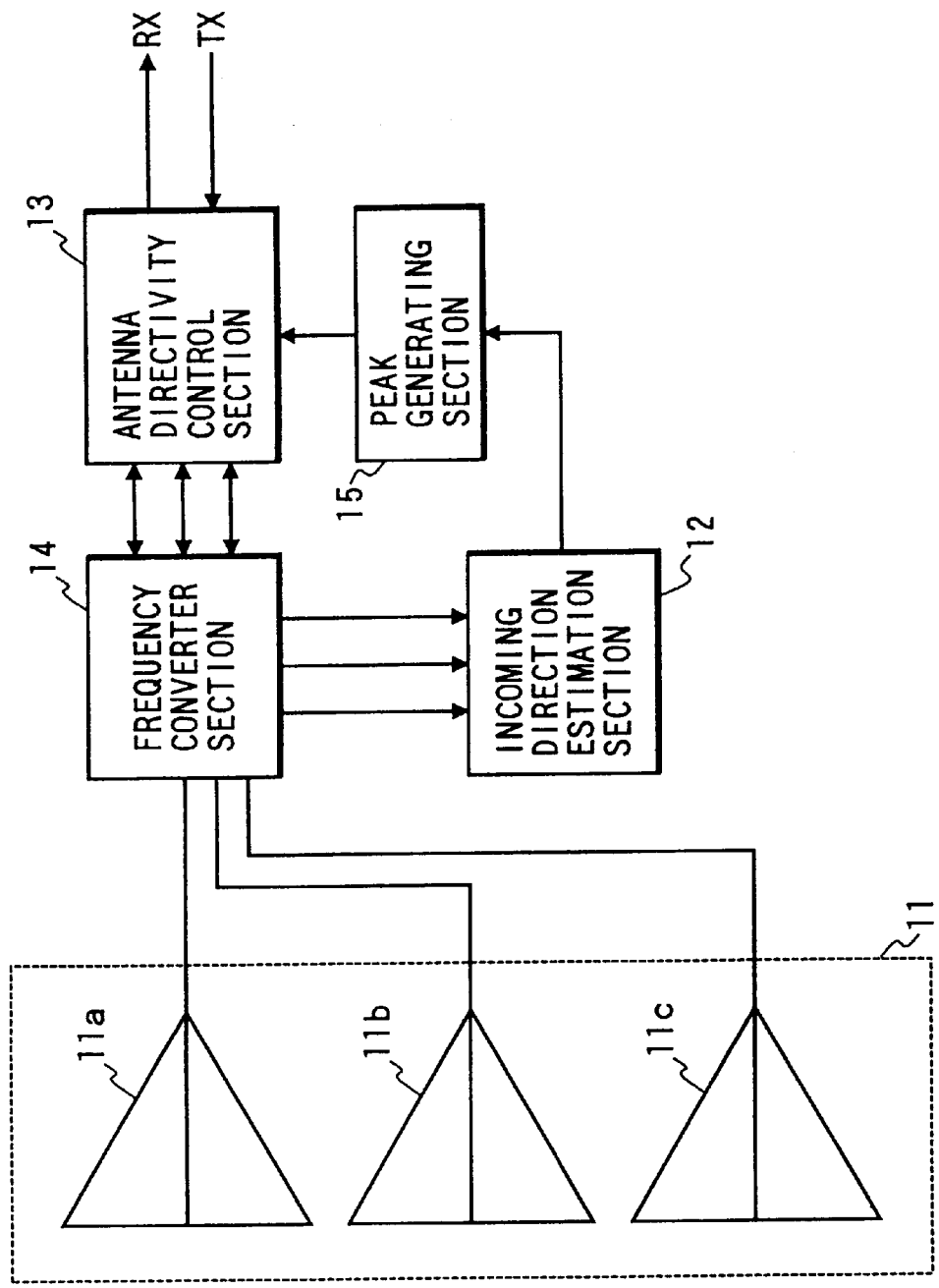
FIG. 1 is a general system block diagram of a first embodiment of a directivity control antenna apparatus according to the present invention.

Embodiments of the present invention will be described in the following, referring to the drawings. FIG. 1 is a system block diagram of a first embodiment of a directivity control antenna apparatus according to the present invention. In FIG. 1, 11 is an array antenna of a base station of a mobile communication system. The array antenna 11 is formed of a plurality of antenna elements, designated here as 11a, 11b, 11c, and can be for example a microstrip antenna, or an array of spaced dipole antennas having rear reflector elements. 12 is an incoming direction estimation section which operates on received signals obtained by the elements of the array antenna 11, to estimate the respective incoming directions of radio waves transmitted from mobile stations. 15 is a peak generating section, which operates on direction data supplied by the incoming direction estimation section 12, to generate control signals for controlling an antenna directivity control section 13 such as to produce peaks in the directivity of the array antenna 11 oriented in the respective directions which are determined by the peak generating section 15.

In this embodiment, the antenna directivity control section 13 also serves to convert a transmission baseband signal to respective I.F. transmission signals of the antenna elements during transmission operation of the base station, and to convert received I.F. signals of the antenna elements to a received baseband signal during receiving operation of the base station.

14 is a frequency conversion section which, in this embodiment, performs up-conversion of modulated intermediate-frequency signals to a transmission frequency, i.e. radio frequency, band during transmission and down-conversion of received radio signals to I.F. during receiving operation.

Figure 4:
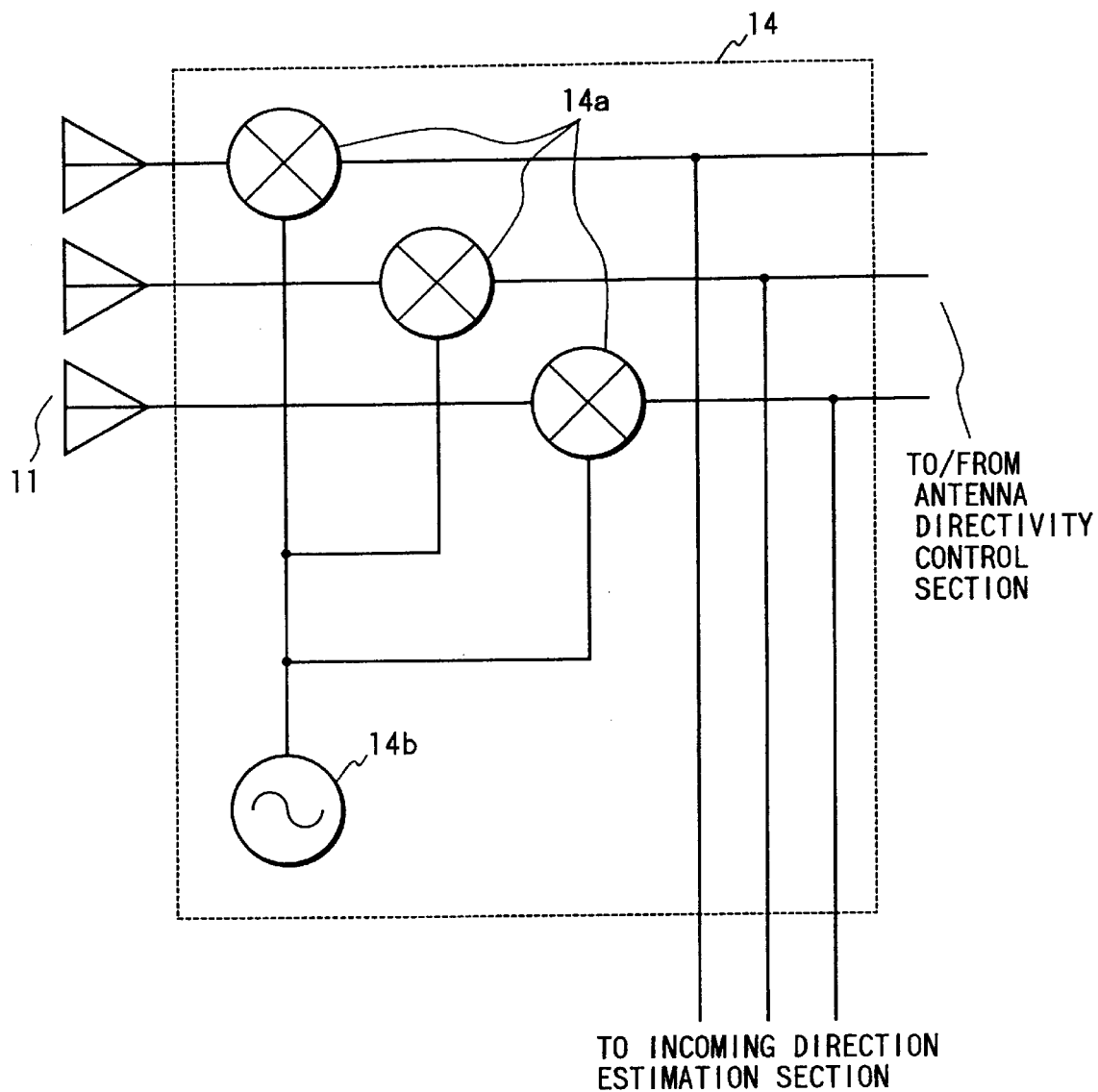
FIG. 4 is a general circuit diagram of a frequency converter section in the embodiment of FIG. 1.
Figure 5:
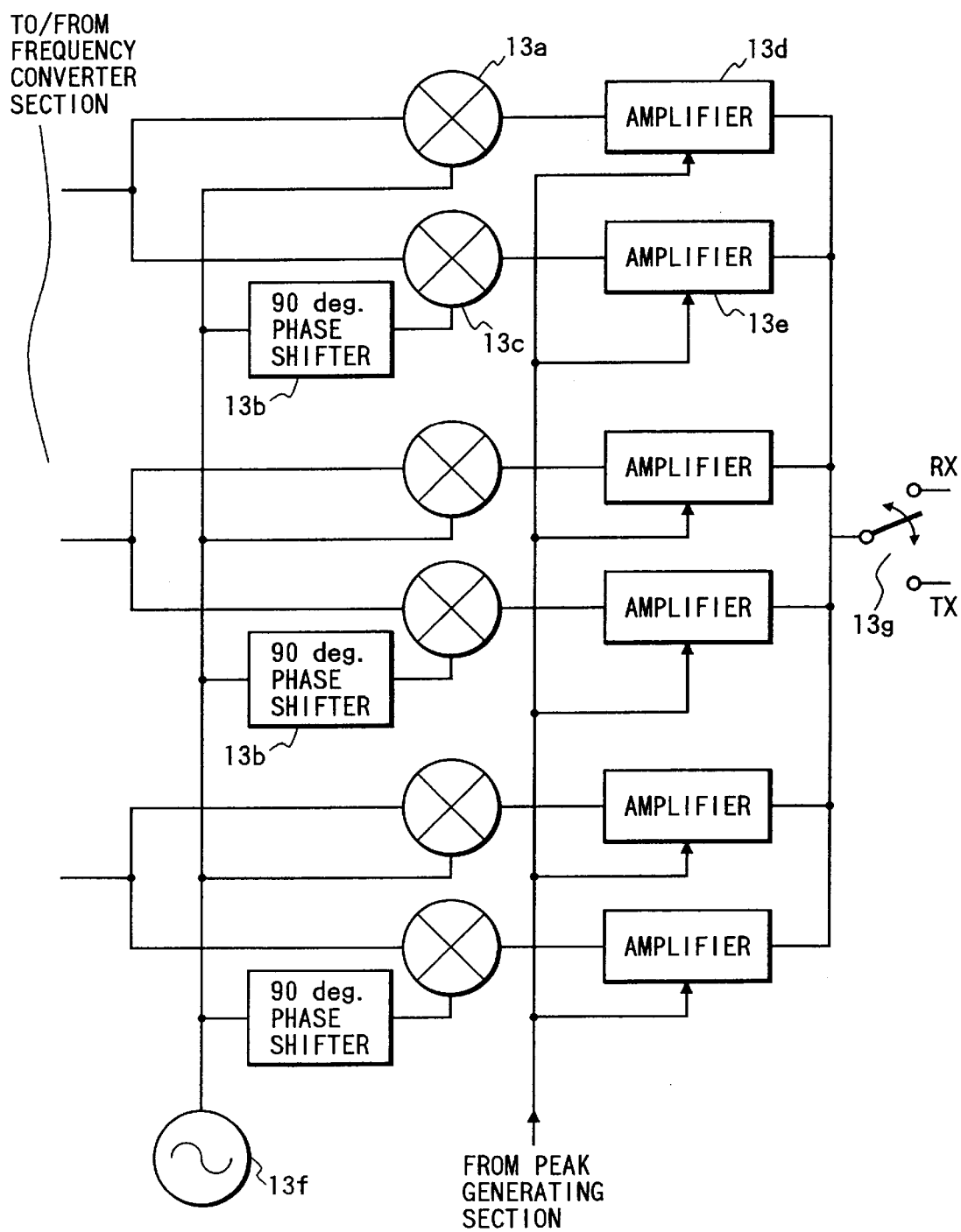
FIG. 5 is a general circuit diagram of an antenna directivity control section in the embodiment of FIG. 1, whereby control of antenna directivity is performed by control of phase and amplitude of baseband signals corresponding to respective elements of an array antenna.

FIG. 4 and FIG. 5 respectively show details of the internal configuration of the frequency converter section 14 and antenna directivity control section 13 of the embodiment of FIG. 1. As indicated by the switch 13g in FIG. 5, the system can be switched between a receiving mode (RX) and a transmission mode (TX) of operation. In the transmission mode, a baseband signal is amplified by each of respective pairs of gain-controlled amplifiers 13d, 13e, and each resultant amplified pair of signals is supplied to a pair of multipliers (i.e. mixers) 13a, 13c, together with a fixed-frequency signal supplied from a frequency source 13f, to be thereby converted to corresponding pair of modulated intermediate frequency (I.F.) signals. The phase of the fixed-frequency signal supplied to one of these multipliers is shifted by 90° by a 90 degree phase shifter 13b, and the resultant pair of modulated I.F. signals are summed, to thereby obtain a single modulated I.F. signal, whose phase and amplitude are determined by the combination of amplification factors of the amplifiers 13d, 13e. (For simplicity of description, no I.F. filter is shown in the drawings).

These amplification factors are determined by respective amplification factor control signals which are supplied from the peak generating section 15, as described hereinafter. Each phase and amplitude-controlled I.F. signal thus obtained is supplied to the frequency converter section 14.

As shown in FIG. 4, each phase and amplitude-controlled I.F. signal thus supplied from the antenna directivity control section 13 is input to a corresponding multiplier 14a, to which is also supplied a fixed high-frequency signal from a frequency source 14b, to thereby obtain a corresponding modulated radio-frequency transmission signal. Each of these transmission signals is supplied to a corresponding one of the elements of the array antenna 11.

When the system is set in the receiving mode of operation, then each RF received signal from an antenna element of the array antenna 11 is input to the corresponding one of the multipliers 14a, to be thereby down-converted to a corresponding I.F. signal, which is supplied to the incoming direction estimation section 12 as well as to the antenna directivity control section 13. In the antenna directivity control section 13, it can be considered that each of the multipliers 13a, 13c and amplifiers 13d, 13e functions with the opposite direction of input/output signal flow from that described for operation in the transmission mode (i.e. by utilizing means which have been omitted from the drawing, for simplicity of description). In that case, each received I.F. signal from an antenna element is input to both the multipliers 13a, 13c, to thereby obtain two corresponding baseband signals which differ in phase by 90°, and which are respectively amplified by the corresponding pair of amplifiers 13d, 13e. The resultant pair of baseband signals is then combined, to obtain a baseband signal whose phase and amplitude are determined by the respective amplification factors that have been set for the amplifiers 13d, 13e, by the control signals supplied from the incoming direction estimation section 12. The respective phase and amplitude-controlled baseband signals thus obtained from the respective antenna elements are then combined to obtain the final received baseband signal.

In that way, the respective values of amplification and phase shift which are applied to each of the received or transmission signals of the antenna elements of the array antenna 11, during both transmission operation and receiving operation, are determined such as to produce a specific radiation pattern for the antenna, so that the base station can communicate with one or more specific mobile stations, i.e. mobile stations which are within the service area of the base station.

To find the respective incoming directions of radio waves transmitted from these mobile stations, the incoming direction estimation section 12 periodically executes a procedure to process the respective received signals from the antenna elements while the system is operating in the receiving mode, by using a technique such as MUSIC (Multiple Signal Classification) or ESPRIT (Estimation of Signal Parameters via Rotational Invariance Techniques). Such a method can be used to estimate the respective incoming directions of radio waves emitted from one or more mobile stations and to thereby estimate the respective directions of these mobile stations with respect to the antenna 11.

Various types of array antenna may be used as the array antenna 11. In particular, since very sharply defined directivity is not necessary, it is possible to use a simple linear array antenna. That is to say, if the difference in height between the antenna 11 and each mobile station is not excessively great, or the distance of each mobile station from the antenna 11 is sufficiently large, then the incoming direction of radio waves received by the elements of a linear array antenna is approximately the same as the azimuth direction of the source of the radio waves.

The MUSIC method is described by Schmidt, for example in the "IEEE Transactions on Antennas and Propagation", Vol. AP-34, No. 3, March 1986, while the ESPRIT method is described by Roy and Kailath in "IEEE Transactions on Acoustics, Speech and Signal Processing", Vol. 37, No. 7, July 1989.

In addition, e.g. based on respective levels of received signal strength from various mobile stations, the base station determines which of these mobile stations are currently located within the service area of that base station. Since such techniques for determining the service area of a base station of a mobile communication system are well known, further description will be omitted.

The directions estimated for the mobile stations which are located within the service area of the base station are used by the peak generating section 15 to determine appropriate values for the control signals which are supplied to the antenna directivity control section 13, for controlling the respective degress of phase shift and amplification which are applied to the respective signals received by or transmitted by the elements of the array antenna 11, as described above. The combinations of phase shift and amplification values which are thereby established for each of the antenna element signals are determined by the peak generating section 15, while the base station is communicating with a mobile station, such as to produce a peak of antenna directivity oriented in the direction which has been estimated for that mobile station. This ensures that:

(a) minimum levels of transmitter power and receiver sensitivity are required in the base station, to perform such communication with the mobile stations, and (b) there is a minimized possibility of interference occurring between such communication with mobile stations within the service area of a base station and communication which is being performed within adjacent service areas of other base stations of the mobile communication system.

Figure 2:
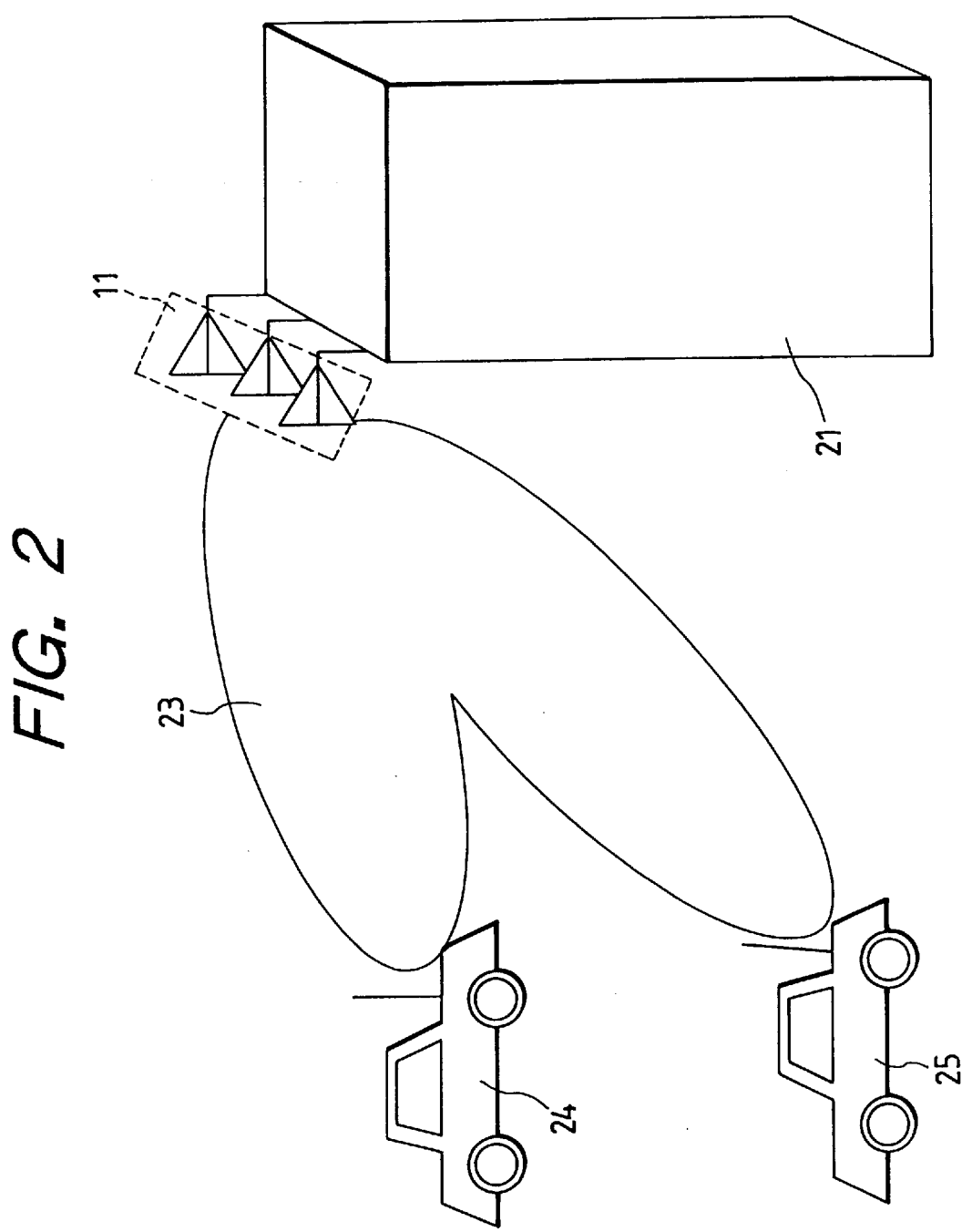
FIG. 2 is a conceptual diagram illustrating peaks of directionality of the antenna of a base station, formed in accordance with estimated directions of mobile stations.

FIG. 2 is a simple diagram for conceptually illustrating the relationship between a base station and mobile stations which are within the service area of the base station. In FIG. 2, 21 is a base station, 23 is an antenna directional beam, which is formed by the antenna directivity control section of the base station, 24 and 25 are respective mobile stations. Assuming that both of the mobile stations 24,25 are within the service area of the base station 21, the radiation pattern 23 of the array antenna 11 of the base station 21 could be formed as indicated in FIG. 2, with respective peaks of the antenna directivity being oriented in the directions of the mobile stations 24 and 25.

In the case shown in FIG. 2 it could be assumed that there are two mobile stations whose transmissions are being received by the array antenna 11 simultaneously. Even if these two transmissions utilize the same frequency band, the respective signals received from the mobile stations will have no mutual correlation if the transmissions are modulated by respectively different data, so that it becomes possible for the incoming direction estimation section 12 to detect the respective directions of the two mobile stations. As a maximum, it is possible to judge the respective directions of a number of mobile stations which is no greater than the total number of antenna elements of the base station antenna.

Thus, the number of mobile stations which are operating within the service area of a base station, and the respective directions of these mobile stations, can be obtained based on the incoming directions of the radio waves transmitted by the mobile stations.

Unless otherwise stated, it will be assumed for each of the described embodiments in the following that each base station utilizes a linear array antenna having the array axis disposed horizontally, and so being capable of only azimuth directivity. In that case, the concept "direction of a mobile station with respect to the antenna of a base station" signifies a value of azimuth angle.

Although it is assumed in the example of FIG. 5 that the aforementioned modification of phase and amplitude is applied to the transmission or received signals at the baseband level, it would be equally possible for such modification to be applied at the intermediate frequency (I.F.) level. In that case for example, each of the multipliers 14a in FIG. 4 would be replaced by a pair of multipliers, i.e. a first multiplier for performing direct up-conversion from the I.F. frequency or down-conversion to the I.F. frequency, and a second multiplier for performing up-conversion or down-conversion with 90° phase-shifting. The I.F. signal of each such multiplier would be supplied to/obtained from a gain-controlled amplifier, in the same way as for the multipliers 13a, 13c of FIG. 5.

Figure 3:
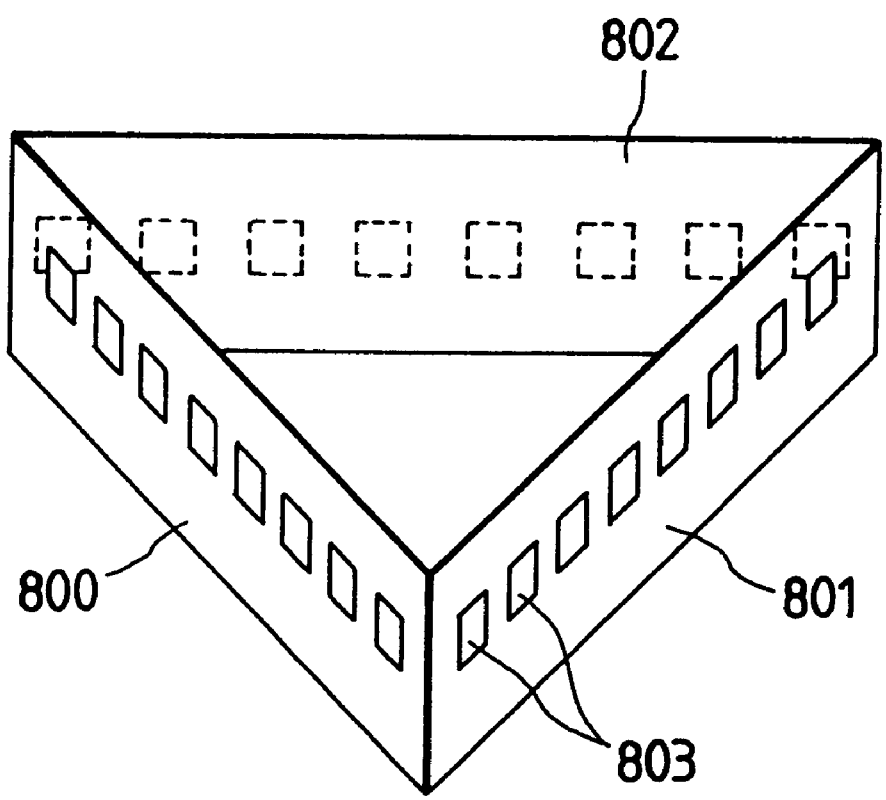
FIG. 3 is a diagram showing an example of an array antenna for providing 360° of azimuth directivity control, using microstrip antennas.

For simplicity of description, the array antenna 11 of FIG. 1 is shown as having only three antenna elements, however the actual number of elements may of course be substantially greater. Furthermore, in general it is necessary for the array antenna of a base station to be capable of receiving radio waves from directions extending through a complete 360° of azimuth. It is possible to accomplish this by configuring an array antenna having the antenna elements arrayed in a circle. However it is equally possible to use a plurality of linear array antennas, each having the array axis disposed horizontally and having directivity at only one side thereof. Such a linear array antenna can be formed as a linear microstrip antenna, or a linear array of vertical dipole antennas each provided with a rear reflector. To obtain the required 360° of azimuth coverage, a pair of such array antennas could be disposed back-to-back, i.e. with each array antenna providing 180° of azimuth coverage. Alternatively, as illustrated in FIG. 3 is possible to configure a set of three array antennas 800, 801, 802 (in this example, microstrip antennas), with each of these providing an azimuth coverage of 120°.

Figure 6:
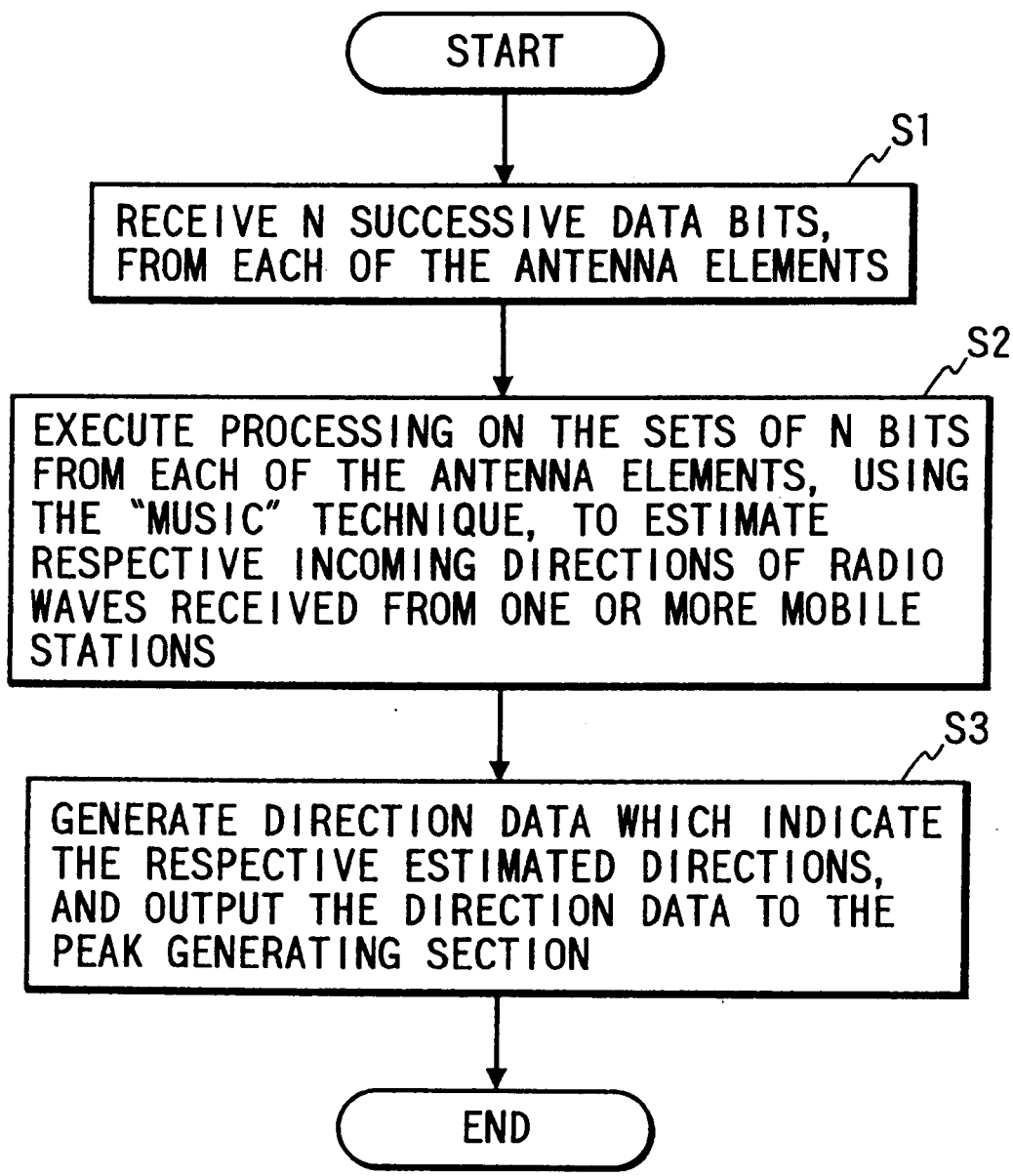
FIG. 6 is a flow diagram for illustrating the operation of an incoming direction estimation section in the embodiment of FIG. 1.

FIG. 6 is a basic flow diagram of the processing which is executed by the incoming direction estimation section 12 for deriving data expressing the respective directions of mobile stations. In step S1, since with this embodiment it is assumed that the received I.F. signals are used for direction estimation processing, the "N successive data bits" signifies an I.F. signal which is modulated with N successive data bits. With the MUSIC or ESPRIT technique, the degree of estimation accuracy obtained is affected by the amount of received data which is processed, i.e. a minimum number of successively received bits must be used in each direction estimation operation, to obtain a desired level of accuracy.

In general, the step shown as S3 in FIG. 6 will result in only the direction data for one specific mobile station being supplied to the peak generating section 15 at a time, i.e. a mobile station with which the base station is currently in communication, or is to begin communication. Also, although not specifically described in the above, the incoming direction estimation section or the peak generating section includes a memory, for temporarily storing estimated direction data in the intervals between execution of direction estimation operations by the incoming direction estimation section, e.g for supplying the data to the peak generating section while the base station is transmitting.

Furthermore, the incoming direction estimation section may use the estimated direction information to estimate the total number of mobile stations which are currently in the service area of the base station.

Figure 7:
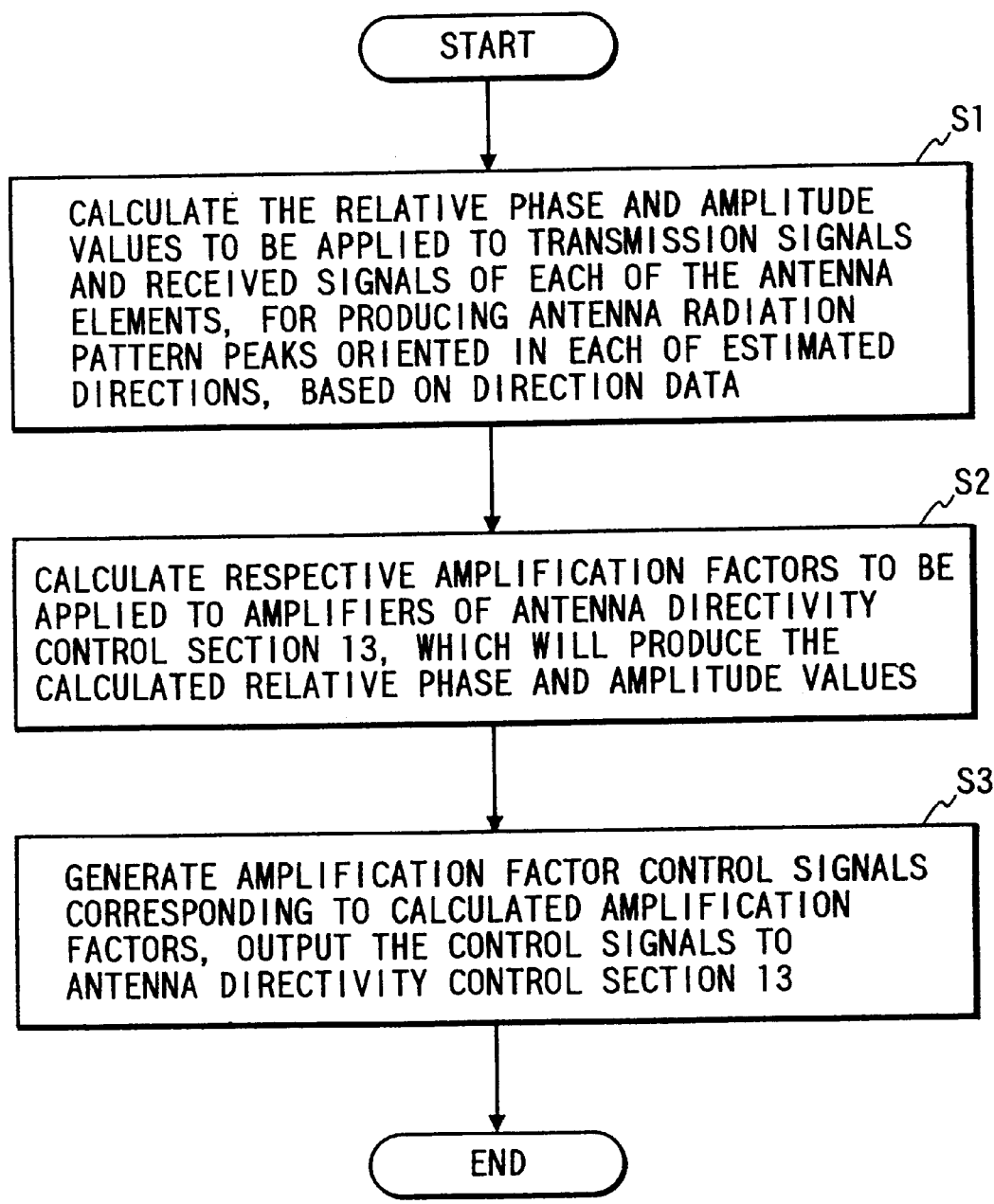
FIG. 7 is a flow diagram for illustrating the operation of a peak generating section in the embodiment of FIG. 1.

FIG. 7 is a basic flow diagram of the processing which is executed by the peak generating section 15, for operating on direction data supplied from the incoming direction estimation section 12. With this embodiment, the degrees of phase shift and amplification which are applied to the received or transmitted signals are determined by the respective amplification factors established for the amplifiers of the antenna directivity control section 13 as described above, so that appropriate values for these amplification factors are determined in step S2 of FIG. 7, for producing respective peaks of antenna directivity at each of the directions which have been found by the incoming direction estimation section 12. In general, as mentioned above, only a peak which is oriented in the direction of one specific mobile station is produced at a time. However as stated above the invention is not limited to such an arrangement, and it is possible to form a plurality of peaks concurrently, directed to respective ones of a plurality of mobile stations.

For brevity of description, means for linking each estimated direction to the identity of a specific mobile station will not be described, since methods of identifying mobile stations of a mobile communication system are well known.

Figure 8:
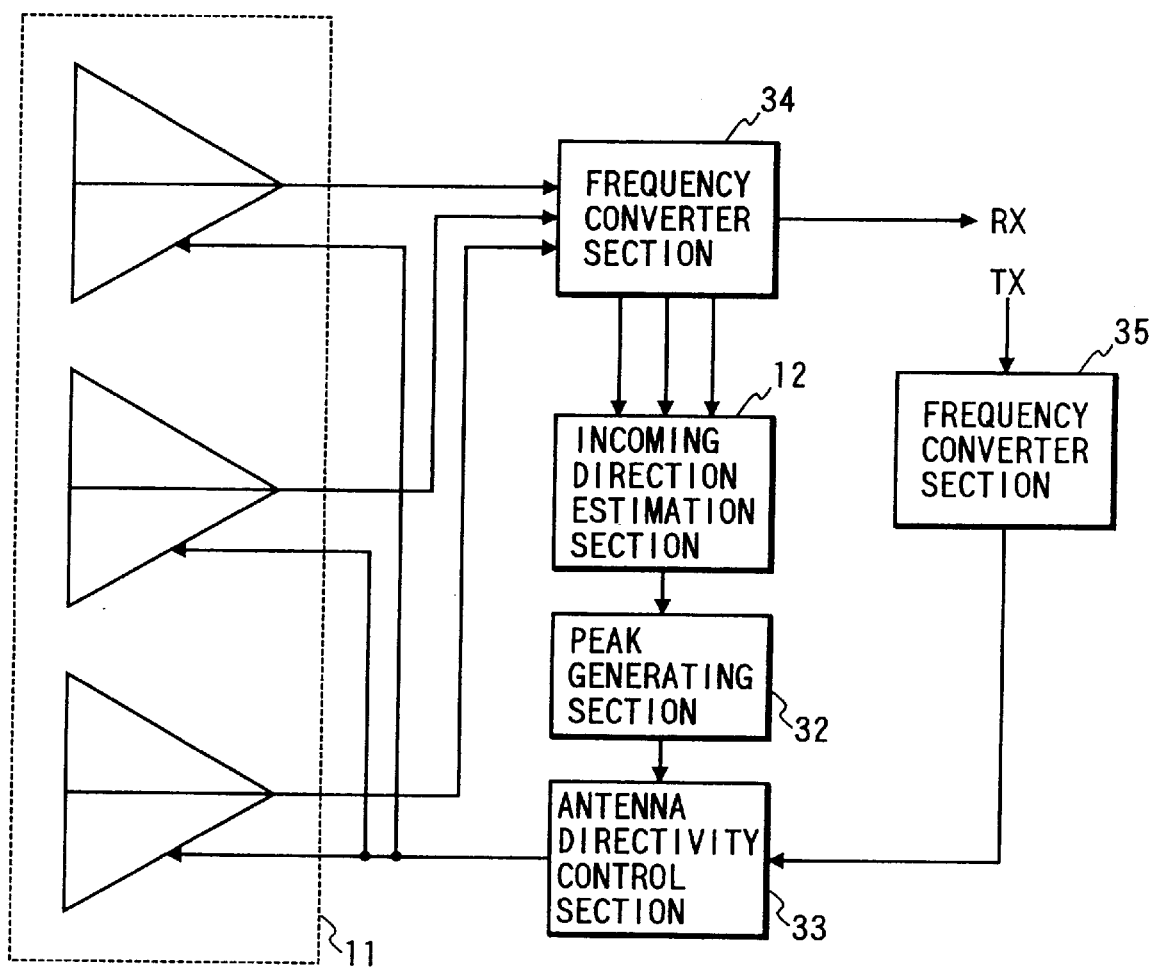
FIG. 8 is a general system block diagram of a first alternative configuration of the first embodiment, whereby control of antenna directivity is performed by direct control of phase and amplitude of transmission frequency signals corresponding to respective elements of the array antenna.
Figure 9:
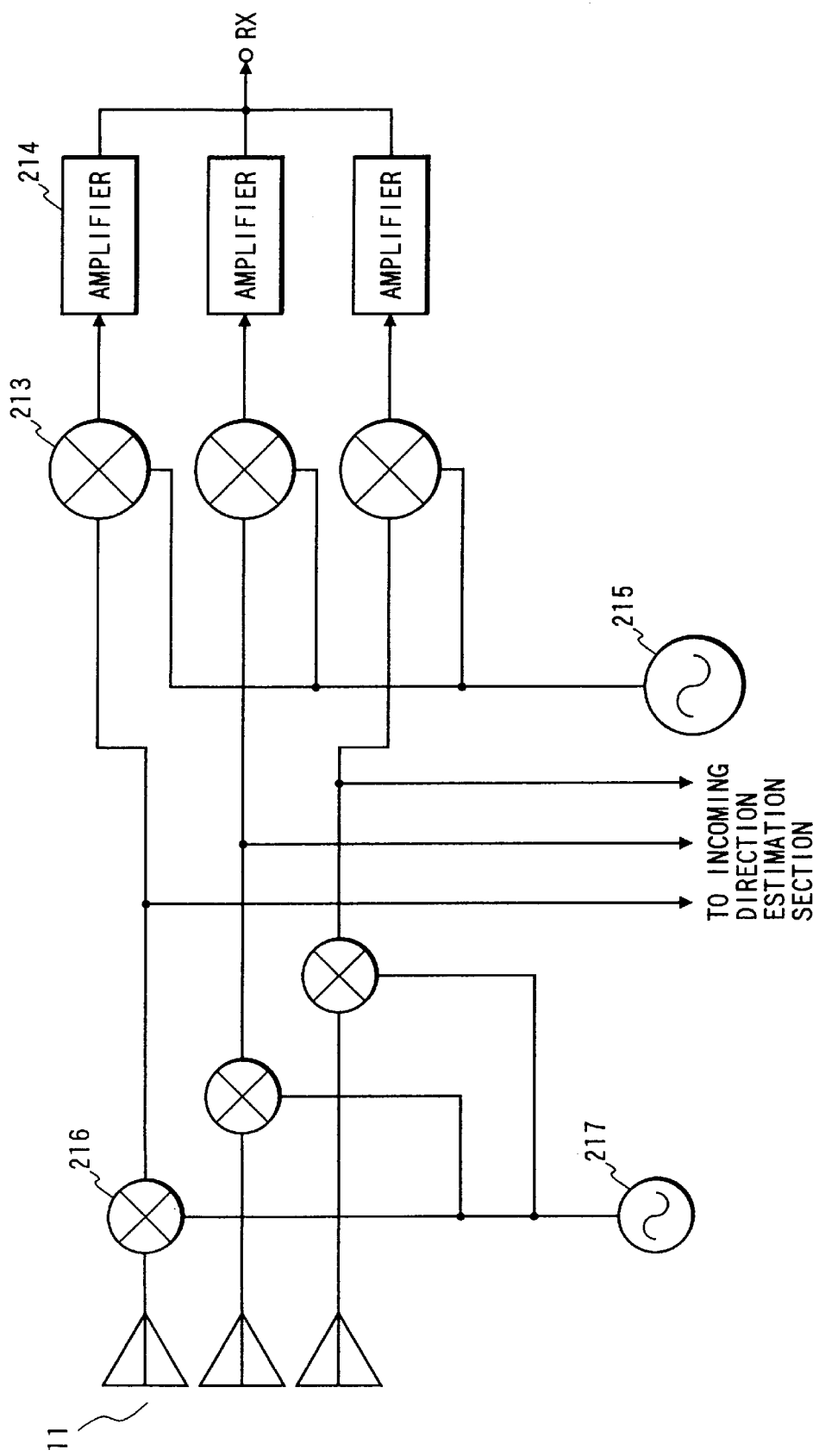
FIG. 9 is a general circuit diagram of a frequency converter section in the embodiment of FIG. 8, used only for received signals of said antenna elements.
Figure 10:
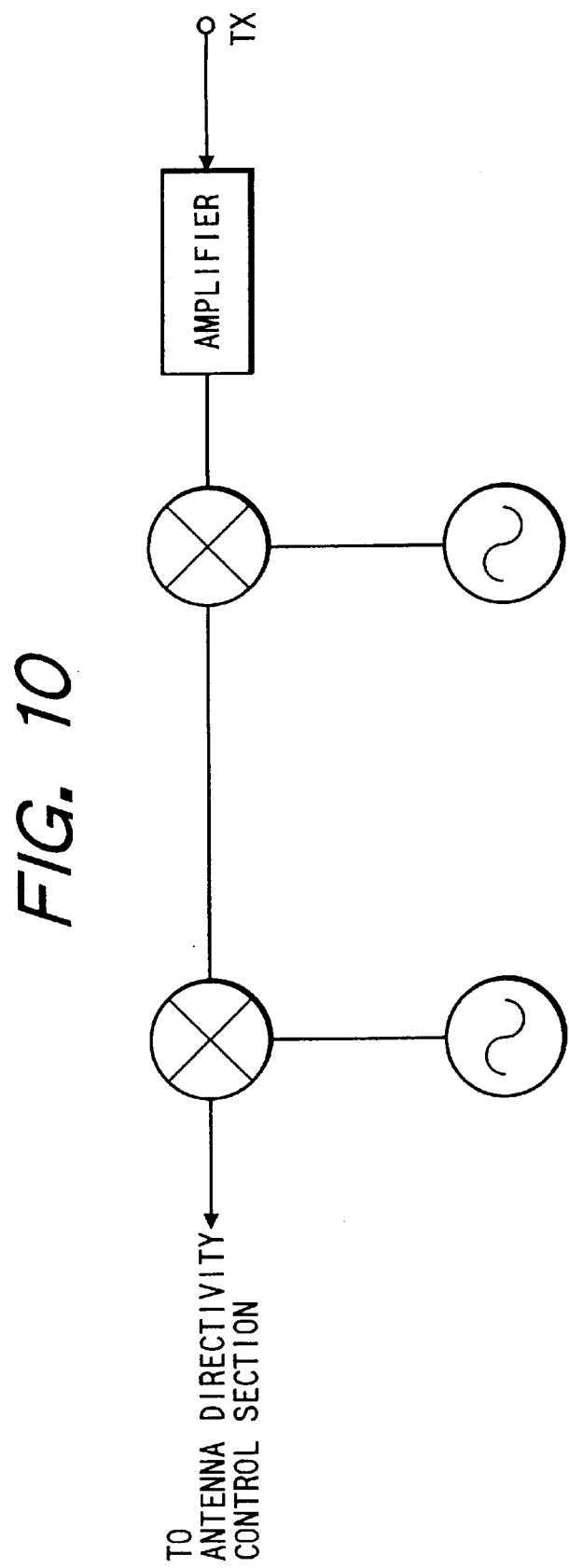
FIG. 10 is a general circuit diagram of a frequency converter section in the embodiment of FIG. 8, used only for a transmission signal.
Figure 11:
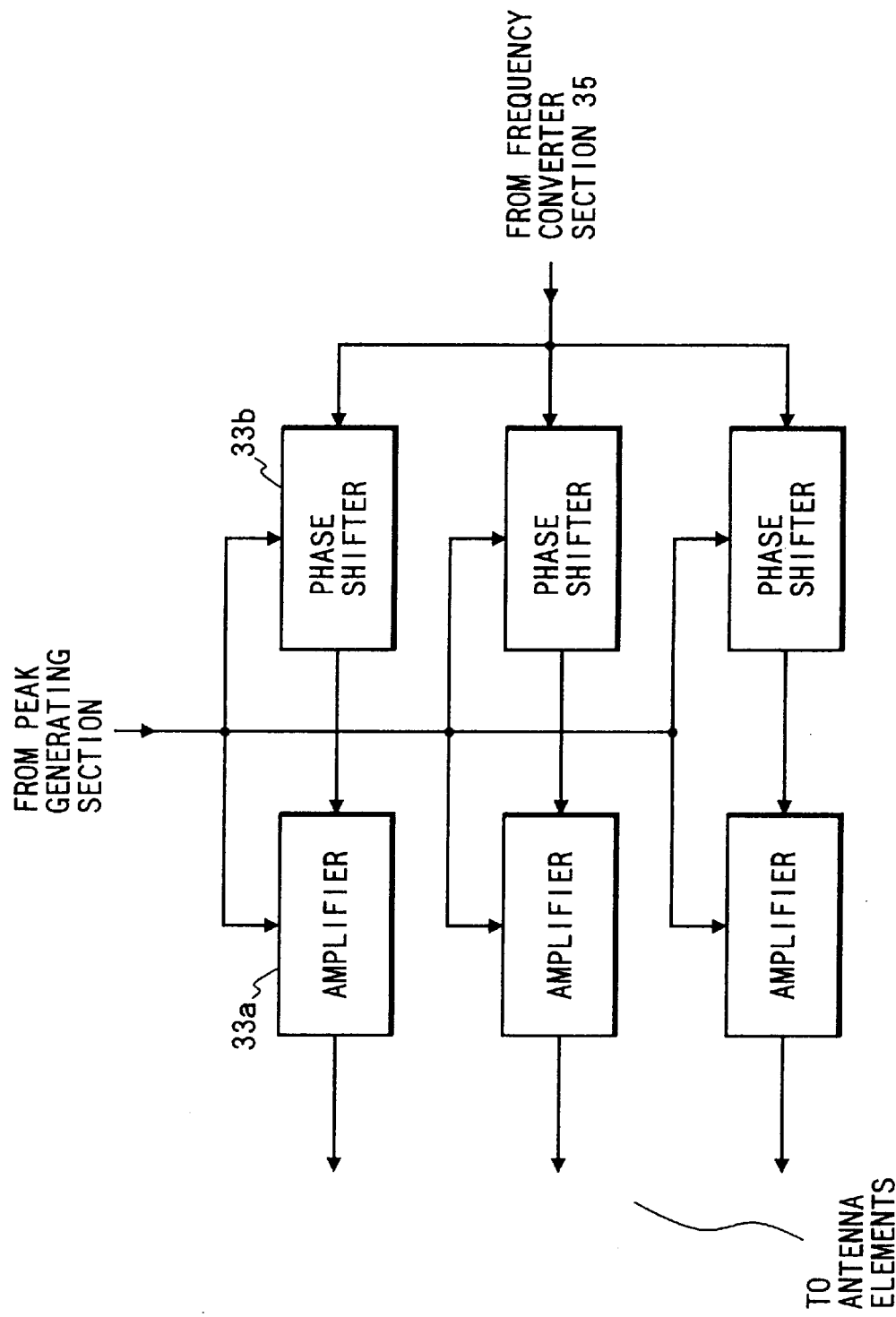
FIG. 11 is a general circuit diagram of an antenna directivity control section in the embodiment of FIG. 8.
Figure 12:
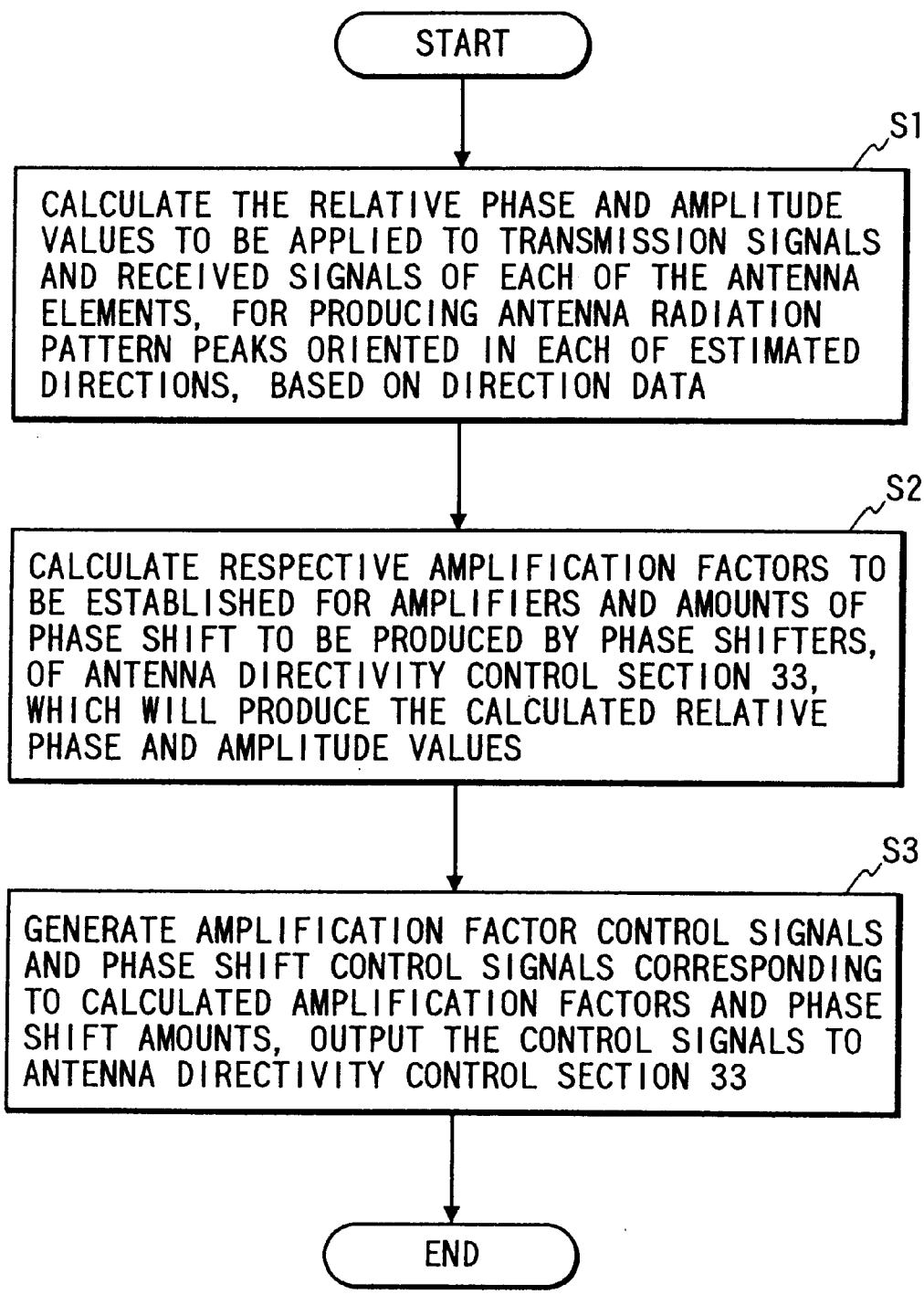
FIG. 12 is a flow diagram for illustrating the operation of a peak generating section in the embodiment of FIG. 8.

FIG. 8 is a system block diagram of a first alternative arrangement of the of the first embodiment of the invention. In FIG. 8, 33 is the antenna directivity control section. The apparatus of FIG. 8 differs from that of FIG. 1 in that the antenna directivity control section 33 performs direct control of respective phase shift and amplification values applied to each of the (R.F.) transmission signals or received signals of the elements of the array antenna, for determining the directivity of the array antenna 11. With this apparatus, as for the apparatus of FIG. 1, the incoming direction estimation section 12 can estimate the directions of mobile stations while data are being received from mobile stations, i.e. during normal receiving operation. However peaks are formed in the directivity of the array antenna 11 only during transmission operation. Since the operation is otherwise identical to that of the apparatus of FIG. 1, only the points of difference will be described. FIG. 9 shows the internal configuration of the frequency converter section 34. As shown, during receiving operation, down-conversion of the received signals from the antenna elements to I.F. is performed by multipliers 216, and conversion from I.F. to baseband by multipliers 213, with the baseband signals being amplified by amplifiers 214 and combined to obtain the final received signal. A second frequency converter section 35 is configured as shown in FIG. 10, for supplying an R.F. transmission signal to the antenna directivity control section 33. The configuration of the antenna directivity control section is as shown in FIG. 11. Here, the transmission signal of each antenna element is subjected to an amount of phase shift by a phase shifter 33*b*, and an amount of amplification by an amplifier 33*a*, which are respectively determined by control signals supplied from the peak generating section 32, in accordance with incoming direction data which are supplied to the antenna directivity control section 33 from the peak generating section 32. The processing sequence which is performed by the peak generating section 32 of this embodiment, in response to a set of direction data supplied from the incoming direction estimation section 12, is as shown in FIG. 12. This differs from the processing shown in FIG. 7 only in that control signals are generated for direct control of the respective amounts of phase shift to be applied to the signals of the antenna elements, rather than amplification factor control signals.

Figure 13:
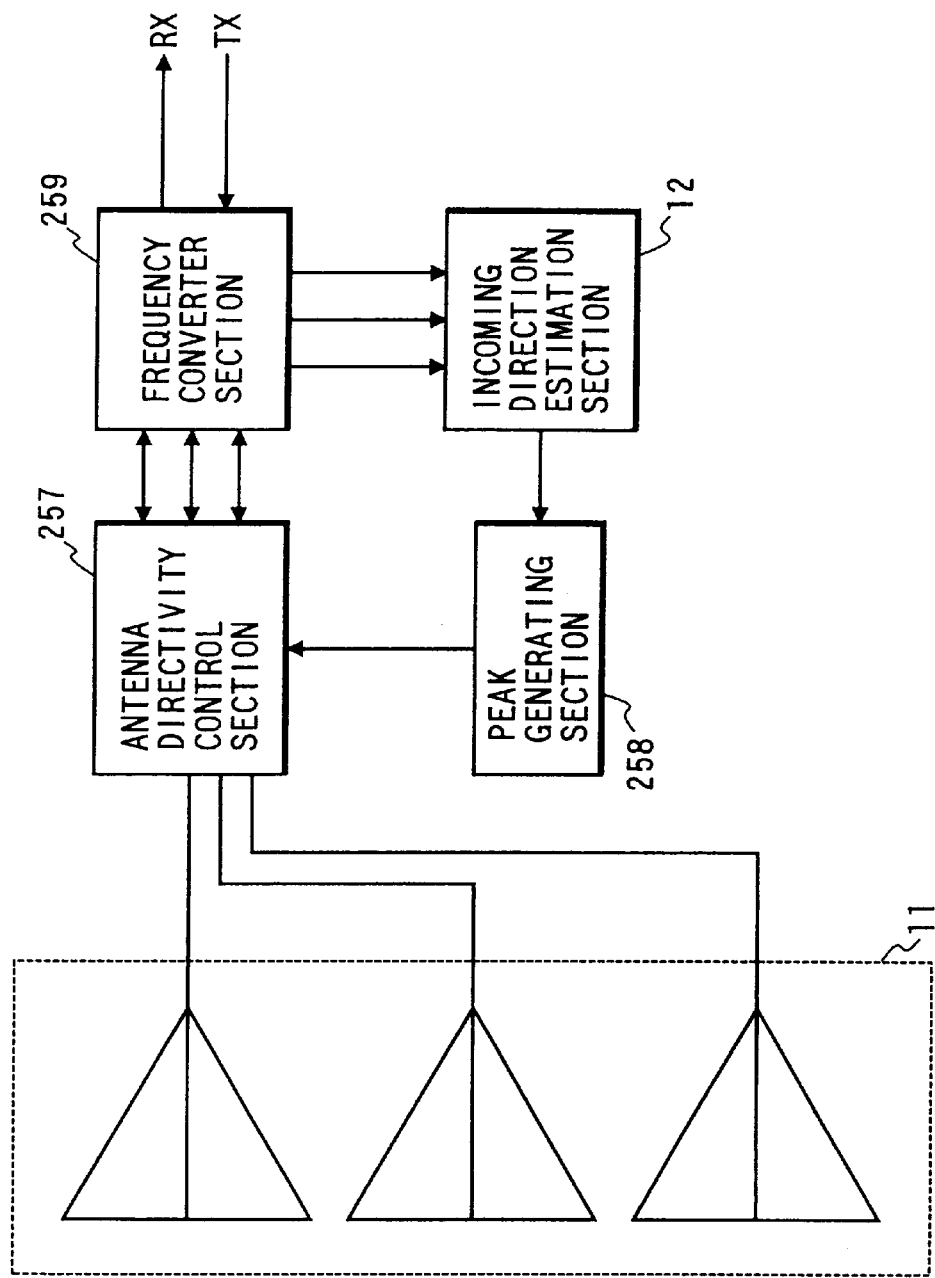
FIG. 13 is a general system block diagram of a second alternative configuration of the first embodiment, whereby control of antenna directivity is performed by direct control of phase and amplitude of transmission frequency signals corresponding to respective elements of the array antenna.

A second alternative arrangement of the first embodiment is as shown in FIG. 13. The functions of the incoming direction estimation section 12 of FIG. 13 are identical to those of the incoming direction estimation section 12 of FIG. 1 described above. Here, as for the apparatus of FIG. 1, directivity peaks oriented in the directions of mobile stations are produced during both transmission and receiving operation. However it is necessary to set the amounts of phase shift and amplification applied to the receiving signals of the antenna elements to respectively identical amounts, before using the resultant I.F. or baseband signals for estimation of incoming radio wave directions. In FIG. 13, the respective transmission or receiving signals of the elements of antenna 11 are transferred via the antenna directivity control section to the frequency converter section 259. During receiving operation, when an incoming direction estimation operation is to be executed, the I.F. signals from the antenna elements are supplied to the incoming direction estimation section 12 under a condition in which identical amounts of phase shift and amplification are applied to each of the received (R.F.) signals from the antenna elements by the antenna directivity control section 257. After the direction information has thus been obtained, the peak generating section generates control signals for applying respective amounts of phase shift and amplification to the transmission/receiving signals of the antenna elements such as to produce directivity peaks at each of the directions which have been determined for mobile stations.

Figure 14:
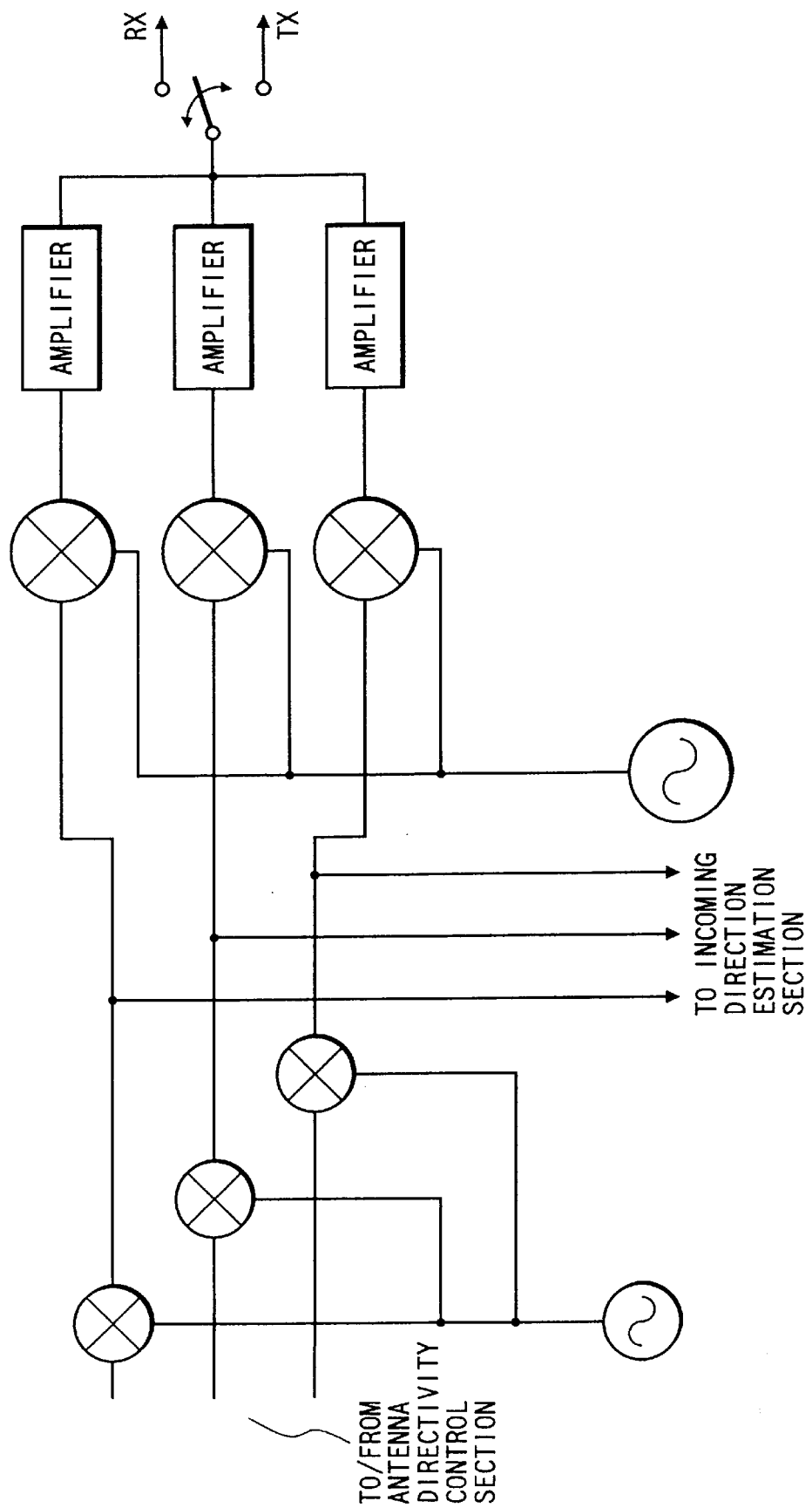
FIG. 14 is a general circuit diagram of a frequency converter section in the embodiment of FIG. 13.
Figure 15:
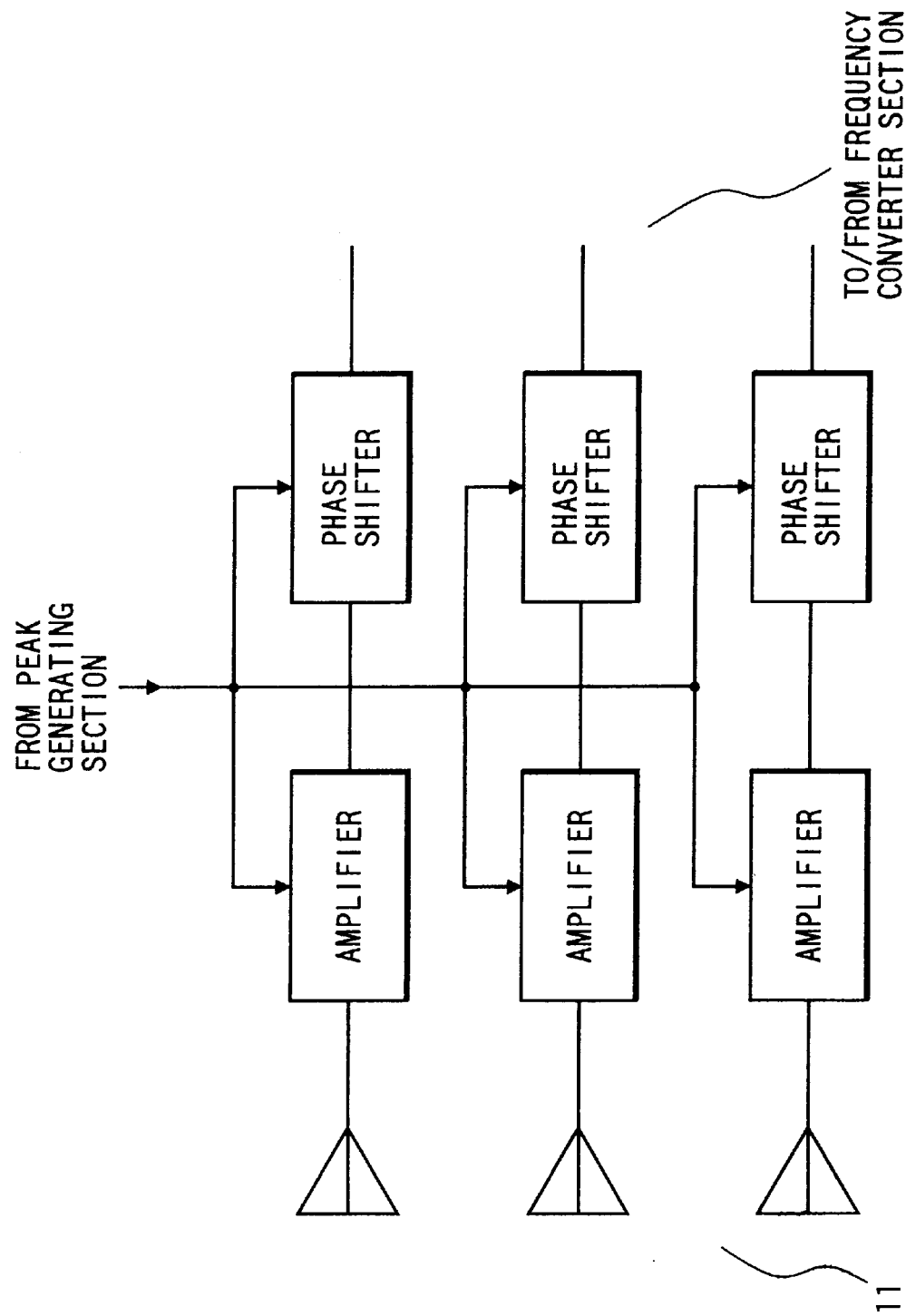
FIG. 15 is a general circuit diagram of an antenna directivity control section in the embodiment of FIG. 13.
Figure 16:
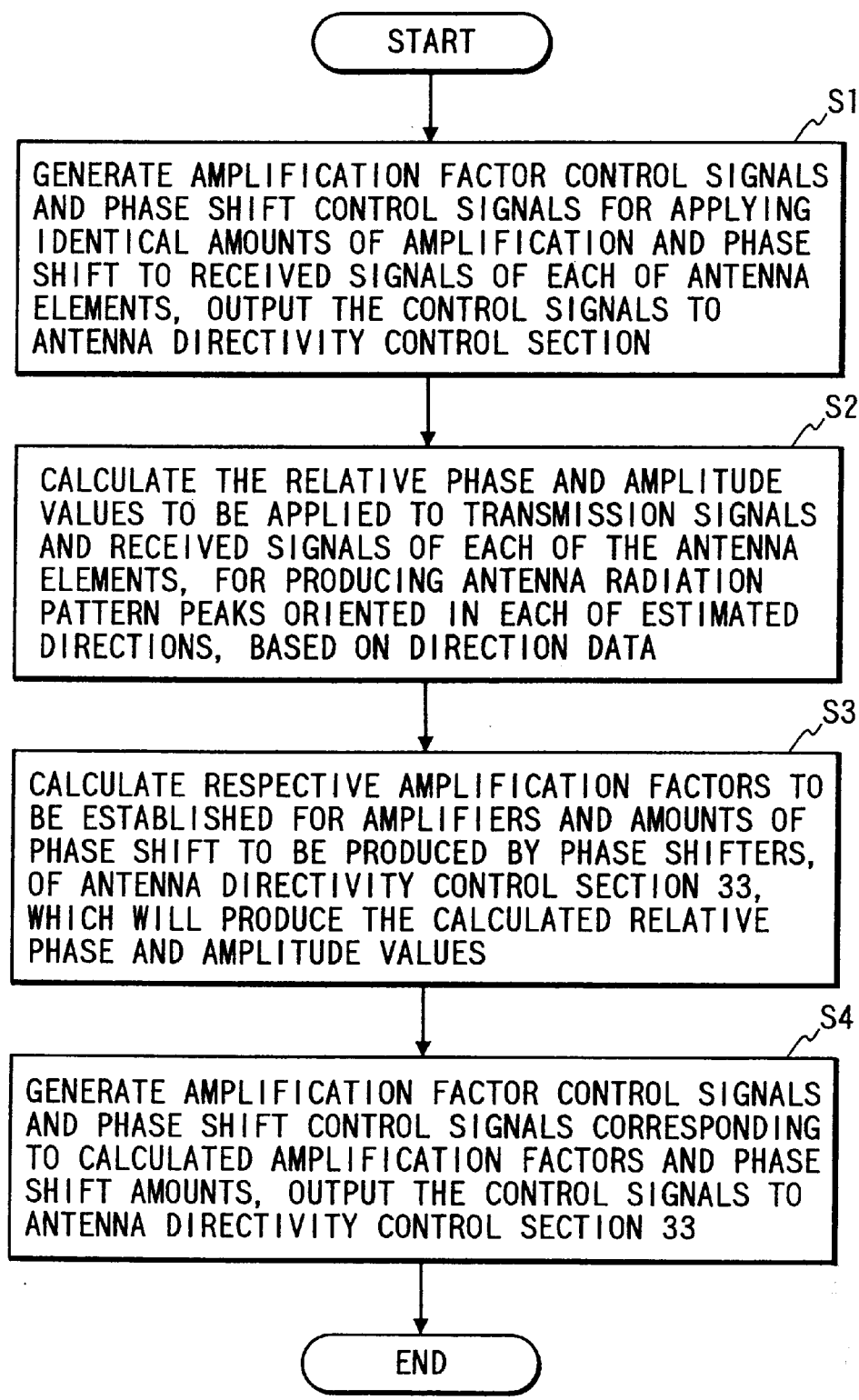
FIG. 16 is a flow diagram for illustrating the operation of a peak generating section in the embodiment of FIG. 13.

FIG. 14 shows the internal configuration of the frequency converter section 259, FIG. 15 shows the configuration of the antenna directivity control section 257, and FIG. 16 shows the sequence of processing performed by the peak generating section 258 when a direction estimation operation is performed by the incoming direction estimation section 12. As shown in FIG. 16, prior to actually starting a direction estimation operation by the incoming direction estimation section 12, the peak generating section 258 generates control signals for ensuring that identical amounts of phase shift (e.g. zero) and amplification are applied to each of the received signals from the antenna elements of the array antenna 11. Thereafter, the operation of the peak generating section is identical to that described for FIG. 12 above.

Figure 17:
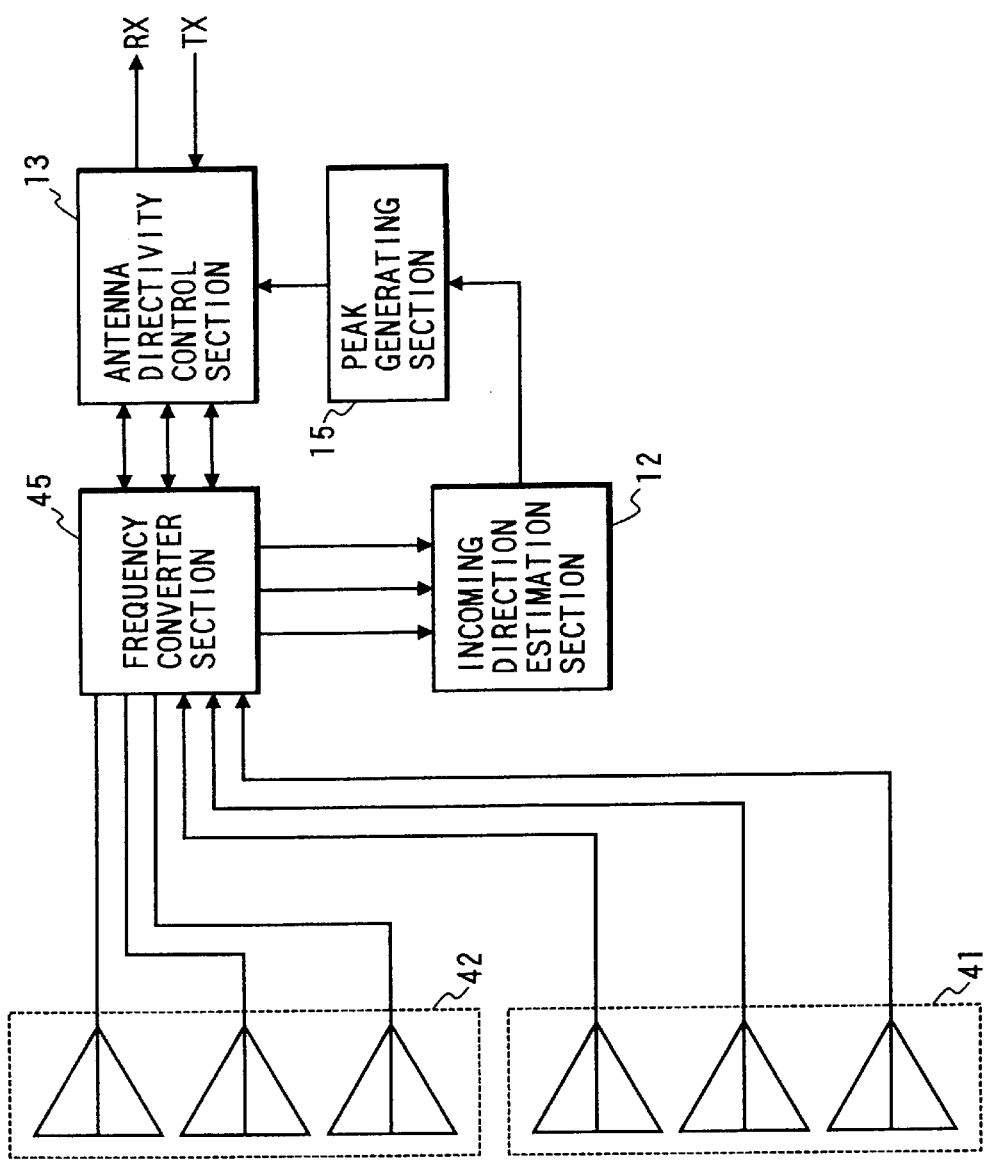
FIG. 17 is a general system block diagram of a second embodiment of a directivity control antenna apparatus according to the present invention, having respectively separate array antennas for use in direction estimation and data communication.

FIG. 17 is a system block diagram of a second embodiment of the present invention. In FIG. 17, 41 is a first array antenna, which is utilized only for receiving signals that are employed for incoming direction estimation, while 42 is a second array antenna, which is utilized only as a data transmitting and receiving antenna. The incoming direction estimation section 12, antenna directivity control section 13 and peak generating section 15 are mutually connected and function in the same manner as the correspondingly designated sections of the first embodiment shown in FIG. 1.

Figure 18:
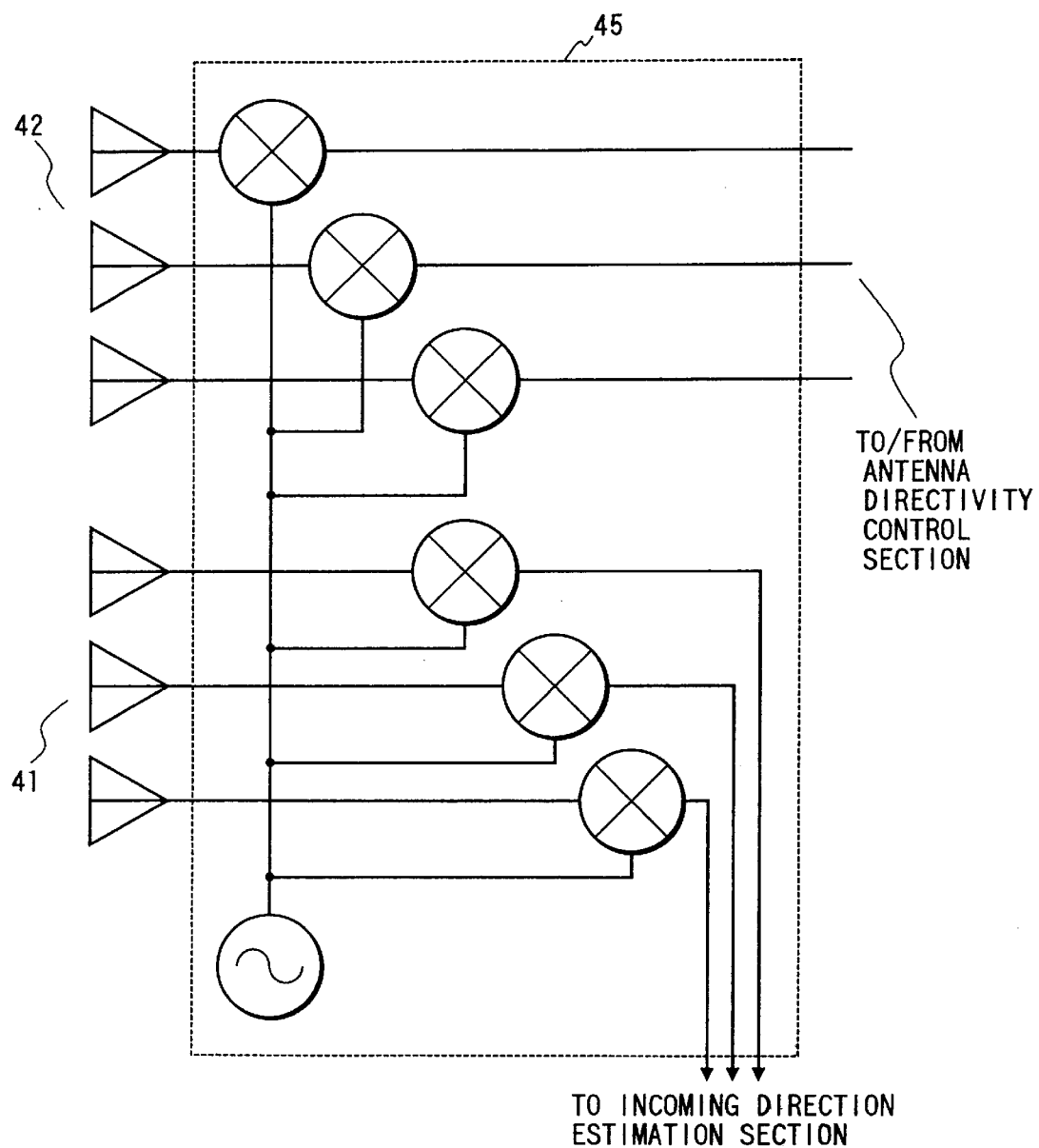
FIG. 18 is a general circuit diagram of a frequency converter section in the embodiment of FIG. 17.

The internal configuration of the frequency converter section 45 of this embodiment is as shown in FIG. 18. As shown, the respective received signals from the elements of the second array antenna 41, after conversion to I.F., are supplied to the incoming direction estimation section 12. It can thus be understood that this embodiment differs from the first embodiment of FIG. 1 only in being provided with an array antenna which is utilized to obtain received signals for use in incoming direction estimation, and that in other respects the operation is identical to that described for the first embodiment of FIG. 1.

Figure 19:
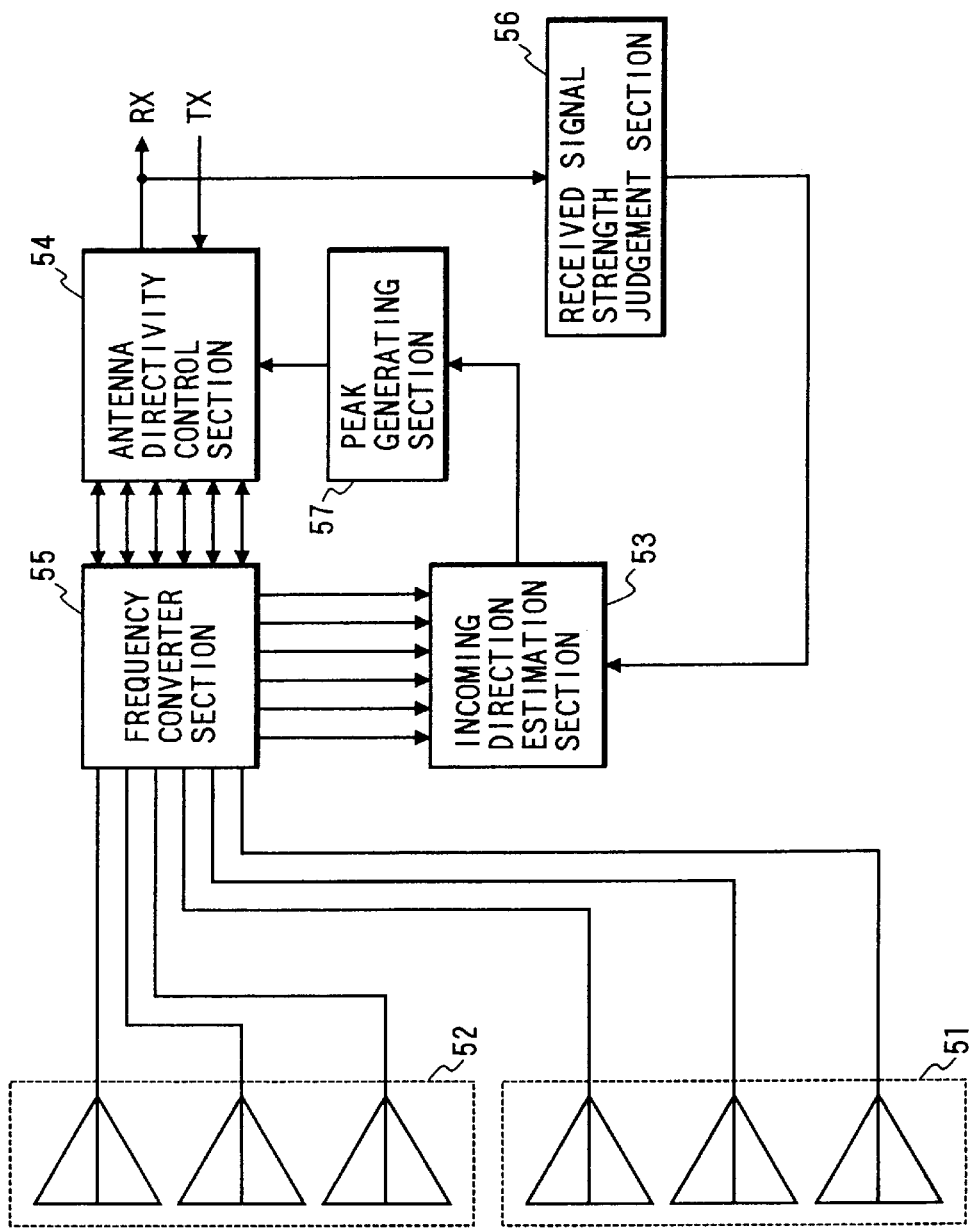
FIG. 19 is a general system block diagram of a third embodiment of a directivity control antenna apparatus according to the present invention.

As described hereinabove, it is only possible for the incoming direction estimation section to obtain accurate direction information for each of the mobile stations from which radio waves are received, and an accurate estimate of the total number of these mobile stations, if that number of mobile stations is no greater than the total number of elements of the array antenna whose signals are used for direction estimation. FIG. 19 is a system block diagram of a third embodiment of the invention which enables that limitation to be overcome. In FIG. 19, 51 is a first array antenna, which is normally used to obtain received signals for incoming direction estimation purposes, and 52 is a second array antenna, which is normally utilized as a data transmitting and receiving antenna. 53 is an incoming direction estimation section, 54 is an antenna directivity control section, 55 is a frequency conversion section, 56 is a received signal strength judgement section, and 57 is a peak generating section.

The operation of this embodiment is as follows. The incoming direction estimation section 53 uses the received signals from the respective elements of the array antenna 51 to estimate the number and the directions of mobile stations which are within the service area of the base station. If the estimated number of mobile stations is found to be less than the number of the elements of the array antenna 51, then this indicates that the incoming direction data that is obtained by the incoming direction estimation section 53 is reliable, and so the operation thereafter is identical to that described for the preceding embodiment, i.e. the peak generating section 57 generates control signals whereby the antenna directivity control section 54 forms the directivity with peaks oriented in the respective directions of the mobile stations which are within the service area of that base station, and communication with the mobile stations can then be performed.

However if the estimated number of mobile stations is found to be the same as the number of elements of the array antenna 51, then this may indicate either a condition in which the number of mobile stations is actually greater than the number of elements of the array antenna 51, or a condition in which the number of mobile stations is in fact equal to the number of elements of the array antenna 51. Thus, there is a possibility of error in the estimation results obtained from the incoming direction estimation section 53. For that reason, in such a case, the incoming direction estimation section 53 then utilizes the received signals of all of the elements of the data transmitting and receiving antenna 52 as well as those of the first array antenna 51, in estimating the incoming directions of radio waves from the mobile stations.

If it is found from the estimation results thus obtained that the number of mobile stations within the service area of the base station is less than the total number of elements of the array antenna 51 and data transmitting and receiving antenna 52, then this indicates that the estimation results can be considered to be correct. In that case, the control signals from the peak generating section 57 cause the antenna directivity control section 54 will orient the antenna directional peaks in the directions of the mobile stations within the service area of that base station, and communication with the mobile stations can then be performed.

If it is found that the number of mobile stations which is obtained as estimation results by the incoming direction estimation section through use of the elements of both the first array antenna 51 and the data transmitting and receiving antenna 52, is equal to the sum of the elements of the array antenna 51 and data transmitting and receiving antenna 52, then this may indicate either a condition in which the number of mobile stations is greater than the total number of elements of the array antenna 51 and the data transmitting and receiving antenna 52, or a condition in which the number of mobile stations is actually equal to the number of elements of the array antenna 51 and the data transmitting and receiving antenna 52. Thus there is a possibility that the estimation results obtained by the incoming direction estimation section will be in error. For that reason, in this case the peak generating section 57 generates control signals whereby the antenna directivity control section 54 alters the phase and amplitude of the respective signals which are supplied to or received from (i.e. as transmission signal or received signal) the various elements of the first array antenna 51 and data transmitting and receiving antenna 52, such as to perform sweeping of a single peak of the antenna directivity throughout the entire sweep range (i.e. in general, through 360° of azimuth angle), with the apparatus operating in the receiving mode. During that sweeping operation, the strength of any received signal obtained from a mobile station is judged (e.g. based on the level of the resultant baseband signal, by the received signal strength judgement section 56). Each time that a signal is received from a mobile station during this sweeping, of sufficient strength to indicate that the mobile station is located within the service area of the base station, the sweeping is temporarily halted and communication is then performed between the base station and that mobile station (for example, during a predetermined time interval, or for a requisite interval). The sweeping is then resumed, until a received signal from the next mobile station which is within the service area is detected, communication is then performed with that mobile station, and so on in succession for each of the mobile stations which are within the service area. In that way, communication can be executed with each of the mobile stations which are within the service area, by time-sharing operation.

Figure 20:
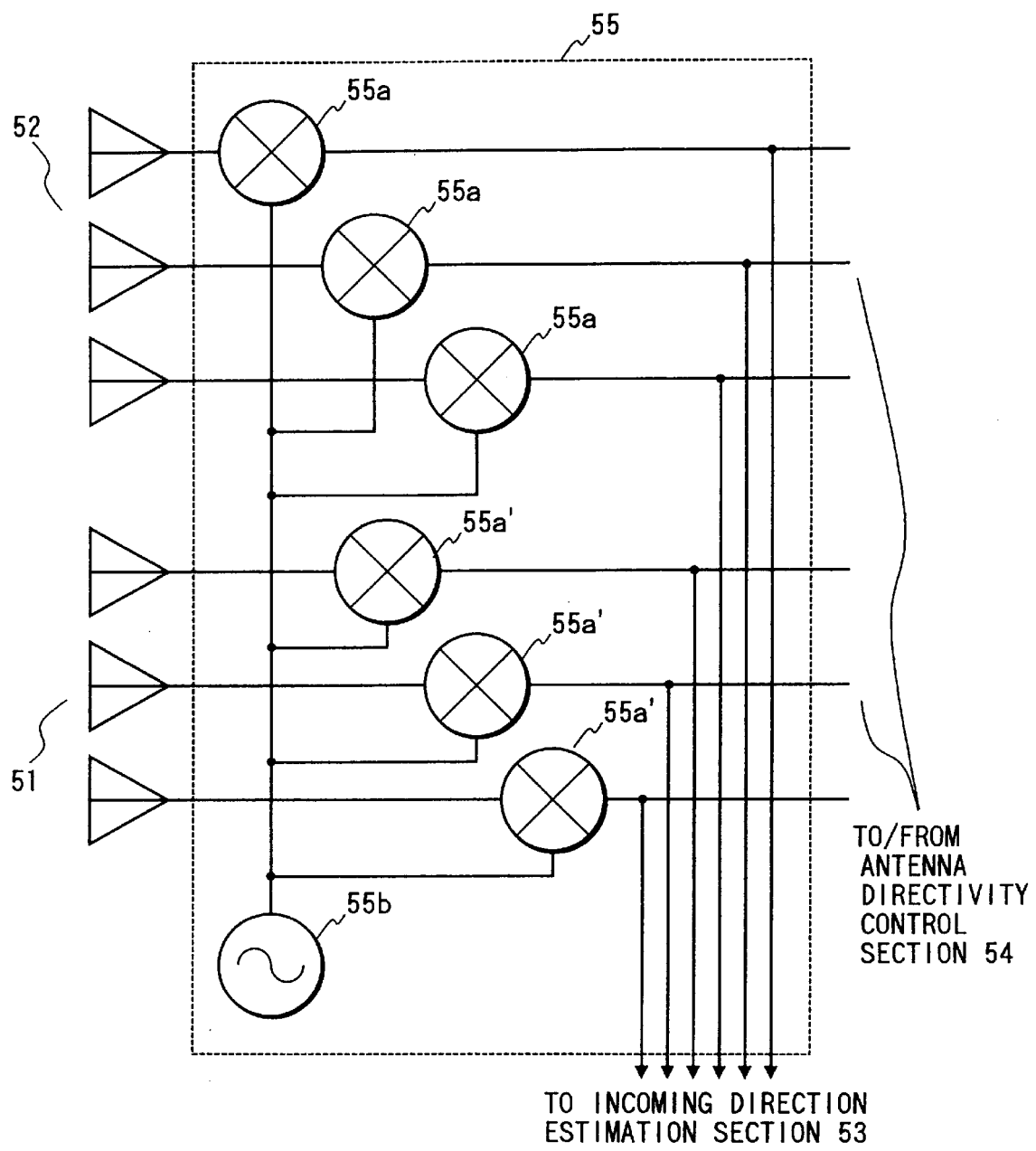
FIG. 20 is a general circuit diagram of a frequency converter section in the embodiment of FIG. 19.
Figure 21:
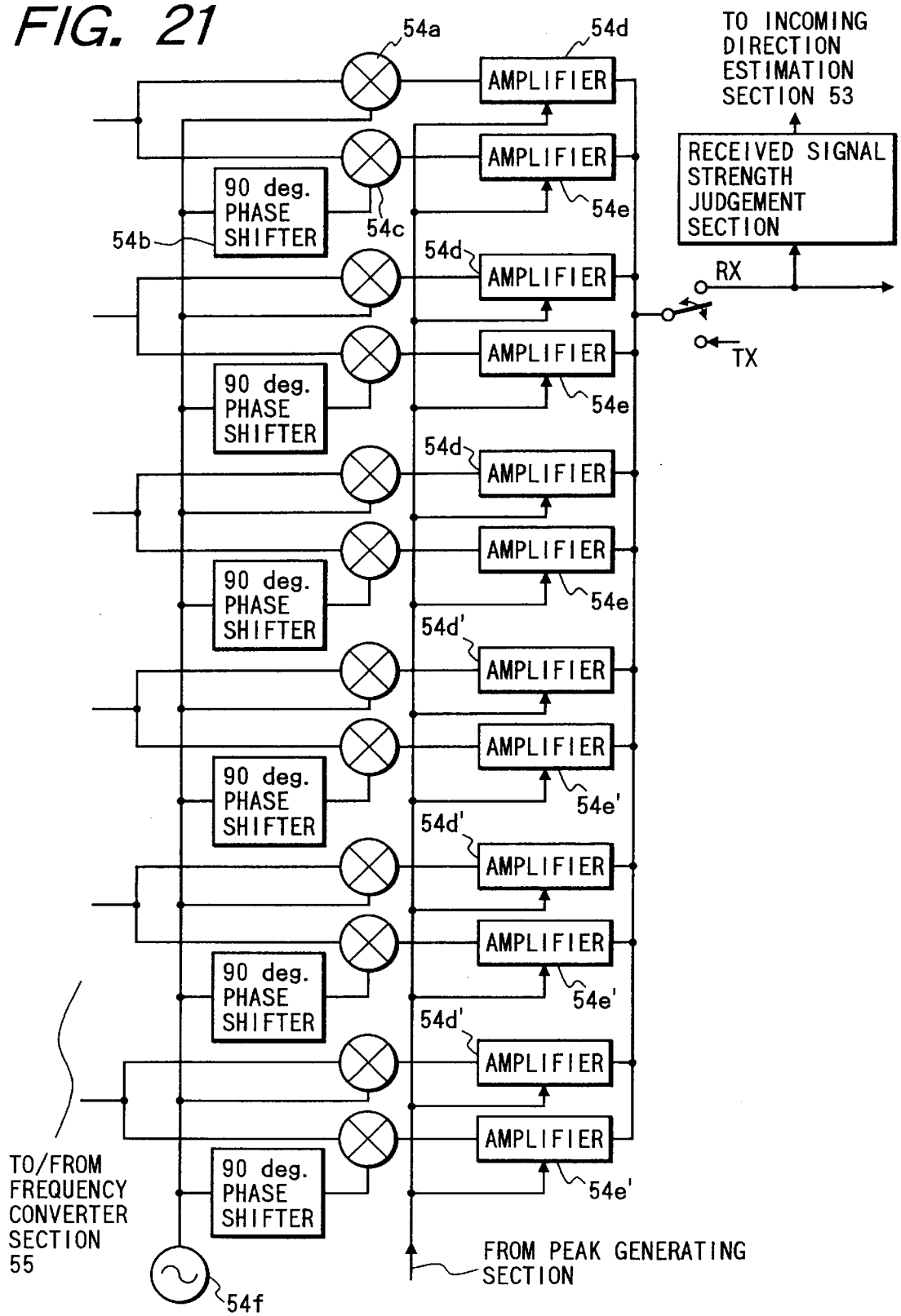
FIG. 21 is a general circuit diagram of an antenna directivity control section in the embodiment of FIG. 20.

FIG. 20 shows the internal configuration of the frequency converter section 55, while FIG. 21 shows the configuration of the antenna directivity control section 54 of this embodiment. As shown, the received I.F. signals from each of the elements of the antennas 51, 52 are made available to the incoming direction estimation section 53. In addition, as shown in FIG. 21, the transmission signals and received signals of each of the antenna elements of both the first and second array antennas 51 and 52 can be controlled in phase and amplitude by means of the amplification factor control signals which are supplied to the amplifiers 54d, 54e from the peak generating section 57. This enables the peak generating section 57 to form a single directivity beam, i.e. a single peak of the directivity, and to successively sweep that peak throughout the entire control range as described above. In particular, in the case of array antennas which provide 360° of azimuth coverage, such sweeping can be performed as successive complete rotations of the peak.

Figure 22B:
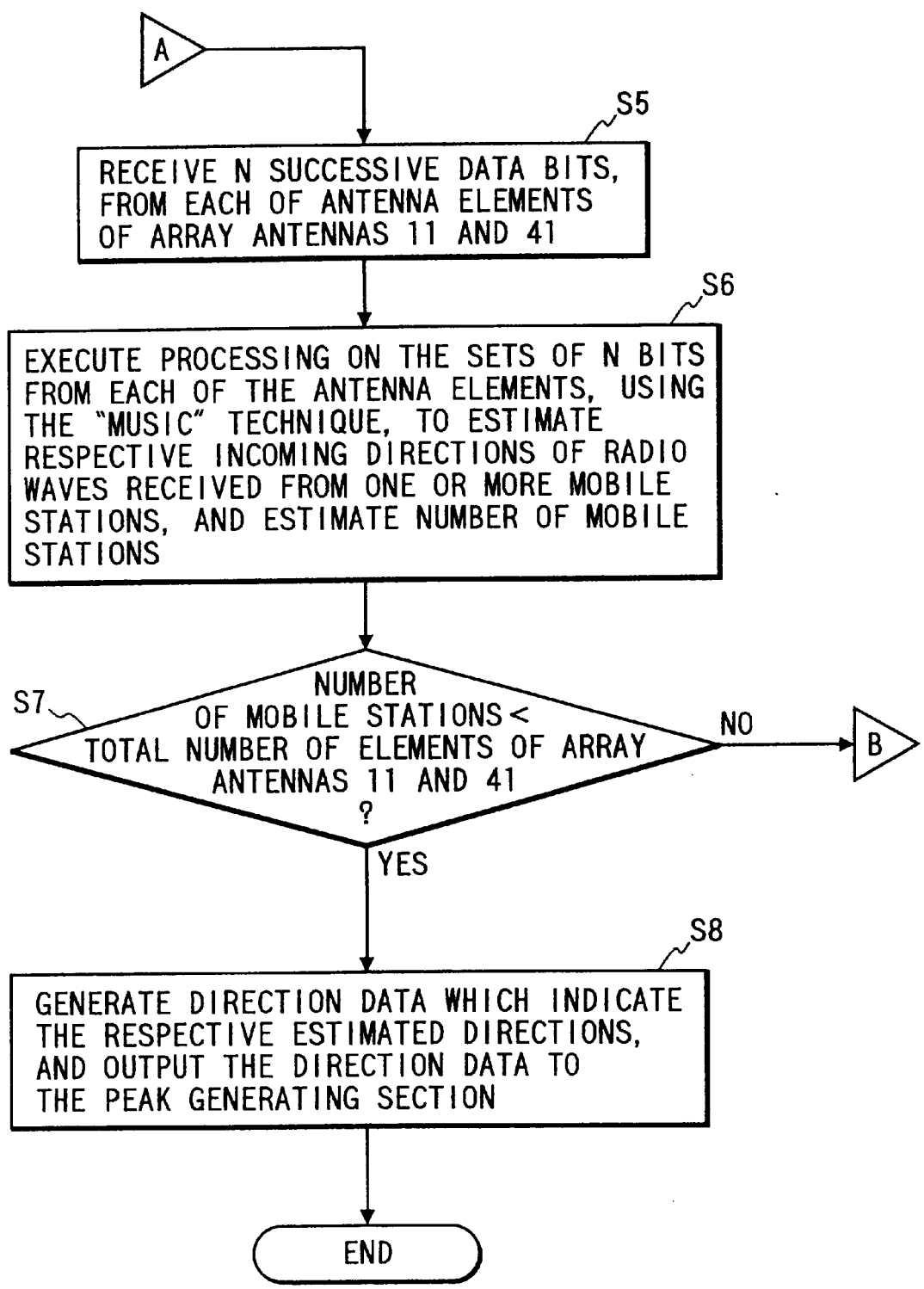

FIGS. 22A, 22B and 22C constitute a flow diagram of the processing performed by the incoming direction estimation section 53 of this embodiment. As shown in FIG. 22A, a decision step (S2) is performed to judge whether there is a possibility that the estimation results obtained by using only the received signals from the elements of antenna 51 may be incorrect. If there is such a possibility, then the processing shown in FIG. 22B is executed. Here again, a decision step (S7) is performed to judge whether there is a possibility that the estimation results obtained by using received signals from both antenna 51 and antenna 52 may be incorrect. If there is such a possibility, then the processing shown in FIG. 22C is executed, to perform the beam sweeping operation described above, by generating data expressing successively varying peak directions, and supplying these data to the peak generating section. It is assumed in the example of FIG. 22C that such operation is continued only for a predetermined time duration, designated as a sweep operation interval, whereupon operation returns to step S1 of FIG. 22A. As indicated by the steps in FIG. 22C, it is assumed that each time radio waves are detected from a mobile stations which is within the service area of the base station, the sweeping is halted, i.e. the direction data supplied to the peak generating section are held unchanged during an interval in which communication between the base station and that mobile station takes place. This could be a fixed interval, or an interval having the duration necessary for a particular communication. The sweeping is then resumed, until radio waves from another mobile station within the service area are detected, and so on, until the end of the sweep operation interval is detected.

From the above description it can be understood that a basic advantage of this embodiment, by comparison with each of the preceding embodiments, is that the number of mobile stations which can be handled by a base station is not limited by the total number of array antenna elements from which received signals can be obtained for the purpose of incoming direction estimation. That is to say, even if the number of mobile stations within the service area of a base station is greater than the total number of array antenna elements, then sweeping of an antenna directivity peak can be performed, to successively detect and communicate with each of the mobile stations in the service area.

It would of course be equally possible to combine such a sweep/detection feature with the first or second embodiments of a directivity control antenna apparatus, to obtain the advantage described above.

Figure 23:
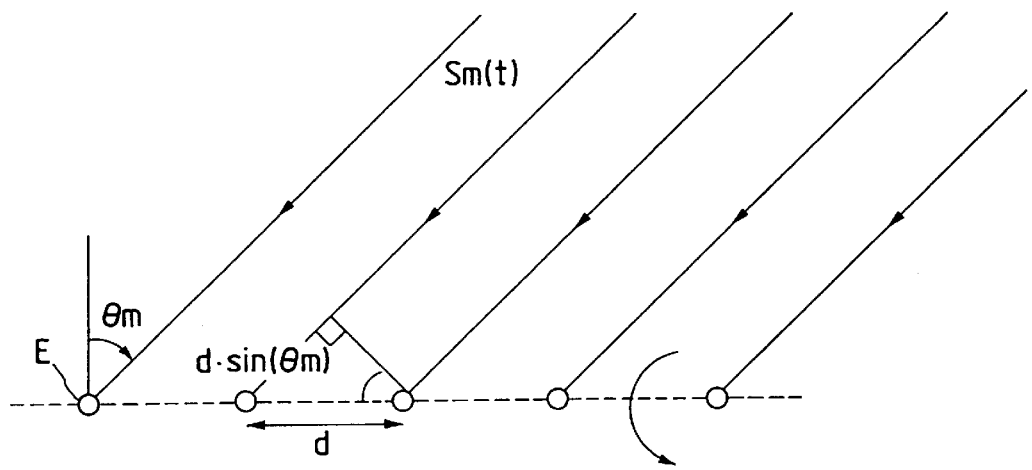
FIGS. 23, 24, 25, 26, 27A, 27B, 28A and 28B are conceptual diagrams for illustrating the principles of estimating a range of possible positions of a mobile station, as a line of intersection between the ground and a conic surface having a half-apex angle which is equal to the angle between the direction of incoming radio waves from the mobile station and the axis of a linear array antenna which receives the radio waves.
Figure 24:
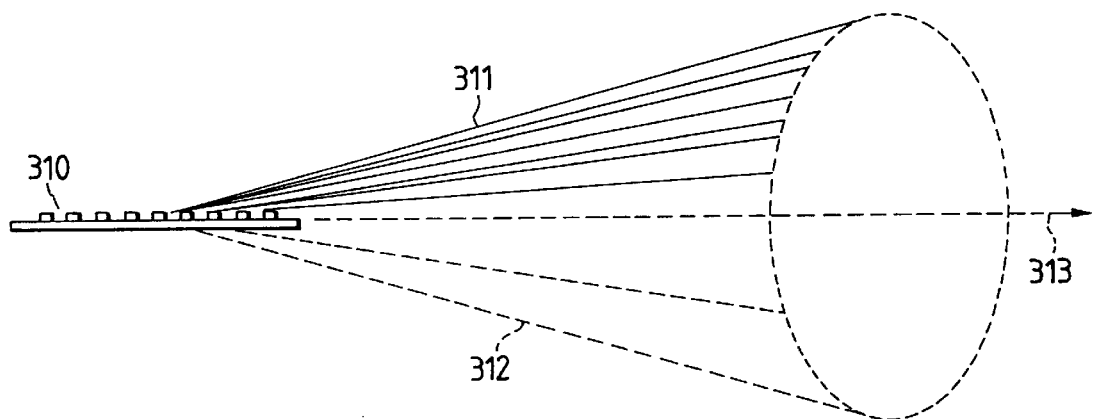

Before describing a fourth embodiment of the present invention, some basic principles of a linear array antenna which is an essential feature of that embodiment will be summarized, referring first to FIG. 23. This illustrates the relationship between radio waves Sm(t) which are incident on a linear array antenna having elements E that are arrayed with a spacing d. The incoming direction of the radio waves is expressed here by the angle em between that direction and a normal to the array direction of the antenna. As illustrated, there will be a phase difference between the signals obtained from adjacent elements of the antenna, due to the path difference d.sin Θm between the distance travelled by a wave front in reaching these elements. However when the incoming direction of radio waves is estimated for such an antenna, e.g. by using the MUSIC method, and if the antenna can receive radio waves from directions extending in 360° about its array axis, then the angle which is thereby estimated represents the half-apex angle of a cone, whose surface defines all of the possible directions from which the radio waves are actually arriving. This is illustrated in FIG. 24, for a linear array antenna 310 having its array axis along the line 313. If the antenna 310 can receive radio waves from only one side (i.e. can have directivity in a range of 180° of azimuth, with substantially no directivity in elevation) as is the case for a horizontally extending microstrip antenna or array of dipoles having respective rear reflectors, then the range of possible incoming directions of the radio waves will form a half-cone 311, as shown. In the following, this will be referred to as the incoming direction half-cone.

Figure 25:
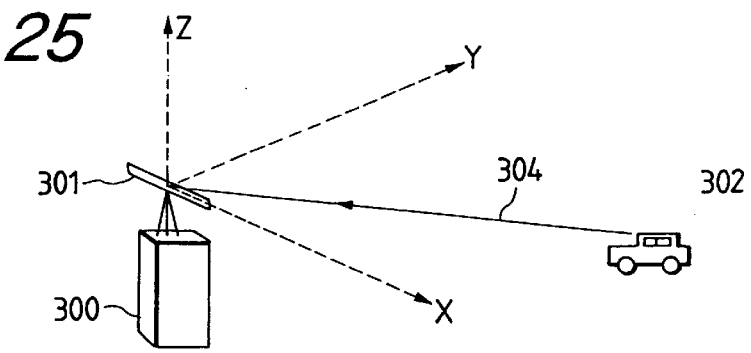

FIG. 25 conceptually illustrates the relationship between the linear array antenna 301 of a base station 300 and a mobile station 302 which is transmitting radio waves which reach the antenna 301 along a direction indicated by line 304. The xyz coordinate system shown in FIG. 25 will be used to describe this relationship, i.e. with the center of the antenna 301 as the origin point.

Designating the height of antenna 301 above ground level as h (i.e. ground level is –h), and the angle of incoming radio waves from a mobile station as Θ(as measured from the x-axis), then the line of intersection between the incoming direction half-cone and ground can be expressed as:

$$y^2 = x^2 \tan^2 \Theta - h^2$$

Figure 26:
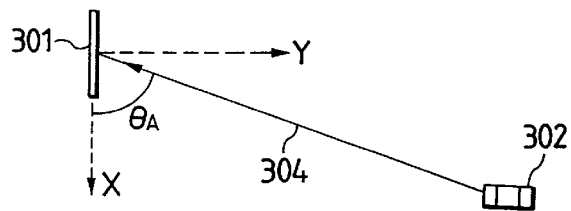
Figure 27A:
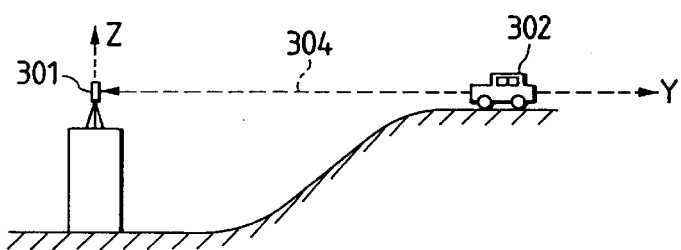
Figure 27B:
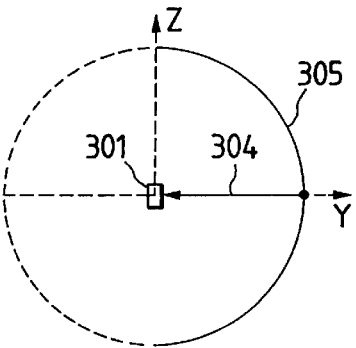

The position relationship, as viewed in plan, is shown in FIG. 26, with the azimuth angle of the mobile station 302 with respect to the antenna 301 designated as $\Theta_A$ (measured from the x-axis). If the angle of elevation of the mobile station 302 with respect to the array antenna 301 is small (i.e. the mobile station 302 is at substantially the same height as antenna 302, or is sufficiently distant from the antenna 301 in relation to any height difference) as illustrated in the view along the x-axis of FIG. 27A, then the incoming direction of the radio waves from mobile station 302 will represent the azimuth angle of mobile station 302 with respect to the antenna 301. This can be understood from FIG. 27B in which 305 denotes the aforementioned incoming direction half-cone, as viewed along the x-axis. The preceding embodiments are based upon this assumption, i.e. that the angle of elevation of each mobile station is sufficiently small.

Figure 28A:
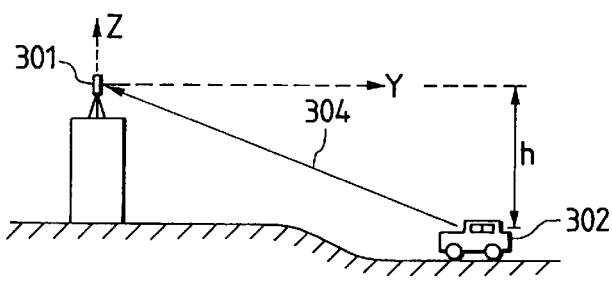
Figure 28B:
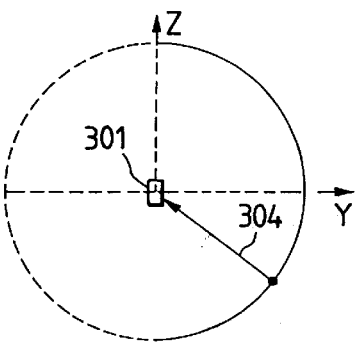

However if the angle of elevation is significant, as illustrated in FIG. 28A then as can be understood from FIG. 28B, the incoming direction of the received radio waves from mobile station 302 may not accurately express the azimuth direction of the mobile station. If the position of the mobile station 302 can be estimated, then (e.g.with the position expressed in polar coordinates) the azimuth direction of the mobile station can be accurately obtained. Furthermore, if the position is known, then the level of transmitted power which is directed from the base station to the mobile station during communication with the mobile station can be set to an appropriate level, with respect to the distance of the mobile station from the base station, i.e. the directivity of the antenna can be accurately established such as to more effectively eliminate interference with other base stations and mobile stations of the mobile communication system. For these reasons, the fourth embodiment of the present invention enables the position of an mobile station to be estimated by a base station, before beginning communication with that mobile station.

Figure 29:
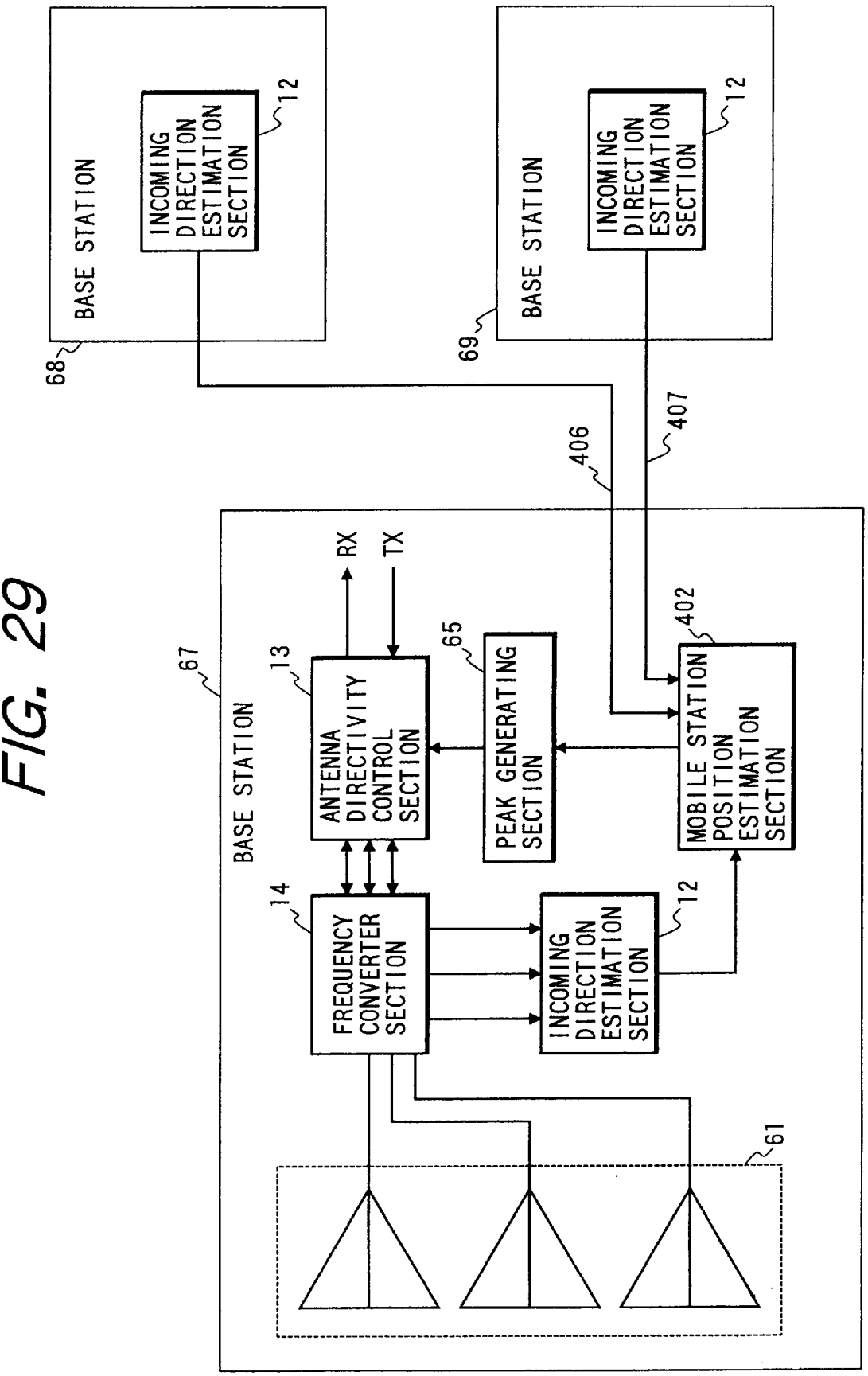
FIG. 29 is a general system block diagram of a fourth embodiment of the present invention, enabling estimation of respective positions of mobile stations by a base station.

FIG. 29 is a system block diagram of the fourth embodiment of a directivity control antenna apparatus. In FIG. 29 a base station 67 has a linear array antenna 61, a incoming direction estimation section 12, an antenna directivity control section 13 and a frequency converter section 14, each as described above for the preceding embodiments. The control signals for the antenna directivity control section 13 are generated by a peak generating section 65 in this embodiment. The function of the peak generating section 65 is similar to that of the peak generating section 15 of the preceding embodiments, but differs in that the amplification factor control signals genarateed by the peak generating section 65 cause the antenna directivity control section 13 to form a peak which is shaped in accordance with the position of a mobile station with which communication is in progress, i.e. with the peak being oriented in azimuth direction, but with the magnitude of the peak being determined in accordance with the line-of-sight distance of that mobile station. Incoming direction data produced by the incoming direction estimation section 12 are supplied to a mobile station position estimation section 402. The base station 67 is connected by communication cables 406, 407 to other adjacent base stations of the system such as base stations 68, 69. The estimated incoming direction data obtained by the incoming direction estimations sections of each of these other base stations are supplied to the mobile station position estimation section 402 of the base station 67, and based on the data thus supplied, the mobile station position estimation section 402 calculates the estimated positions of respective mobile stations. When the base station 67 is to perform communication with a mobile station for which an estimated position has been obtained, data 403 specifying the azimuth direction and the line-of-sight distance of that mobile station are supplied from the mobile station position estimation section 402 to the peak generating section 65, to thereby achieve shaping of the directivity of the linear array antenna 61 that is appropriate for the position of that mobile station.

FIG. 30 is a diagram for illustrating the basic principles of position estimation which is performed by the mobile station position estimation section 402. In FIG. 30, 61, 73 and 75 respectively denote the linear array antennas of the base stations 67, 68, 69 of FIG. 29. Based on the incoming direction information for one specific mobile station that is obtained by its own incoming direction estimation section 12 and by each incoming direction estimation section of the base stations 68, 69, the mobile station position estimation section 402 of base station 67 calculates the line of intersection between the incoming direction half-cone for that mobile station, as described above. It will be assumed in the following that this calculation assumes the respective value of height h for each of the base stations to be a constant, i.e. the ground is assumed to be flat. The resultant lines of intersection 72, 74, 76 are thereby obtained, with the location of the desired mobile station being the point of intersection 77.

If the ground is actually flat, then it would only be necessary to obtain two of such lines of intersection, to estimate the position of a mobile station. However since this will not generally be true (i.e. the value of h is not constant) three lines of intersection are utilized, for greater accuracy of position estimation. This can be understood by referring to FIG. 31, in which it is assumed that the mobile station in question is actually located at a higher level than is assumed in the calculation of the lines 72, 74, 76. In that case, these lines of intersection will not meet at a single point, but will have three separate intersection points as shown. However the position of the mobile station in this case, i.e. point 77, is obtained by the mobile station position estimation section 402 as the median point between these three points of intersection.

The position information which is thereby obtained is made available to other base stations of the system, via the aforementioned communication cables 406, 407. After having estimated the position of a mobile station, the base station which is closest to that mobile station, or the base station (of those base stations which are sufficiently close to the mobile station) that is currently communicating with the smallest number of mobile stations, then executes communication with that mobile station.

FIG. 32 is a flow diagram of the processing which is performed by the mobile station position estimation section 402 to estimate the position of a mobile station. Although step S3 is defined in that diagram as a step of finding the point of intersection between the three lines of intersection between incoming direction half-cones and the ground, since as described above these three lines may not actually intersect at a single point, step S3 will in general consist of finding the aforementioned median point, i.e. a point which is located equidistant from each of the three lines of intersection, as the estimated position.

Assuming that the position information has been obtained in Cartesion coordinates, that information is then converted to polar coordinate form, in step S4, to thereby obtain the azimuth direction and the line-of-sight distance of the mobile station with respect to the antenna of the base station which will execute communication with the mobile station. These data are then supplied to the peak generating section of that base station, to accurately shape the antenna directivity produced by that base station in accordance with the position of the mobile station, i.e. to produce a pattern peak which is oriented in the azimuth direction of the mobile station and which provides a transmitted power level that is appropriate for the distance of that mobile station.

Although the above embodiment has been described for the use of three adjacent base stations to obtain data for use in estimating the position of a mobile station, it would be possible to use a greater number of base stations for that purpose, i.e. to obtain a greater number of lines of intersection between incoming direction half-cones and the ground, to achieve higher accuracy of position estimation.

Furthermore it would be possible to envisage various modifications of the above embodiment, for example by providing each base station with a source of stored topographic data showing variations in height of the surrounding area, for enabling the actual lines of intersection between the incoming direction half-cones and ground to be obtained, i.e. as lines in three dimensions.

Thus with this embodiment, by using linear array antennas, and using the estimated results obtained by the respective incoming direction estimation section of three or more base stations, it becomes possible to determine the position of a mobile station, and to thereby accurately set the antenna directivity pattern of a base station such as to enable communication between that mobile station and base station to be performed with a minimum possibility of interference with communication between other mobile stations and base stations.

Figure 33:
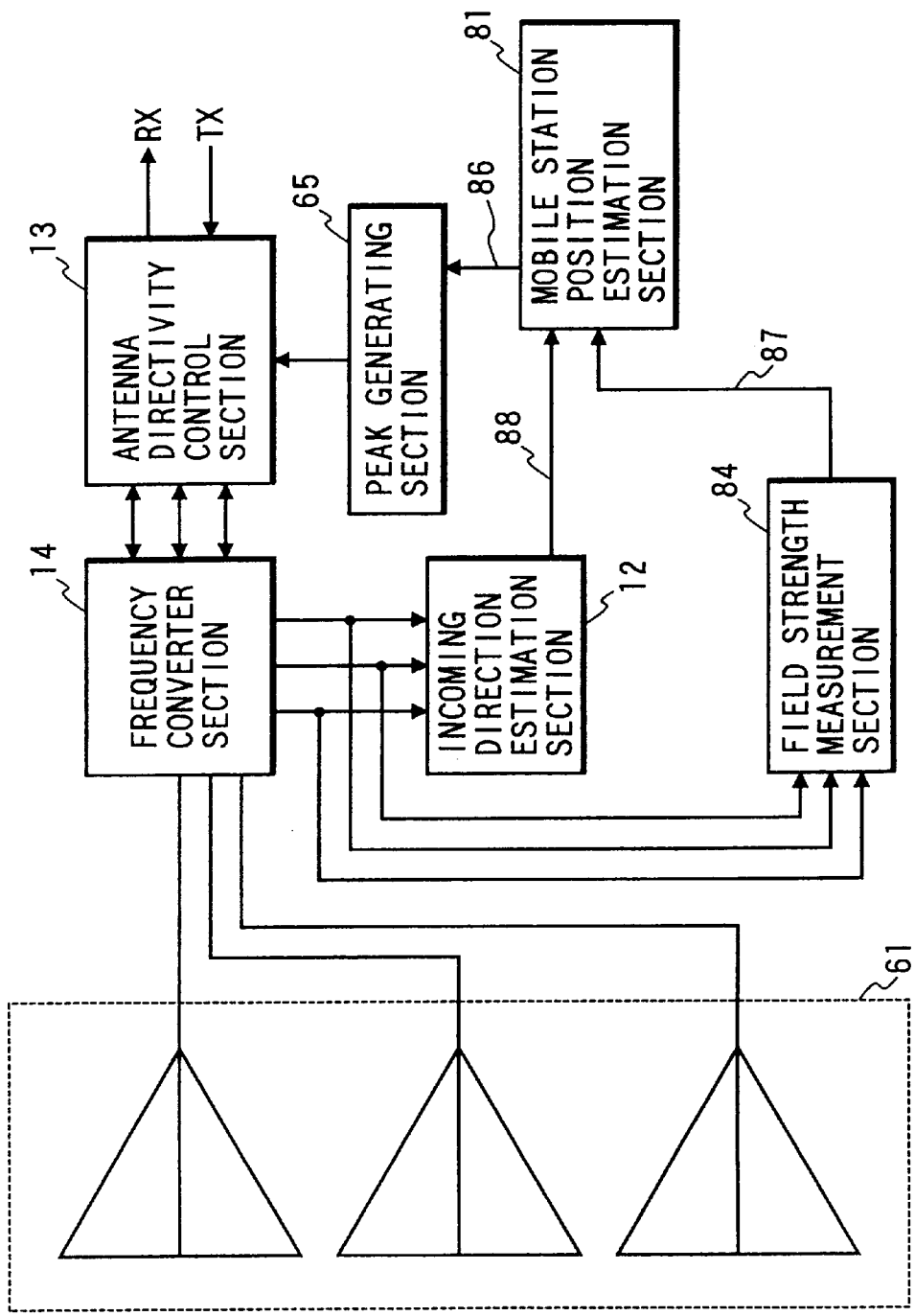
FIG. 33 is a general system block diagram of a fifth embodiment of the present invention, enabling estimation of respective positions of mobile stations by a base station.

FIG. 33 is a system block diagram of a fifth embodiment of a directivity control antenna apparatus according to the present invention. In FIG. 33 the respective functions of a linear array antenna 61, incoming direction estimation section 12, antenna directivity control section 13, frequency converter section 14 and peak generating section 65 are identical to those described for preceding embodiment, so that detailed description will be omitted. 84 is an electric field strength measurement section which measures the electric field strength received from a mobile station, i.e. based on the received signal strength received from the mobile station, and 86 is a mobile station position estimation section, which receives input values 87, 88 from the field strength measurement section 84 and incoming direction estimation section 12 respectively. The mobile station position estimation section 84 supplies output values 86 to the peak generating section 65, expressing a combination of azimuth angle and line-of-sight distance for each mobile station whose position is estimated.

Figure 35:
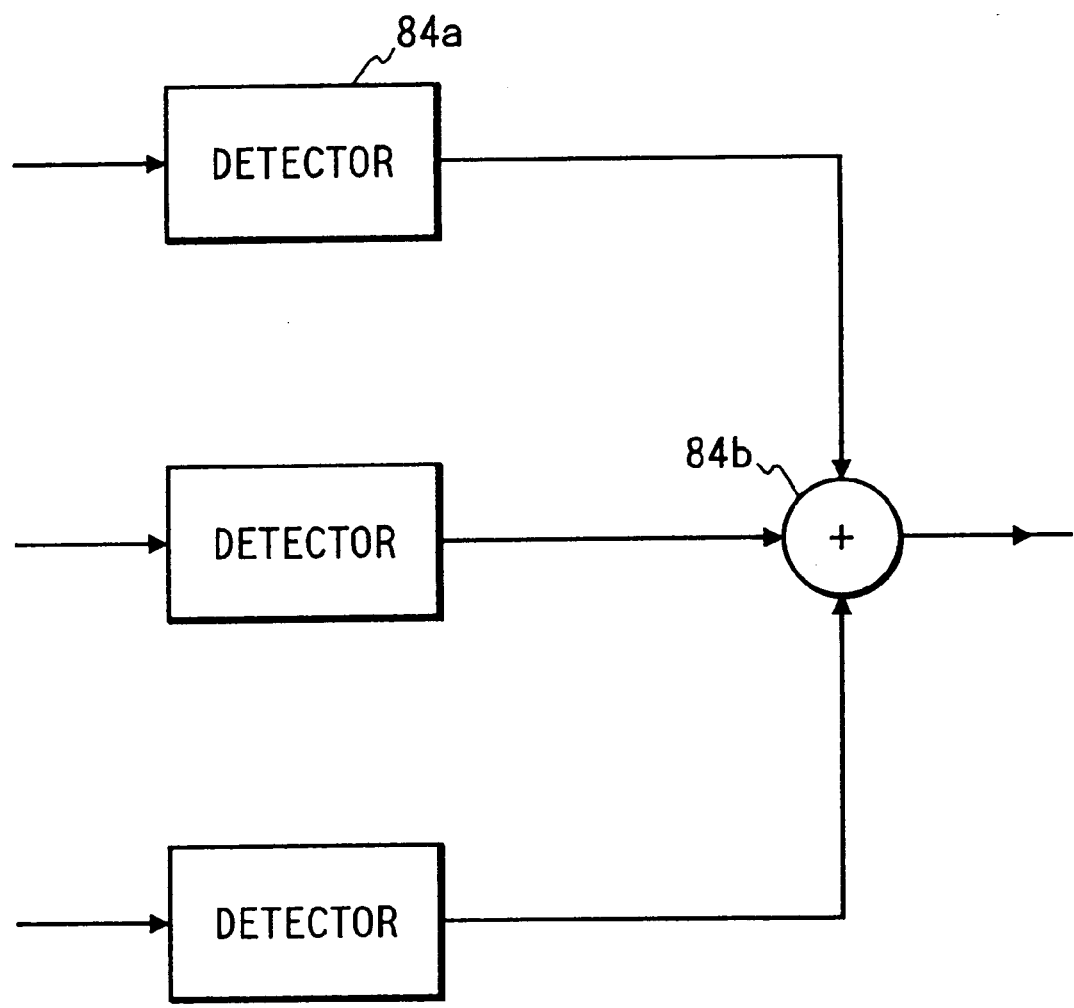
FIG. 35 is a circuit diagram of a field strength measurement section in the fifth embodiment.

The electric field strength measurement section 84 can be configured, as shown in FIG. 35, simply as a set of received signal strength detectors 84*a* which operate on the respective received signals of the elements of the array antenna 61, and whose output signals are summed in an adder 84*b*. The resultant sum signal can be subjected to analog-to-digital conversion by means not shown in the drawing, to be supplied as a digital data value to the mobile station position estimation section 81.

The operation of this embodiment is as follows. The level of received field strength from a mobile station is utilized as a measure of the line-of-sight distance of that mobile station from the antenna of the base station, i.e. since the rate of reduction of received field strength of radio waves with transmitted distance is known. Also, assuming that the ground around the base station is substantially flat, the angle of elevation of the mobile station can be calculated from the known height (h) of the antenna of the base station and the measured line-of-sight distance (r) of the mobile station. Alternatively stated, the estimated distance r of the mobile station can be considered to define a sphere of radius r, surrounding the base station antenna. The line of intersection between the surface of this sphere and the ground (whose height is −h, with respect to the antenna), that is to say, the locus of ground positions which are situated at line-of-sight distance r from the antenna 61, constitutes the range of possible locations of the mobile station. The antenna 61 is a linear array antenna as described for the preceding embodiment. The mobile station position estimation section 81 receives estimated direction data from the incoming direction estimation section 12, i.e. data specifying the angle of incoming radio waves received from a mobile station, with respect to the array axis of the antenna 61, calculates the set of positions constituting the line of intersection between the aforementioned incoming direction half-cone, i.e. in Cartesion (xy) coordinates, and then finds the point of intersection between that line of intersection and the line of intersection between the aforementioned spherical surface having radius r and the ground, to thereby obtain the estimated position of the mobile station.

The position information thus found is then converted to polar coordinates, to thereby obtain the desired azimuth angle of the mobile station with respect to the array antenna 61. The azimuth angle and the line-of-sight distance value r are then supplied, as data 86, to the peak generating section 65, which thereby generates control signals for causing the antenna directivity control section 13 to produce an antenna directivity which is suitable shaped for communication with the mobile station whose position has been estimated.

Figure 34:
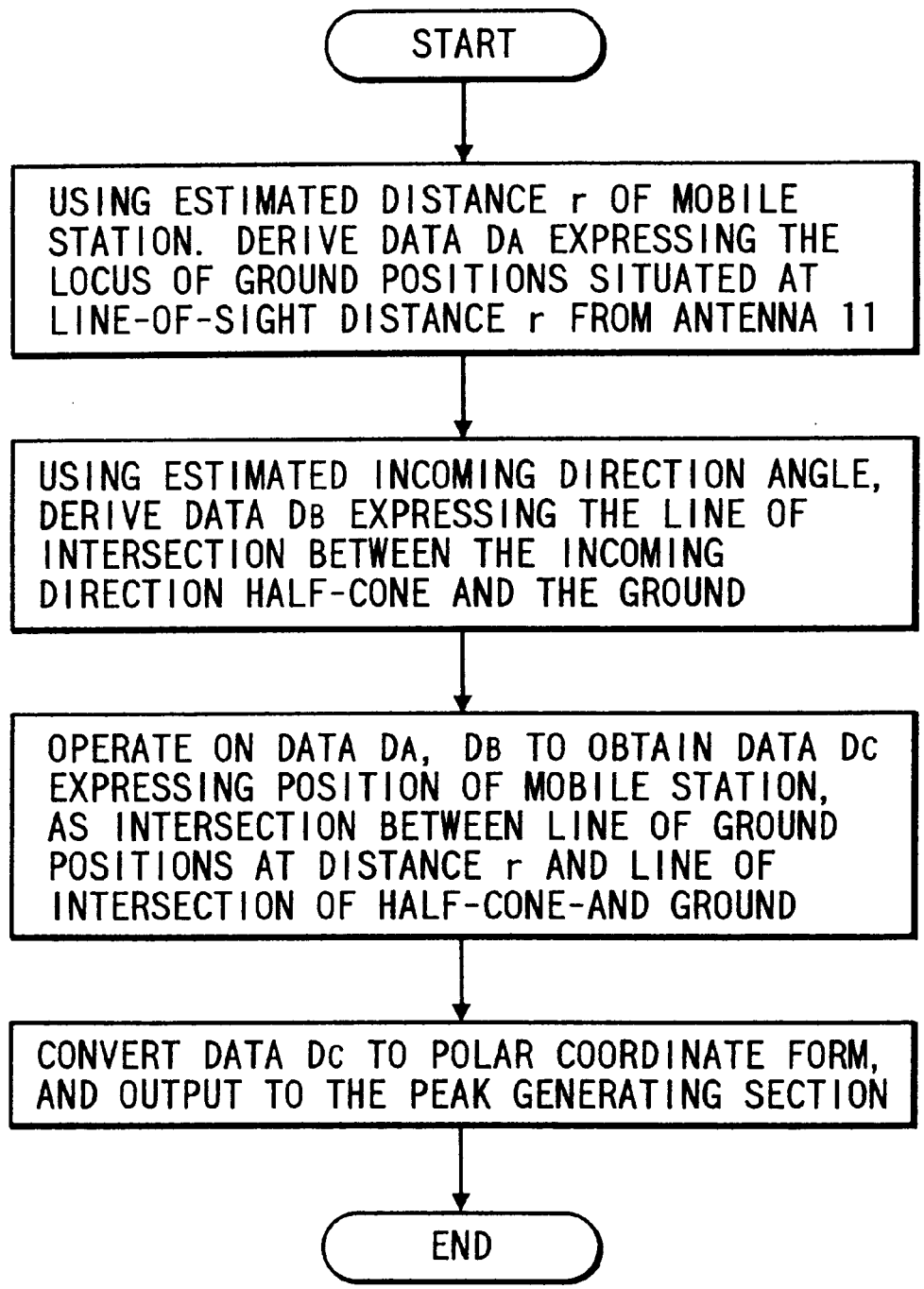
FIG. 34 is a flow diagram of the operation of a mobile station position estimation section in the fifth embodiment of FIG. 33.

FIG. 34 is a flow diagram showing the processing sequence which is executed by the mobile station position estimation section 81 in that case.

With this embodiment, as described for the preceding embodiment, it would also be possible to utilize stored topographic data for the region surrounding a base station, to more accurately determine the line of intersection between an incoming direction half-cone and the ground surface, i.e. as a line in three-dimensional space.

It would of course be equally possible to use only polar coordinates in performing the above position estimation procedure. That is to say, using the value of height of the base station antenna, the respective values of angle of elevation of points along the line of intersection of the incoming direction half-cone and ground can be calculated, the angle of elevation of the mobile station can be estimated from the estimated line-of-sight distance of the mobile station and the antenna height above ground level, and that value of angle of elevation can then be compared with each of the values of angle of elevation obtained for the incoming direction half-cone line of intersection, to find the required position of the mobile station, i.e. to find the position on the line of intersection between half-cone and ground which has the same value of angle of elevation as that obtained using the estimated distance of the mobile station.

From the above it can be understood that with this embodiment of the invention when a mobile station is present within the service area of a base station, the base station can estimate the position of the mobile station by measuring the electric field strength of the radio waves which are received by the base station from the mobile station, to thereby estimate the distance of the mobile station from the antenna of the base station. The apparatus then uses the estimated distance, in conjunction with the estimated incoming direction of the radio waves from that mobile station, to estimate the position of the mobile station, and then uses the position information to suitably shape the directivity of the antenna of the base station such as to enable communication to be performed with the mobile station, while minimizing the possibility of interference with communication between other mobile stations and base stations.

FIG. 36 is a system block diagram of a sixth embodiment of a directivity control antenna apparatus according to the present invention. In FIG. 36, 90 is a base station, having a linear array antenna 61, a incoming direction estimation section 12, an antenna directivity control section 13, and a peak generating section 65, each of which performs a similar function to that described for correspondingly numbered sections of preceding embodiments, so that detailed description will be omitted. The base station 90 further includes a mobile station position estimation section 91, which receives incoming direction data 94 from the incoming direction estimation section 12 and also receives the received baseband signal as an input 96, for use in estimating the received signal strength as described hereinafter. The mobile station position estimation section 91 produces estimated position data for each of respective mobile stations, i.e. azimuth angle and line-of-sight distance data as described for the preceding embodiment, which are supplied to the peak generating section 65.

450 denotes a mobile station which is assumed to be within the service area of the base station 90. The mobile station 450 is provided with a displacement vector generating section 452, which periodically functions to define a first time point ($T_1$), and at a second time point ($t_2$) after a fixed time interval, to derive data expressing a displacement vector which represents an amount and direction of displacement of the mobile station 450 that has occurred since the first time point ($T_1$). The displacement vector data are supplied to a data transmitting section 453, to be transmitted by radio to the base station 90.

The respective occurrences of the time points $t_1$, $t_2$ are defined in the mobile station position estimation section 91 of the base station 90 as well as in the mobile station 450. This can be ensured either by predetermining these time points as occurring at regular fixed points along the time axis, or by transmitting synchronizing information by radio from the mobile station 450 to the base station 90.

Figure 37:
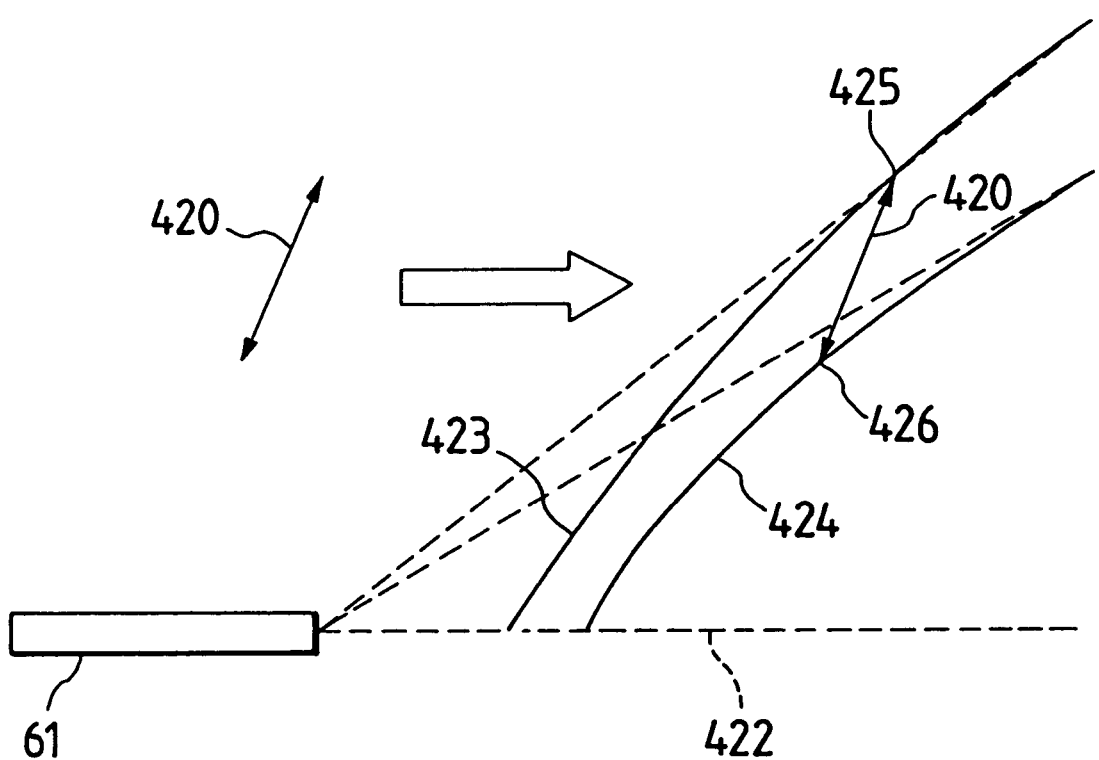
FIG. 37 is a conceptual diagram for illustrating the basic principles of the sixth embodiment.

The basic principles of this embodiment will be described referring to FIG. 37 which is a plan view of the linear array antenna 61, with the array axis of the antenna designated as 422. At a first time point $t_1$, the base station 90 receives incoming radio waves from the mobile station 450, the incoming direction estimation section 12 derives the incoming direction, i.e. angle of the incoming radio waves with respect to the array axis 422, and supplies the estimated direction data to the mobile station position estimation section 91. The mobile station position estimation section 91 then generates data expressing the incoming direction half-cone as described for the preceding embodiments, to obtain data expressing the line of intersection 423 between that incoming direction half-cone and the ground, and stores the data in memory. When time point $t_2$ is reached, the mobile station 450 transmits to the base station 90 data expressing a displacement vector 420, i.e. expressing the amount and direction of movement of the mobile station 450 which has occurred since time point $t_1$. At this time, the mobile station position estimation section 91 of the base station 90 receives a new value of estimated incoming radio wave direction from the incoming direction estimation section 12, and derives data expressing the new line of intersection between the incoming direction half-cone and the ground, with that line of intersection designated by numeral 424 in FIG. 37.

The mobile station position estimation section 91 then operates on the data expressing the displacement vector 420, the data expressing the line of intersection 423, and the data expressing the line of intersection 424, to find the pair of points which are located on lines 423 and 424 respectively, and which are separated by a vector distance which is identical to the displacement vector 420. These points are designated as 425 and 426 in FIG. 37, and it can be seen that point 426 represents the current estimated position of the mobile station 450 (i.e. at time point $t_2$), e.g. expressed in Cartesion (xy) coordinates.

The position data thus obtained are converted to polar coordinate form, using the estimated ground position thus obtained and the known height h of the antenna 61 above ground level, and the values of azimuth angle and line-of-sight distance of the mobile station 450 with respect to the antenna 61 are then supplied to the peak generating section 65, which thereby controls the antenna directivity control section 13 to perform phase and amplitude control to produce a suitably shaped antenna directivity for communication with the mobile station 450, as described for the preceding embodiments.

Figure 38A:
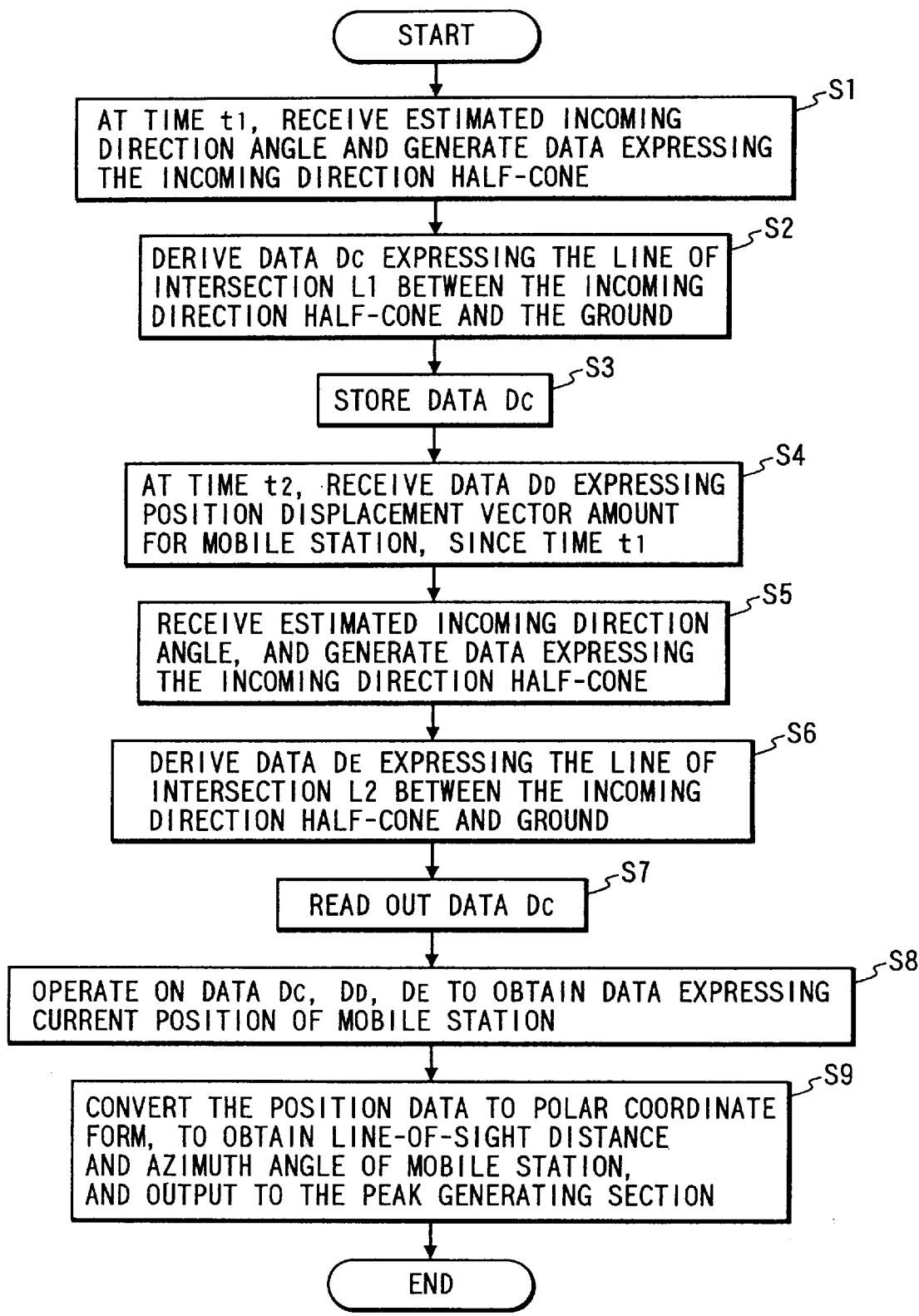
FIGS. 38A, 38B constitute a flow diagram of the operation of a mobile station position estimation section in the sixth embodiment of FIG. 36.
Figure 38B:
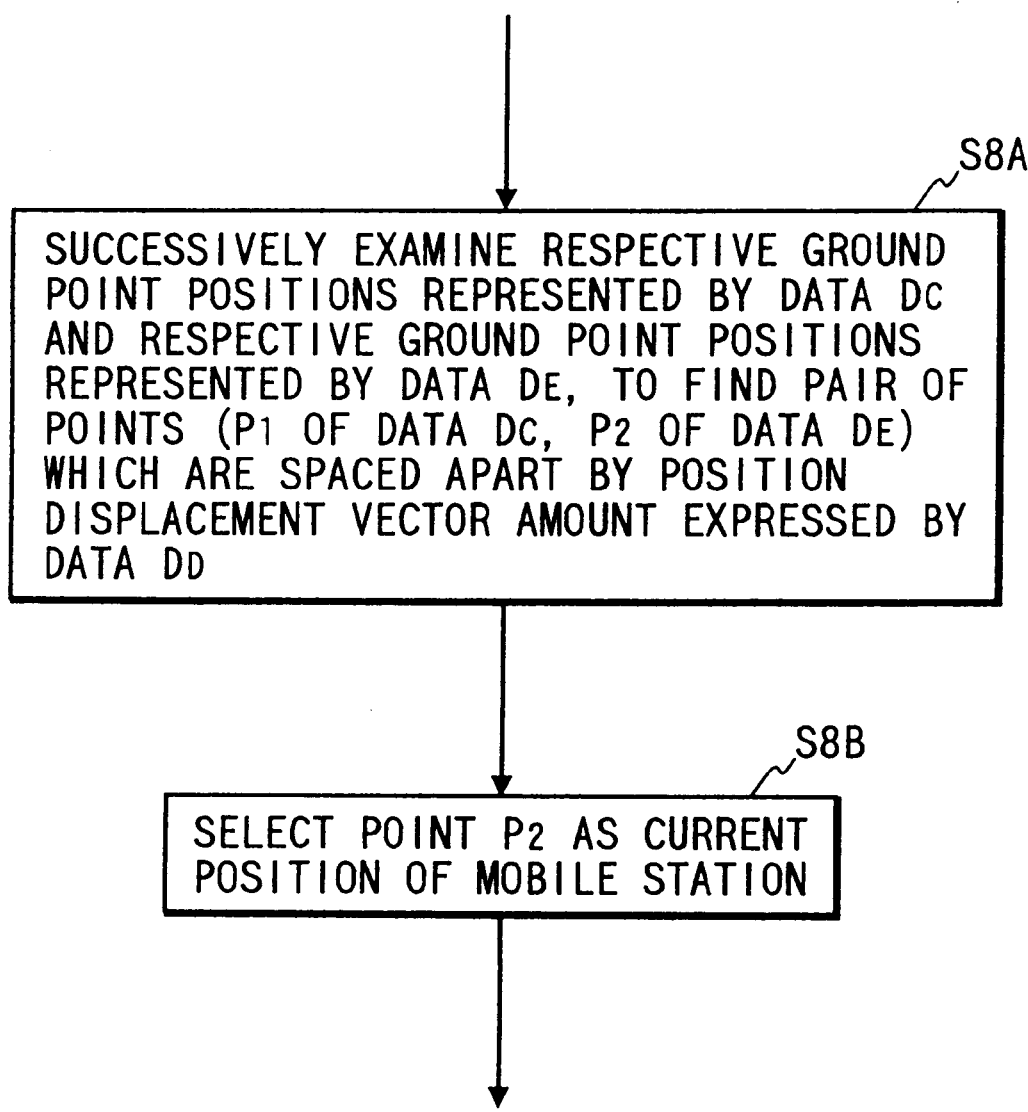

FIGS. 38A, 38B constitute a flow diagram of an example of the procedure executed by the mobile station position estimation section 91 to perform a mobile station position estimation as described above. In this example it is assumed that the data expressing the line of intersection between the incoming direction half-cone and ground are stored at the time point $t_1$ and subsequently read out and used at point $t_2$. However it would of course be equally possible to store only the incoming direction angle value, supplied from the incoming direction estimation section 12, at time $t_1$, and to perform all of the necessary calculation processing at time $t_2$. FIG. 38B shows the contents of a step S8 in FIG. 38A whereby the operation illustrated in FIG. 37 is performed to obtain the point 426 by utilizing the received displacement vector 420.

Figure 39:
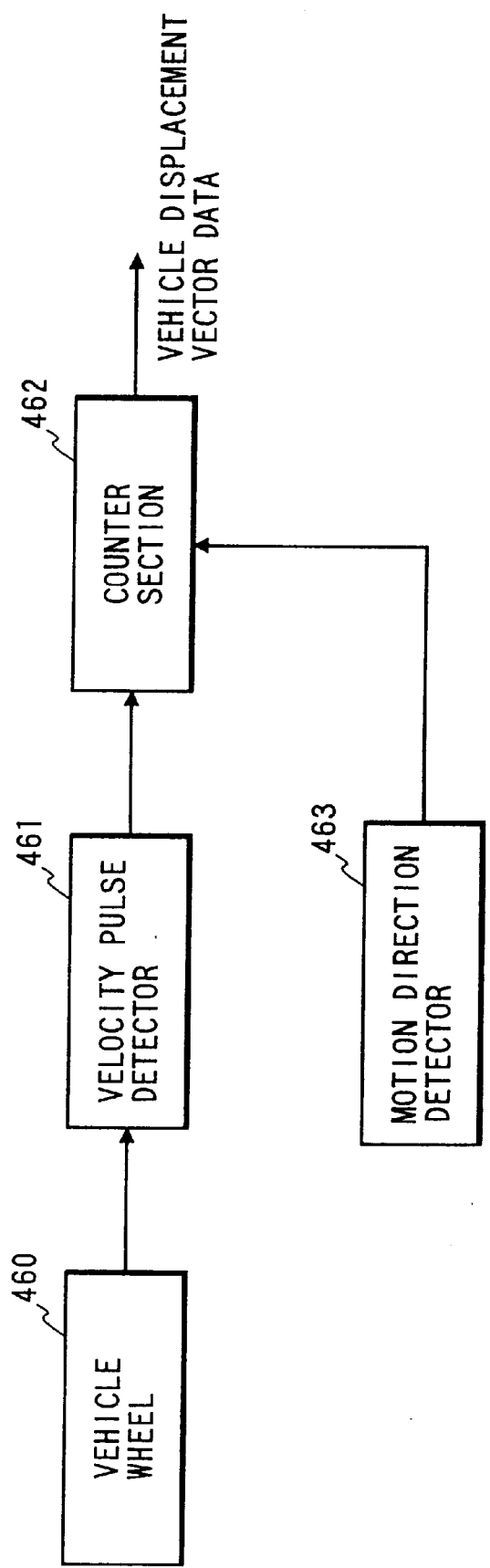
FIG. 39 is a basic system block diagram of a displacement vector generating section of a mobile station in the sixth embodiment.

Various arrangements could be envisaged for implementing the displacement vector generating section 452 of the mobile station 450. It is assumed with this embodiment that the mobile station 450 is a motor vehicle. Thus, the displacement vector generating section 452 could basically be configured as illustrated in the block diagram of FIG. 39. Here, pulses derived from the motion of a vehicle wheel 460 are obtained by a velocity pulse detector 461, and the pulses are supplied to a counter section 462, together with direction data supplied from a motion direction detector 463 which indicate the current direction of motion of the mobile station. The motion direction detector 463 can for example be based on a gyrocompass. The counter section 462 can for example be configured from a pair of reversible counters, i.e. a first counter which counts up and down in accordance with the magnitude and direction of the east-west component of the current state of motion of the vehicle, and a second counter which similarly counts up and down in accordance with the north-south component, and with each of the counters being reset to zero at the aforementioned time point $t_1$.

Figure 40:
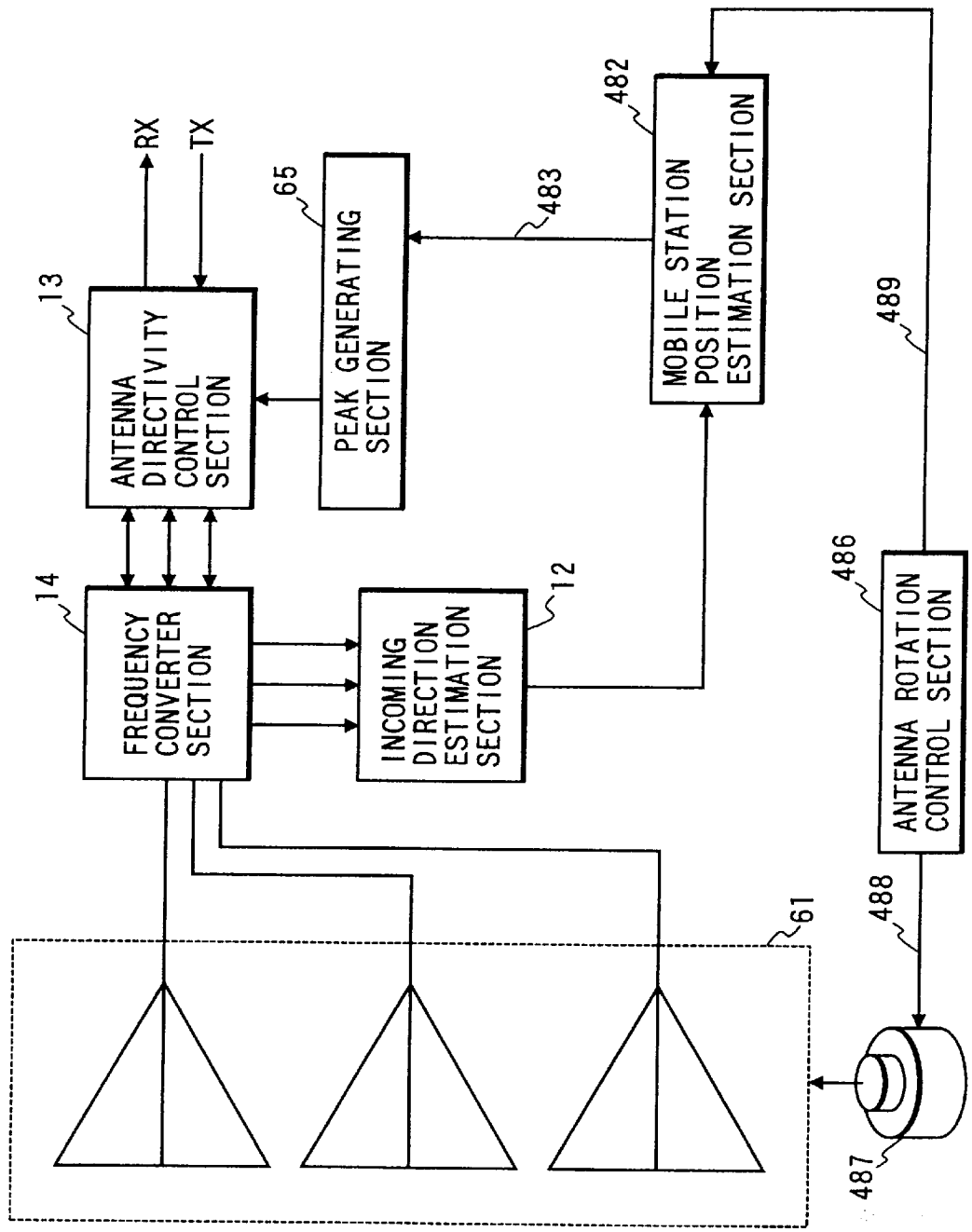
FIG. 40 is a general system block diagram of a seventh embodiment of the present invention, enabling estimation of respective positions of mobile stations by a base station, based on rotation of a linear array antenna.

FIG. 40 is a system block diagram of a seventh embodiment of a directivity control antenna apparatus according to the present invention. In FIG. 40, the linear array antenna 61, incoming direction estimation section 12, antenna directivity control section 13, frequency converter section 14 and 65 have respective functions which are identical to those described for the correspondingly numbered sections of preceding embodiments, so that detailed description of these will be omitted. 487 denotes an antenna rotator, for physically rotating the linear array antenna, with the array axis of the antenna rotating in a horizontal plane. The antenna rotator 487 is controlled by an antenna rotation control section 486. It will be assumed in the following that the antenna rotation control section 486 functions such as to periodically cause the rotator 487 to rotate the linear array antenna 61 through at least one complete revolution. When this rotation is in progress, the antenna rotation control section 486 sends notification data 489 to a mobile station position estimation section 482, specifying the successive azimuth angles to which the array axis of the antenna is rotated. The mobile station position estimation section 482 uses incoming direction information supplied thereto from the incoming direction estimation section 12 during that antenna rotation to estimate the respective positions of one or more mobile stations which are within the service area of the base station. The position information which is thus estimated is supplied to the peak generating section 65, to be utilized in controlling the antenna directivity control section 13 to perform phase and amplitude control of transmitted and received signals of the antenna elements such as to produce a suitable antenna directivity, as has been described for the preceding embodiments.

The operation of the directivity control antenna apparatus having the configuration set out above is as follows, referring first to FIG. 41. This is a plan view showing the antenna 61 rotating in the direction indicated by the arrow, with the array axis of the antenna 61 being rotated from a position 471 to a position 472 as shown. It will be assumed that the antenna axis is at position 471 at a first time point $t_1$, and attains the position 472 at a second time point $t_2$. At time point $t_1$, the mobile station position estimation section 482 receives data from the antenna rotation control section 486 indicating that the antenna axis is at the azimuth position 471, and receives incoming direction data from the incoming direction estimation section 12, expressing the angle between the antenna array axis and the incoming direction of radio waves received from a specific mobile station, and calculates data expressing the line of intersection between the corresponding incoming direction half-cone and the ground. That first line of intersection is designated by numeral 473 in FIG. 41. When the antenna 61 has rotated to position 472, at time point $t_2$, the above process is repeated, to obtain a second line of intersection 474 between the incoming direction half-cone and ground. The point of intersection between these two lines of intersection 473, 474 is then calculated, to thereby obtain the current position of the mobile station with respect to the xy plane. The known height of the antenna 61 is then used to obtain that position in terms of polar coordinates, to thereby obtain the azimuth direction and line-of-sight distance of the mobile station with respect to the antenna 61. That information is then supplied to the peak generating section 65.

Figure 41:
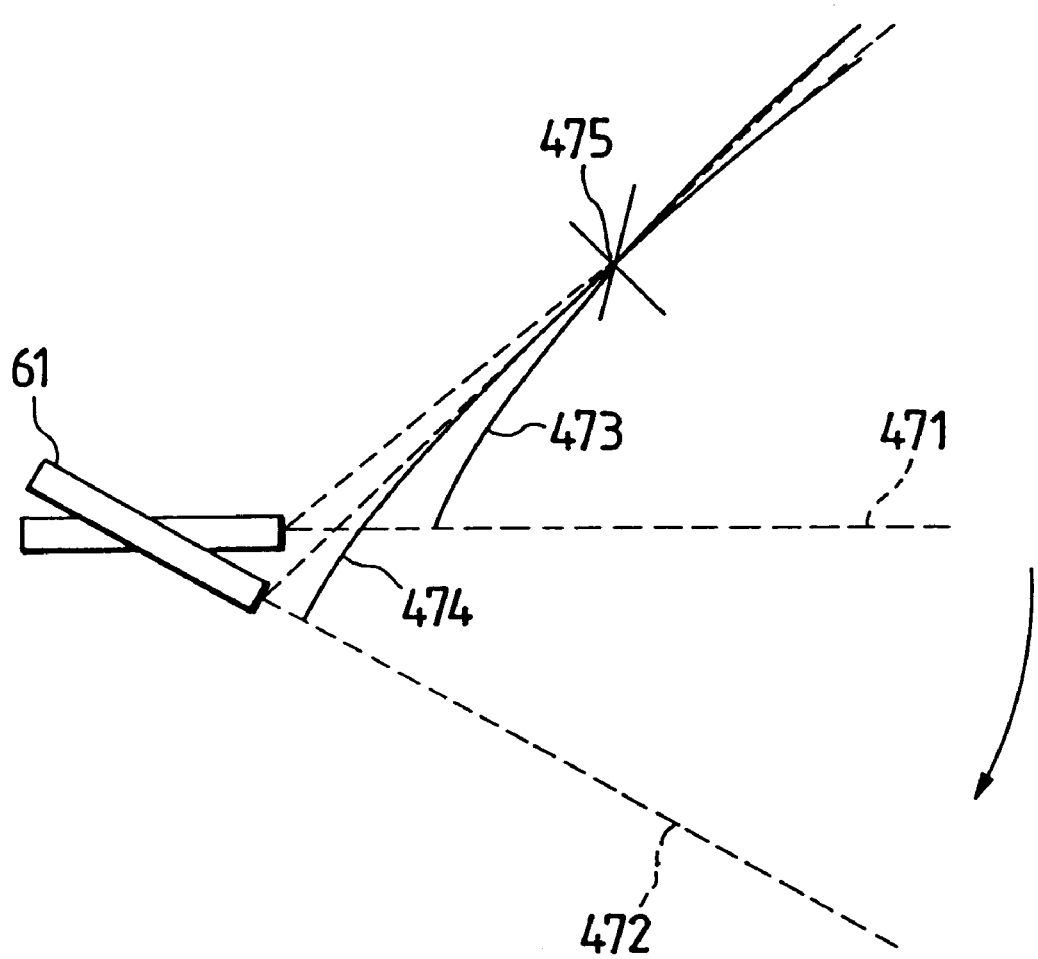
FIG. 41 is a conceptual diagram for illustrating the basic principles of the seventh embodiment.

In order to obtain greater accuracy of position estimation, it is preferable to use direction information obtained at three or more successive angular positions of the antenna, for estimating the mobile station position, rather than utilizing only two angular positions as in the example of FIG. 41.

Figure 42:
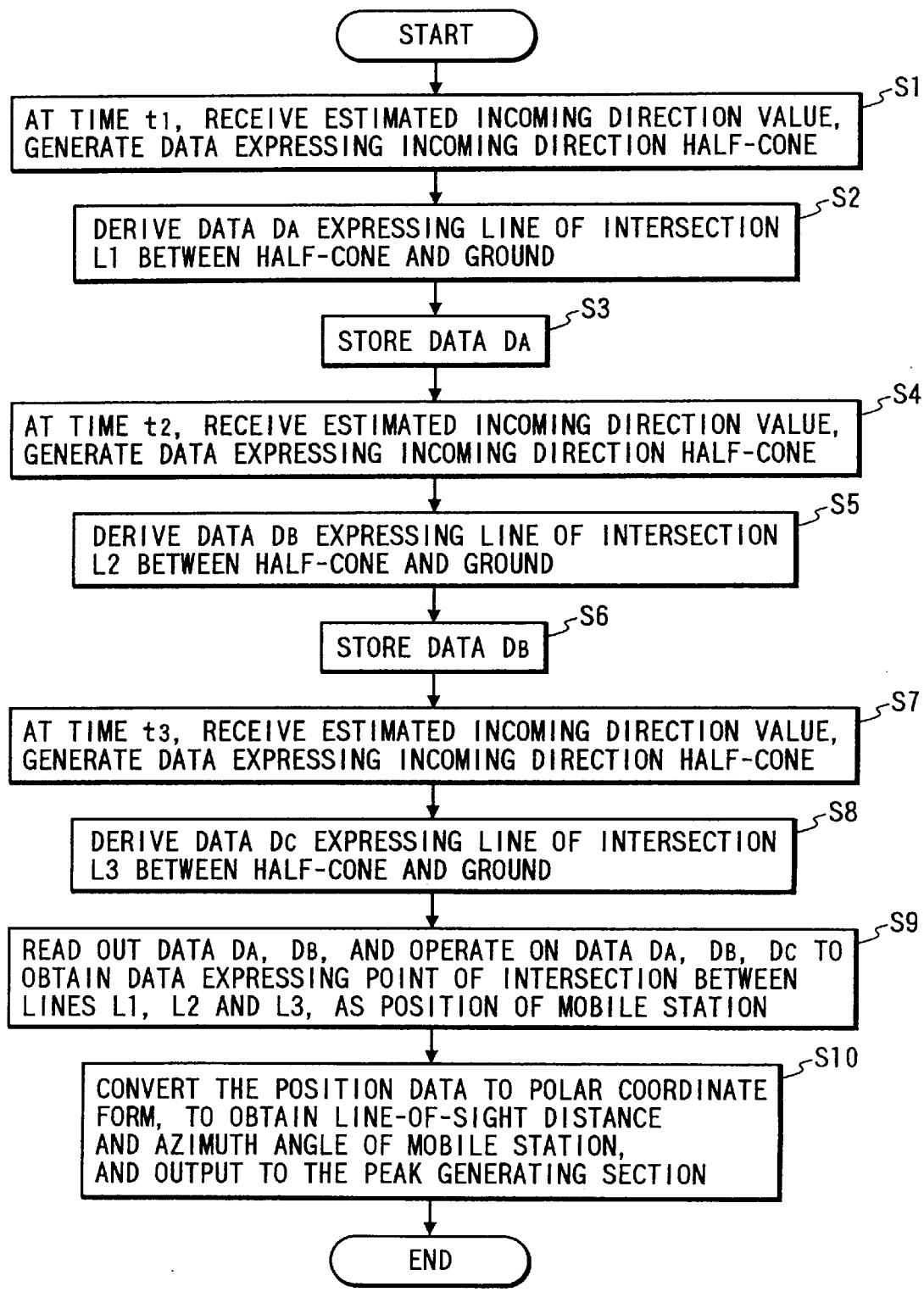
FIG. 42 is a flow diagram of the operation of a mobile station position estimation section in the seventh embodiment.

FIG. 42 is a flow diagram of the processing sequence performed by the mobile station position estimation section 482 to obtain position information as described above, for the case in which direction information obtained at three successive angular positions of the array antenna 61 is utilized to estimate the position of a mobile station. Although it is assumed in FIG. 42 that data expressing the line of intersection between an incoming direction half-cone and ground are stored in each of steps S3 and S6, to be used in the calculation step S9, it would of course be equally possible to store only the respective incoming direction information in the steps S3 and S6, i.e. at time points $t_1$ and $t_2$, and to perform all of the necessary calculation processing to obtain the three lines of intersection between the respetive incoming direction half-cones in step S8, i.e. at time $t_3$.

Thus with this embodiment of the invention, as described above, by rotating a linear array antenna within a horizontal plane, the position of a mobile station can be estimated as a point of intersection obtained from estimation results obtained for respective rotation angles of the antenna. The position information can then be utilized for appropriately shaping the directivity of the antenna, as described for the preceding embodiments.

Figure 43:
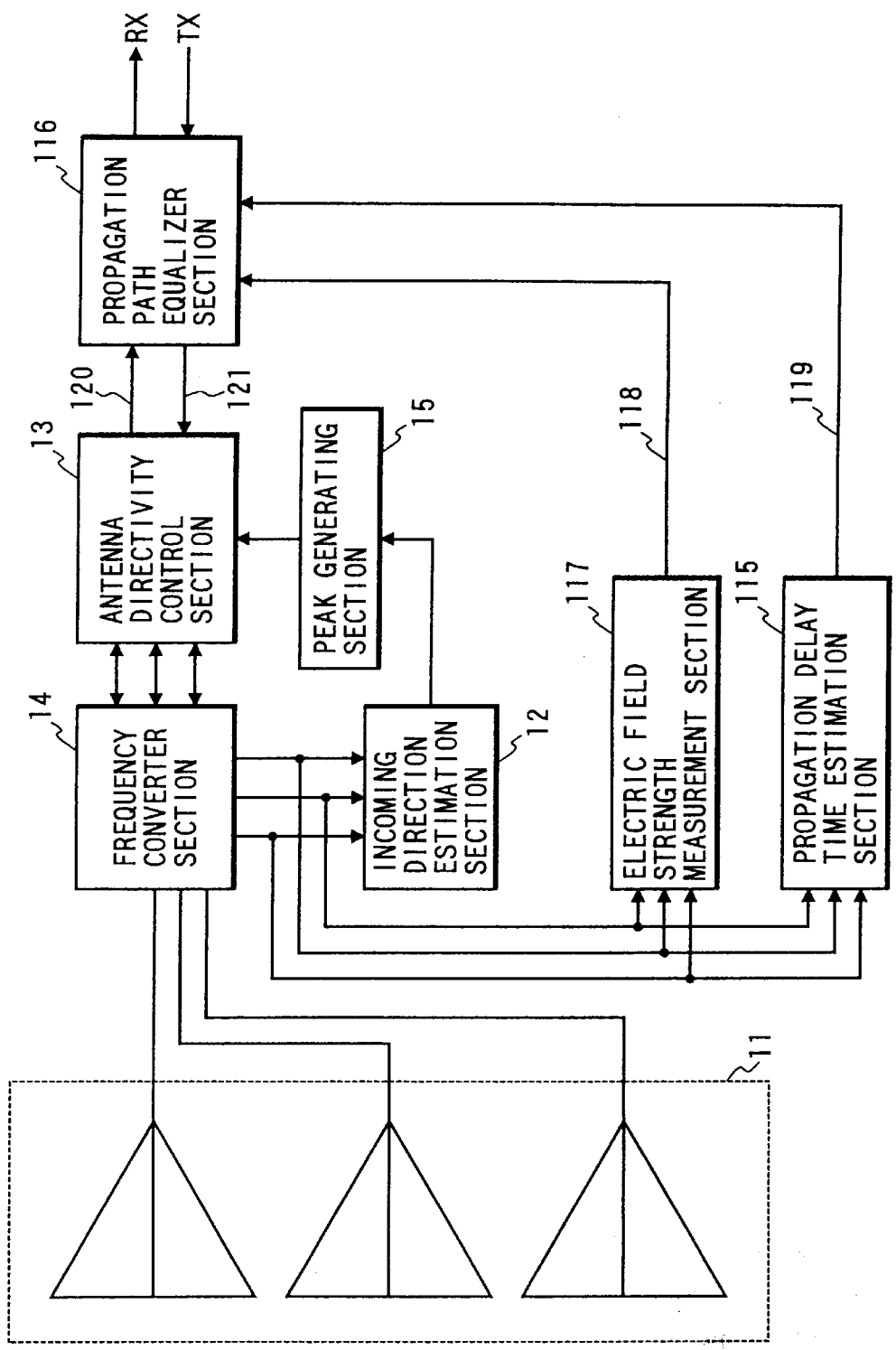
FIG. 43 is a general system block diagram of an eighth embodiment of the present invention, enabling compensation of received signals and transmitted signals of a base station for the effects of multi-path propagation effects.

FIG. 43 is a system block diagram of an eighth embodiment of a directivity control antenna apparatus according to the present invention. In FIG. 43, the respective functions of an array antenna 11, an is incoming direction estimation section 12, an antenna directivity control section 13, a frequency conversion section 14, and a peak generating section 15 are respectively as described for the corresponding sections of the first embodiment shown in FIG. 1, so that detailed description will be omitted. 115 is a propagation delay time estimation section and 116 is a propagation path equalization section. 117 is an electric field strength measurement section, which can for example have the configuration shown in FIG. 35, described hereinabove.

The operation of this embodiment is as follows. The incoming direction estimation section 12 estimates the incoming direction of radio waves from a mobile station, and the propagation delay time estimation section 115 estimates a propagation delay time of the radio waves received from that mobile station. That is to say, if there are reflected radio waves which reach the antenna 11 of the base station, due to radio waves transmitted from the mobile station being reflected from buildings, hills, etc., then interference between the directly received radio waves and such reflected radio waves may occur, resulting in multi-path distortion of the received signal. If there is only a single mobile station within the service area of the base station, then the signal received by the antenna 11 will consist of only the direct radio waves and reflected radio waves from that mobile station. In that case, the propagation delay time estimation section 115 utilizes the MUSIC method to estimate the time delay between the arrival of the direct waves and that of the reflected waves. (It would be equally possible to utilize the aforementioned ESPRIT method for this purpose).

The electric field strength measurement section 117 measures the electric field strength of the direct radio waves and reflected radio waves, by obtaining the combined received signals from the elements of the array antenna 11, and uses these to calculate the electric field strength. The propogation path equalization section 116 uses the value of delay time between the directly received radio waves and the reflected radio waves which is estimated by the propagation delay time estimation section 115, and the values of electric field strength for the directly received radio waves and the reflected radio waves which are estimated by the electric field strength measurement section 117, to cancel the delay times of the direct waves and reflected waves, by applying delay and amplitude compensation of the received signal of the array antenna 11, after this has been converted to the baseband by the frequency conversion section 14 (or by the combination of frequency conversion section 14 and antenna directivity control section 13, as in FIG. 43). It should be noted that it would be equally possible to perform this function by acting on the received signal after conversion to the I.F. frequency by the frequency converter section 14. Specifically, the delay compensation is achieved by transferring the received signal through a series of delay elements, and combining the respective output signals from the delay elements in proportions whereby the delay is counteracted. In addition, the respective proportions of these delayed signals can be modified in accordance with the the ratio of the respective electric field strengths of the direct waves and reflected waves, before these are combined to obtain the final received signal. It is thereby possible to obtain a final received signal which is free from the effects of the multipath distortion.

In addition, subsequently during transmission operation, the values of propagation delay time and ratio of electric field strength which were obtained during receiving operation can be used to add a predicted reflected wave signal to the baseband transmission signal, with the resultant signal being then frequency converted to the transmission frequency, and transmitted by the the array antenna 11.

Figure 44:
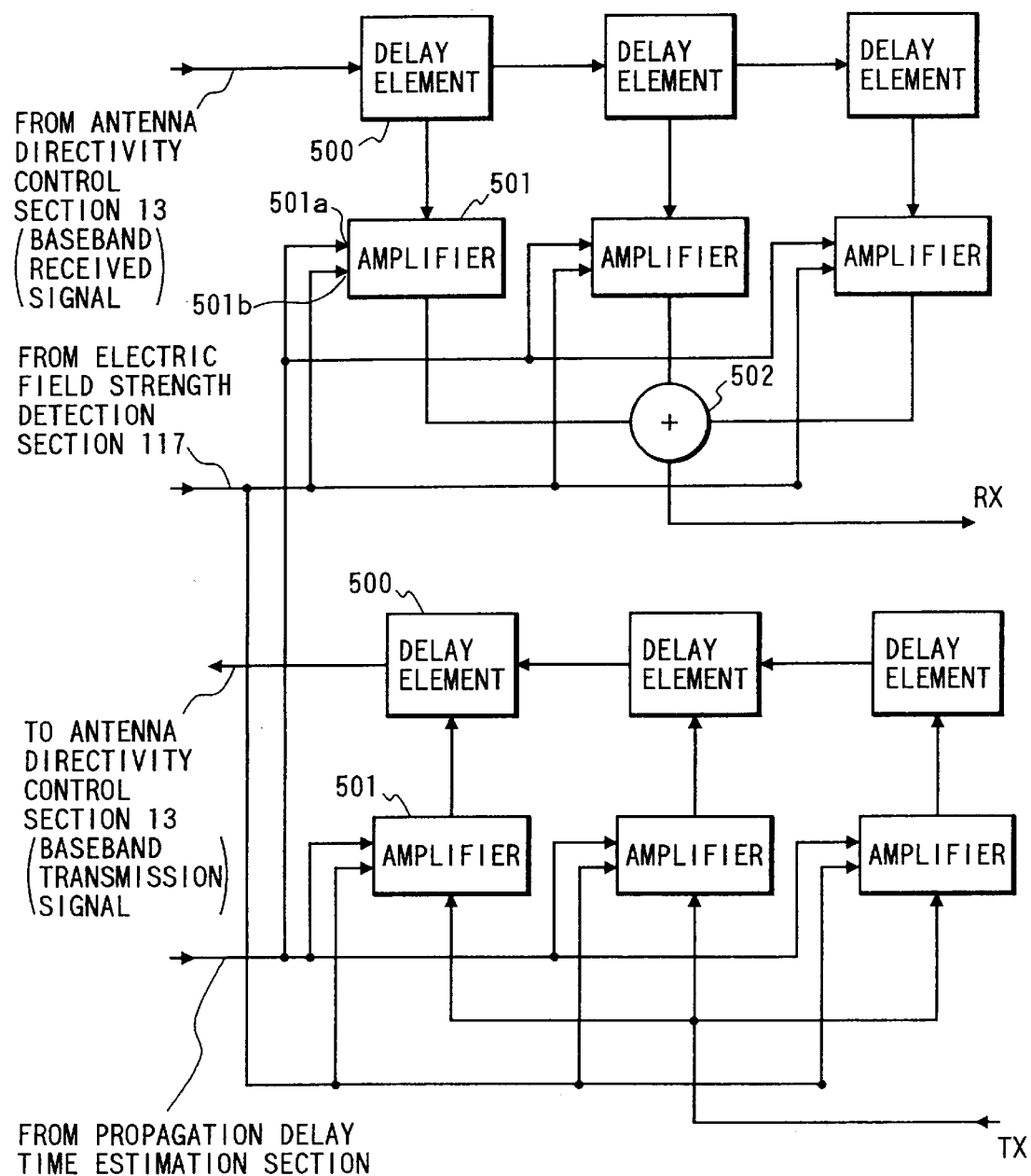
FIG. 44 is a circuit diagram of an example of a propagation path equalizer section in the embodiment of FIG. 43.

FIG. 44 is a circuit block diagram of an example of the configuration of the propagation path equalization section 116. Here, the baseband received signal which is output from the antenna directivity control section 13 is supplied to the first of a series of cascaded delay elements 500, with the output signal from each delay element being input to a corresponding amplifier 501. Each amplifier 501 is provided with a pair of gain control input terminals 501a, 501b, with the amplifier gain being determined by a combination of control signal levels applied to these terminals. A signal expressing the estimated amount of propagation delay time, from the propagation delay time estimation section 115, and a signal expressing the aforementioned ratio of electric field strengths of the direct and reflected waves are respectively applied to the control input terminals 501a, 501b of each amplifier 501 is shown. The resultant output signals from the amplifiers 501 are combined by an adder 502, to obtain the final baseband received signal, which is free from the effects of multipath distortion.

Similarly, the baseband transmission signal is input to each of a set of amplifiers 501, each of which is controlled in the same manner as described above, with the resultant output signals from the amplifiers 501 being applied to respective inputs of a set of cascaded delay elements 500. The baseband transmission signal, with the aforementioned predicted reflected wave signal added thereto, is output from the final one of these cascaded delay elements 500, and is supplied to the antenna directivity control section 13 and hence to the frequency converter section 14 for up-conversion to the R.F. transmission signal.

Thus with the above embodiment of the present invention, compensation can be applied for multi-path distortion of a radio signal received from a mobile station by a base station, and can also be applied to a transmission signal produced by the base station, prior to actual transmission by radio. Reliable communication between a base station and a mobile station can thereby be ensured, in spite of the occurrence of multi-path inteference to radio communication, caused by the presence of large buildings or other obstacles within the service area of the base station.

Figure 45:
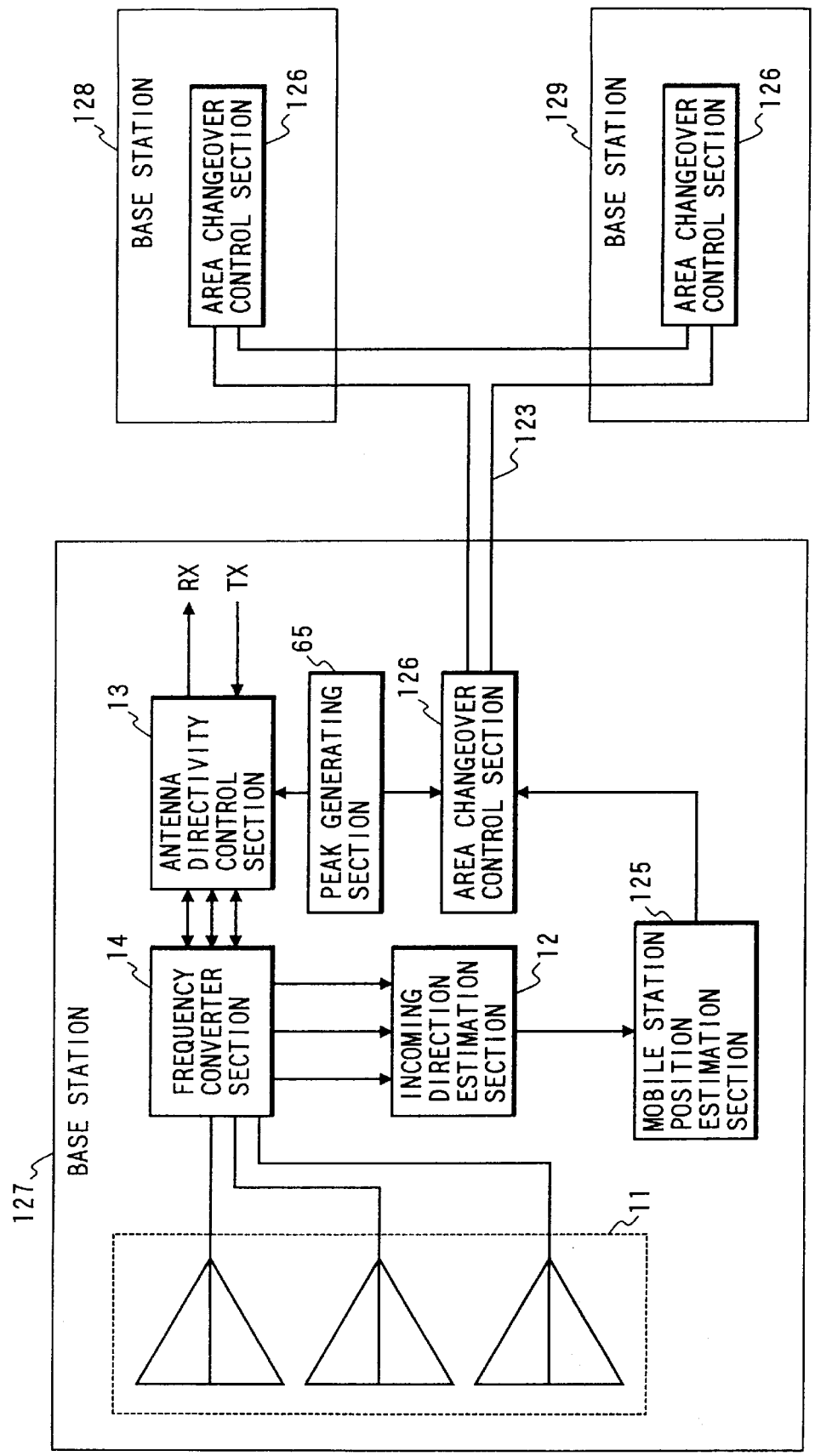
FIG. 45 is a general system block diagram of an eighth embodiment of the present invention, enabling equalization of communication channel utilization among respective base stations, in a mobile communication system in which each of a plurality of base station is allocated a fixed number of communication channels.
Figure 47:
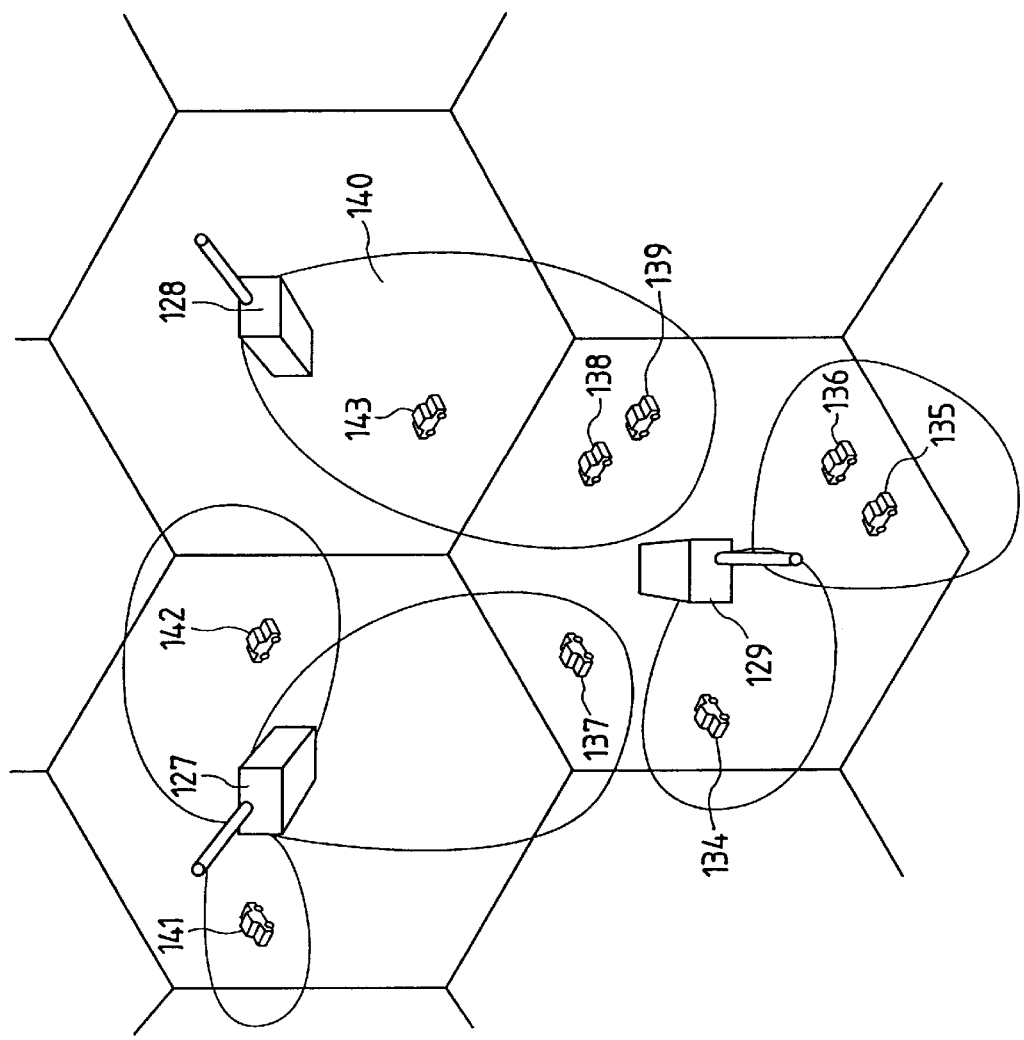
FIG. 47 is a conceptual diagram for illustrating the basic principles of the eighth embodiment.

FIG. 45 is a system block diagram of a ninth embodiment of a directivity control antenna apparatus according to the present invention. In the following description it will be assumed that the embodiment is applied to a cellular telephone system, e.g. as illustrated in FIG. 47 in which base stations 127, 128, 129 have assigned respective hexagonal-shaped service areas, forming respective cells of the communication system. In FIG. 45, each of respective base stations 127 is provided with an array antenna 11, a incoming direction estimation section 12, an antenna directivity control section 13, and a frequency converter section 14. These have functions described herinabove for the correspondingly numbered sections of preceding embodiments, so that detailed description will be omitted. Each of the base stations is further provided with a mobile station position estimation section 125, and an area changeover control section 126. Each area changeover control section 126 of a base station is connected by communication cable 123 to those of the other base stations, as illustrated, for mutual transfer of data as described hereinafter.

The mobile station position estimation section 125 can be configured for example as described for any of the preceding embodiments which incorporate a mobile station position estimation section, so that further description will be omitted. In that case, the array antenna 11 will be a fixed or rotatable linear array antenna.

Referring again to FIG. 47, in addition to the base stations 127, 128, and 129, a group of mobile stations designated as 134, 135, 136, 137, 138 and 139 are located within the cell of the base station 129, while two mobile stations 141, 142 are located within the cell of the base station 127, and a single mobile station 143 is located within the cell of the base station 128. 140 is an antenna directional beam of the base station 128, i.e. the directivity of the antenna of that base station is shaped as indicated by numeral 140, by the antenna directivity control section 13 of base station 128, under the control of the area changeover control section 126 of base station 128. That is to say each area changeover control section 126 includes, among other functions, the function of the peak generating section which is shown in FIG. 33 for the fifth embodiment of the invention and described hereinabove.

The area changeover control section 126 of each base station is supplied with identification information for each mobile station from which a signal is being received, i.e. obtained from the resultant received baseband signal. Since means for transmitting and receiving such identification information are well known in the art, description is omitted herein.

In each base station, the incoming direction estimation section 12 uses the received signals obtained from mobile stations which are within the cell (i.e.service area) of that base station, to estimate the number of mobile stations which are within that area, and the incoming directions of radio waves from each of these mobile stations. That information is supplied to the mobile station position estimation section 125, which estimates the respective positions of these mobile stations within the cell, and supplies the position information to the area changeover control section 126. In addition, the area changeover control section 126 of a base station receives, from the base stations of each of a set of adjacent cells:

(a) information which specifies either the number of excess communication channels which are currently available for that other base station, or, if the number of communication channels is insufficient, (b) identification information for each of one or more selected mobile stations which are within the service area of the that other base station, i.e. mobile stations for which the other base station has insufficient communication channel capacity to handle, and which have not yet been handed over to any other base station.

It will be assumed for example that each of the base stations shown in FIG. 47 has the channel capacity for communication with a maximum of up to three mobile stations. In that case, if each base station is limited to communication with only those mobile stations which are located within its cell, then the base station 127 has an excess capacity of one communication channel, the base station 128 has an excess capacity of two communication channels, and the base station 129 has a deficit in capacity of three communication channels, since there are currently six mobile stations located within the cell of base station 129.

The function of the area changeover control section 126 of each base station is to equalize the respective numbers of mobile stations which are handled by the base stations. If there is insufficient communication channel capacity within a cell, then (as far as possible) communication with the excess number of mobile stations which are within that cell is handed over to the base stations of adjacent cells. In the example of FIG. 47, the base station 128 has communication capacity available, i.e. for communication with two more mobile stations. In this condition, the base station 129 (after sending the above-mentioned mobile station identification information) notifies the mobile stations 138, 139 to switch to respective available communication channels of base station 128. When radio waves are then received from these mobile stations by the base station 128, the incoming direction estimation section of that base station estimates the respective directions of these mobile stations, and the mobile station position estimation section 125 estimates the respective positions of the mobile stations 138, 139. Thereafter, when communication is to be performed with either of these mobile stations, the area changeover control section 126 causes the antenna directivity control section 13 to form the appropriate size and direction of peak antenna directivity, and communication is performed in the same way as if these mobile stations 138, 139 were are located within the service area (cell) of base station 128. In a similar way,the mobile station 137 is handed over to the base station 127.

Thus with the example of FIG. 47, in which there are nine mobile stations within the areas of the three base stations, in order to equalize the numbers of mobile stations handled by the respective base stations, equalization is performed by arranging that each base station is in communication with three mobile stations.

Preferably, it is arranged that when mobile stations are handed over in this way, from a first cell to a second cell, the "excess" mobile stations which are closest to that second cell are selected to be handed over. Thus in the example of FIG. 47, the base station 129 retains communication with the mobile stations 134, 135, 136, which are located farther from the cells of base stations 127, 129 than the mobile stations 137, 138, 139.

Although in the above it has been assumed that the antenna directivity control section of a base station is controlled such as to form respectively different peaks of the antenna directivity for each different direction or position which is estimated for a mobile station, it is equally possible for the antenna directivity to be formed with a peak which covers the positions of a plurality of mobile stations simultaneously (i.e. mobile stations for which respective positions have been estimated). This is illustrated in FIG. 47, in which the base station 128 controls its antenna directivity such that a single directional peak 140 is formed, shaped to enable communication not only with the single mobile station 143 which is within its own area, but also the two mobile stations 138, 139 which are closest to it within the service area of base station 129.

Figure 46A:
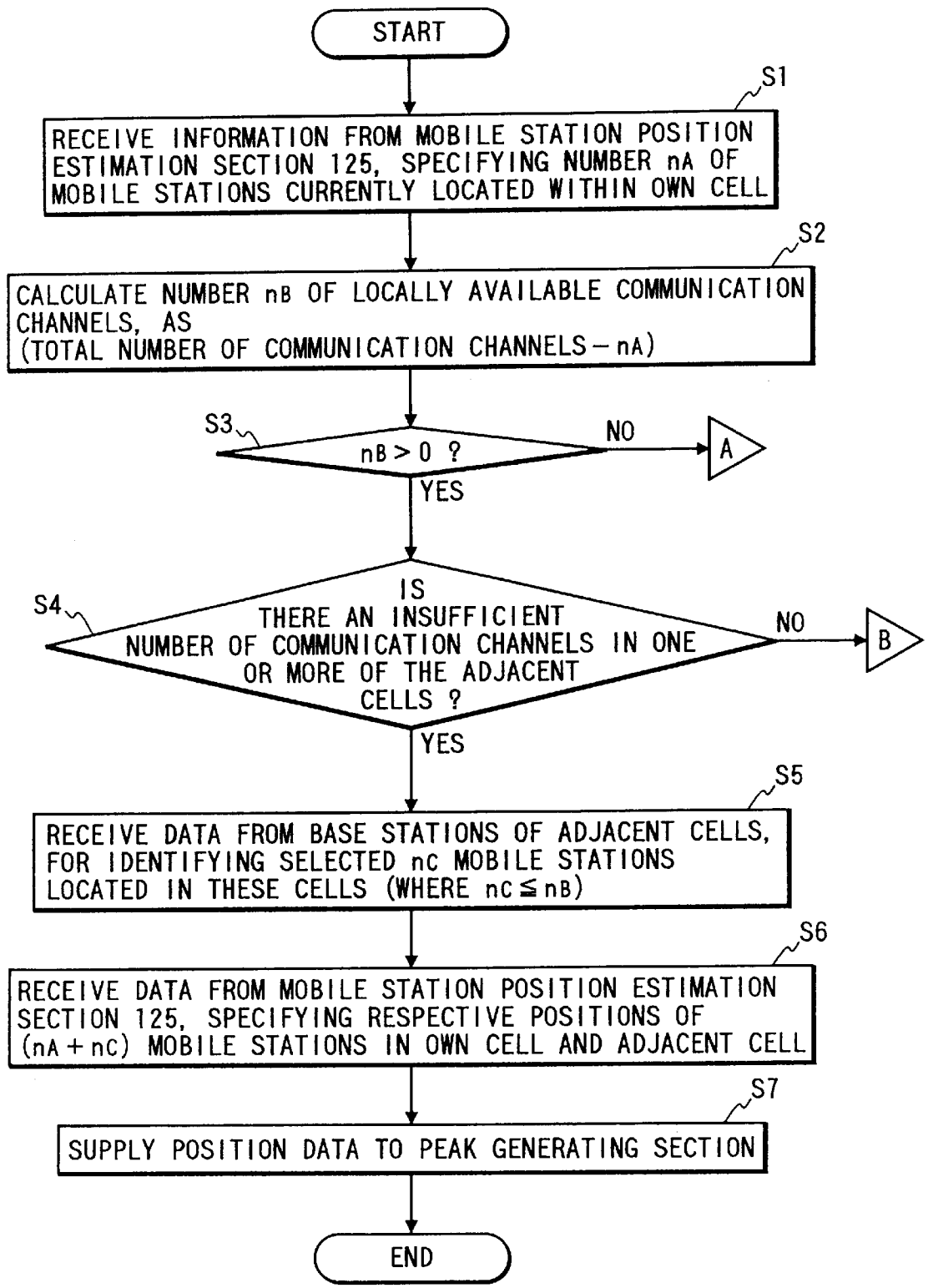
FIGS. 46A, 46B constitute a flow diagram of the operation of an area changeover control section of a base station in the eighth embodiment of FIG. 45.
Figure 46B:
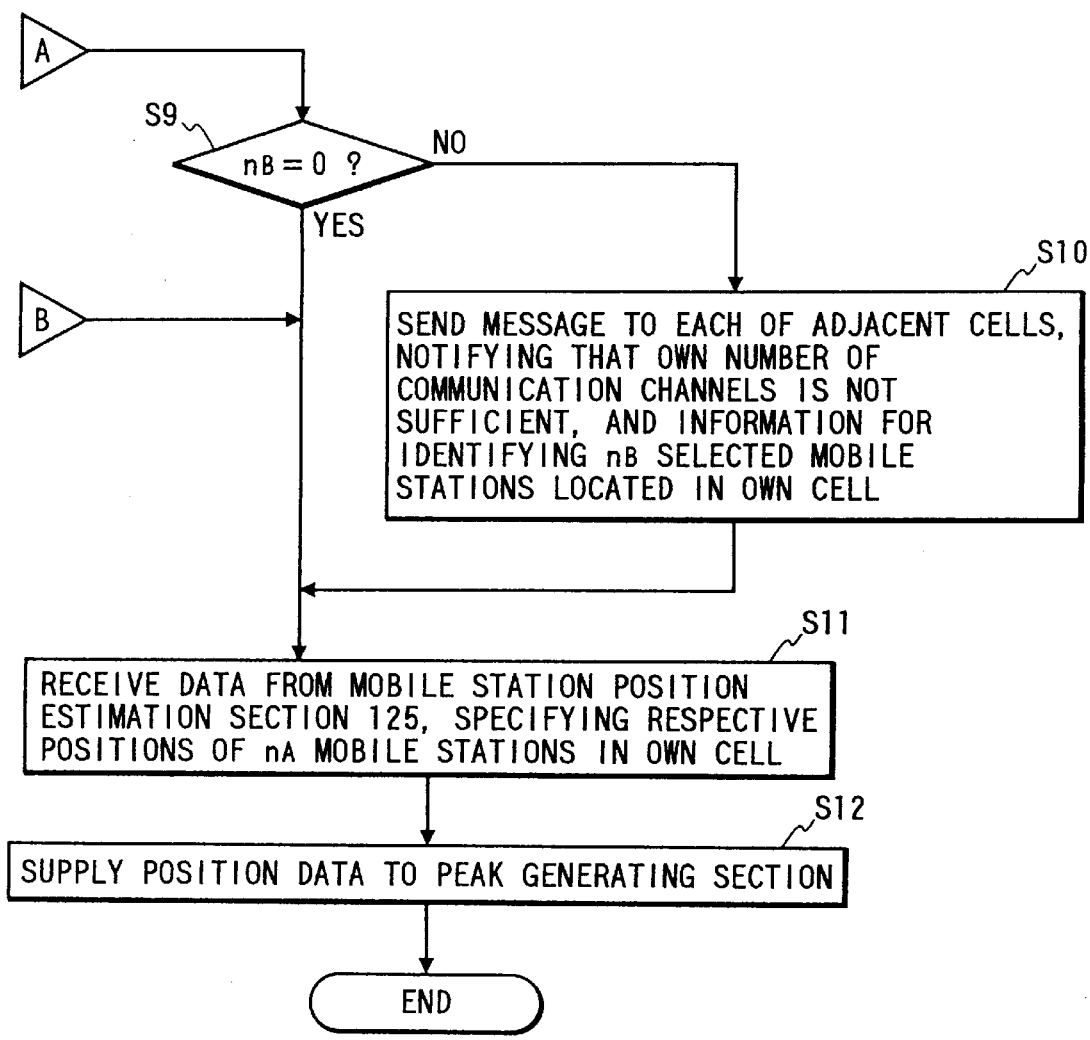

FIGS. 46A, 46B constitute a flow diagram of the processing executed by the area changeover control section 126 of each base station, with this embodiment. In this diagram, the number of communication channels available to the base station is expressed by a parameter $n_B$, which takes a positive, zero, or negative value in accordance with whether there is spare communication capacity available for that base station, zero capacity available, or insufficient capacity available. If there is insufficient communication channel capacity, then as shown in step S9, the area changeover control section 126 of the base station sends information to each area changeover control section 126 of adjacent base stations, to notify these of the insufficiency of channel capacity, and identifying selected mobile stations which are located in the local cell but are to be handed over to these other base stations. For example in the example of FIG. 47, the base station 129 would notify the base stations 127, 128 of the number of insufficient communication channels (i.e. 3), and information identifying the three mobile stations 137, 138 and 139.

Thus with this embodiment of the present invention, antenna directivity can be determined such as to equalize the respective numbers mobile stations which communicate with each of a plurality of base stations, thereby ensuring that the available communication channel capacity of the overall communication system can be efficiently utilized.

With the preceding embodiments of the invention, (unless antenna rotation is performed) it is only possible for a base station to locate the respective directions of a maximum number of mobile stations which is less than the total number of elements of the array antenna of the base station. A tenth embodiment of the invention will be described in the following, whereby that limitation is overcome. With this embodiment, each mobile station intermittently transmits control signals which are for use by a base station only to locate the direction of the mobile station, rather than for data communication between the mobile station and base station.

Figure 48:
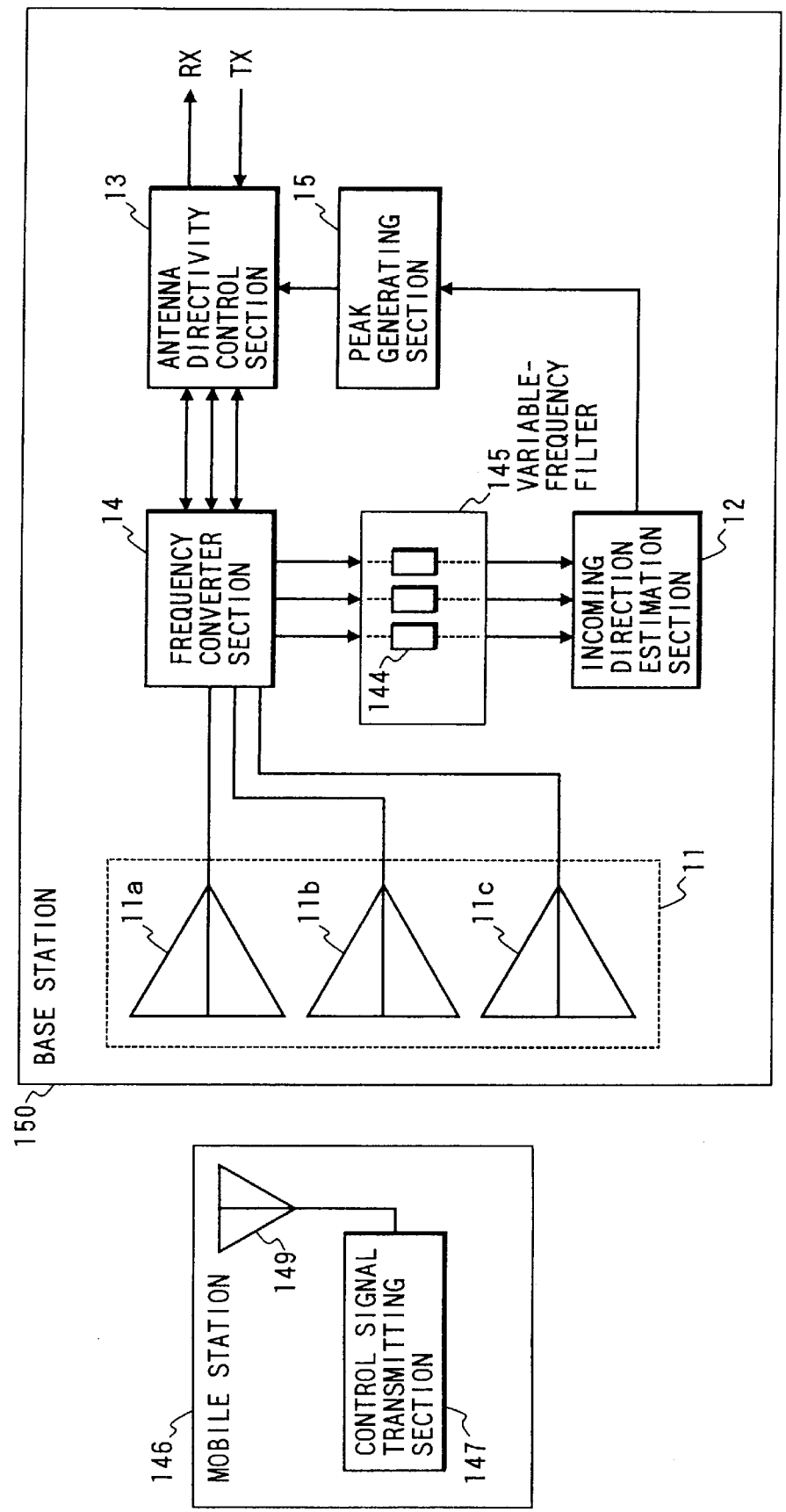
FIG. 48 is a general system block diagram of a ninth embodiment of the present invention, wherein each mobile station transmits control signals used for direction estimation purposes, in randomly determined time slots.

FIG. 48 is a system block diagram of the tenth embodiment. It will be assumed in the following that the array antenna 11 has a total of three antenna elements. In FIG. 48, 150 is a base station, having an array antenna 11, a incoming direction estimation section 12, an antenna directivity control section 13, a frequency converter section 14 and a peak generating section 15, respectively functioning as described for the preceding embodiments. In addition, the base station 150 is provided with a variable frequency filter 144, which receives the respective received signals of the elements of the array antenna 11 after these have been converted to an intermediate frequency by the frequency converter section 14 (i.e. before any intermediate-frequency filter processing has been applied to these signals), passes each of these signals through a corresponding one of a set of variable band-pass filter sections 144, and supplies the resultant signal to the incoming direction estimation section 12. 146 is a mobile station, having a control signal transmission section which generates control signals as described hereinafter, and transmits these to the base station 150 by radio.

Figure 50:
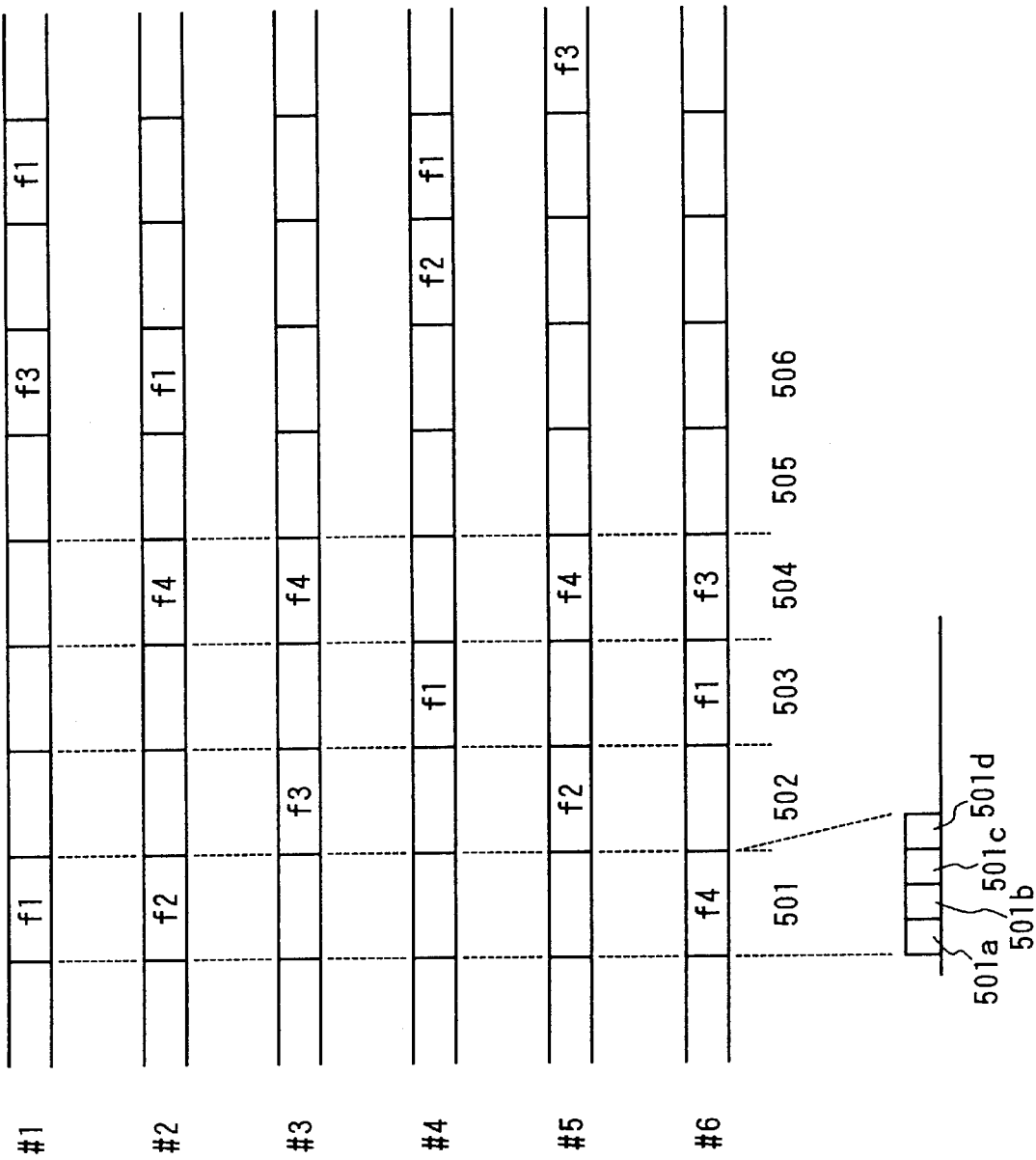
FIG. 50 is a timing diagram for illustrating the relationship between the randomly determined time slots and control of the variable band-pass filter in the embodiment of FIG. 48.

FIG. 50 is a diagram showing an example of the timings at which control signals are transmitted by the respective control signal transmission section of a plurality of mobile stations, with the sequences of control signals transmitted by six mobile stations being indicated as #1, #2, #3, #4, #5, and #6 respectively. 501, 502, 503, 504, 505, 506 denote respective time slots. In each mobile station, e.g. the mobile station 146 of FIG. 48, the control signal transmitting section 147 randomly selects slots from the time slots shown in FIG. 50, and also randomly selects a frequency from among the four frequencies f1, f2, f3, f4, to be transmitted as a control signal to a base station during such a randomly selected time slot. When a control signal is received from a mobile station by the array antenna 11 of a base station, the respective received signals from each of the elements of the array antenna, after frequency conversion to the intermediate frequency by the frequency conversion section 14, are respectively input to the variable band-pass filter sections 144 of the variable frequency filter 145. The respective frequencies to which the received signal frequencies f1, f2, f3 and f4 are converted by the frequency conversion section 14 will be designated as F1, F2, F3 and F4. Each of the variable band-pass filter sections of filter 144 is controlled to operate such that within one time slot, the filter passband is set to successively pass the frequencies F1, F2, F3 and F4 during four respective sub-intervals of the time slot. In FIG. 50 these sub-intervals are designated as 501a, 501b, 501c, 501d, for example, in the case of the time slot 501. While one of the frequencies F1 to F4 is being passed, the filter is in a cut-off condition with respect to the other three frequencies. The output signals from the variable frequency filter 145 (i.e. corresponding to the respective received signals of the elements of antenna 11) are supplied to the incoming direction estimation section 142, which then estimates the incoming directions of the radio waves from the mobile stations.

As described hereinabove, the incoming direction estimation section 12 of a base station can estimate the respective directions of a plurality of mobile stations which transmit via the same frequency channels, if the transmitted signals are modulated by respectively different data and if the number of these mobile stations is less than the number of antenna elements of the base station. If the number of antenna elements is three, then since in each of the time slots 501, 502, 503 the number of mobile stations which use the same frequency channel simultaneously is less than three, the incoming direction information can be correctly estimated. During each sub-interval of the time slots 501, 502, etc., estimating of incoming directions of radio waves is performed for up to a maximum of two mobile stations (i.e.

which transmit during that time slot a control signal at the frequency which is currently selected by the variable frequency filter 144), the filter is switched over to select another frequency in the next sub-interval, and the incoming direction estimation section 142 then similarly estimates the incoming direction of radio waves for another mobile station or stations.

Figure 51:
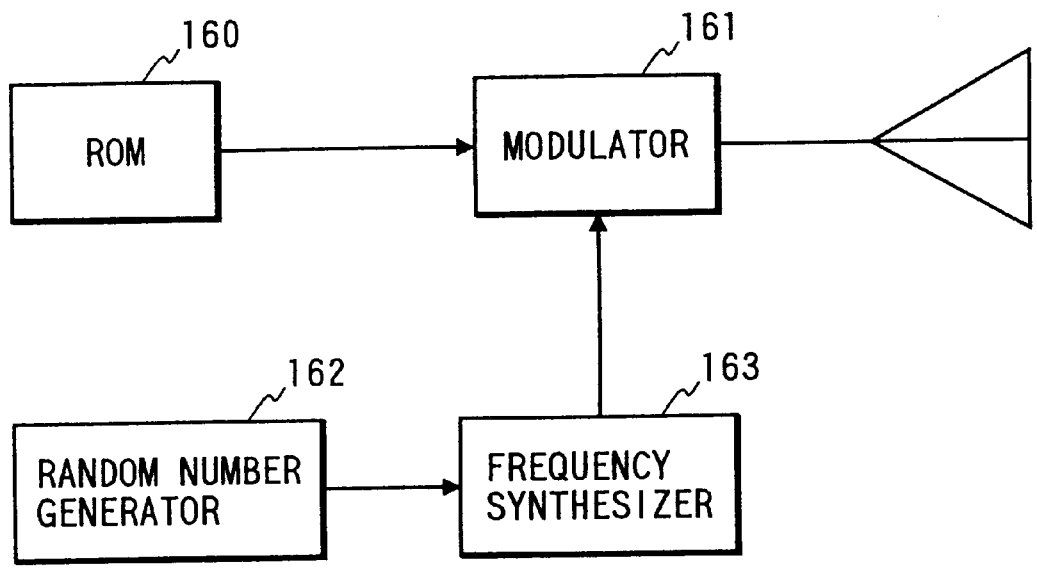
FIG. 51 is a basic system block diagram of an example of a control signal transmitting section in a mobile station of the embodiment of FIG. 48.

FIG. 51 shows an example of a configuration for the control signal transmitting section 147 of an mobile station of this embodiment. Here, data read out from a ROM (Read-Only Memory) 160 are applied to a modulator 161, together with a carrier signal at a channel frequency which is generated by a frequency synthesizer 163. The frequency synthesizer randomly selects one of the four possible channel frequencies in randomly determined time slots, under the control of signals produced on the basis of on random numbers which are generated by a random number generator 162. The data read from the ROM are respectively different for each of the mobile stations of the system.

After completing direction estimating operations for all of the control signal frequencies, the peak generating section 15 causes the antenna directivity control section 143 to execute phase and amplitude control of the transmission signal or received signal for each of the elements of the array antenna 141, to orient the antenna directivity peak towards the mobile station with which communication is currently to be performed, as described for the preceding embodiments.

In the time slot 504 of the example of FIG. 50, since there are three mobile stations which transmit the same control signal frequency (f4) simultaneously, i.e. a number of mobile stations which is greater than the number of antenna elements, it is not possible to obtain correct estimation results. Furthermore, since there is no mobile station which transmits a control signal during time slot 5, that slot cannot be used for incoming direction estimation. In such a case, the antenna directivity control section maintains the antenna directivity peaks in an unchanged condition, until correct results can be obtained. In time slot 506, the number of frequencies which are transmitted simultaneously by the mobile stations is less than the number of antenna elements, so that correct estimation results can be obtained.

Figure 49:
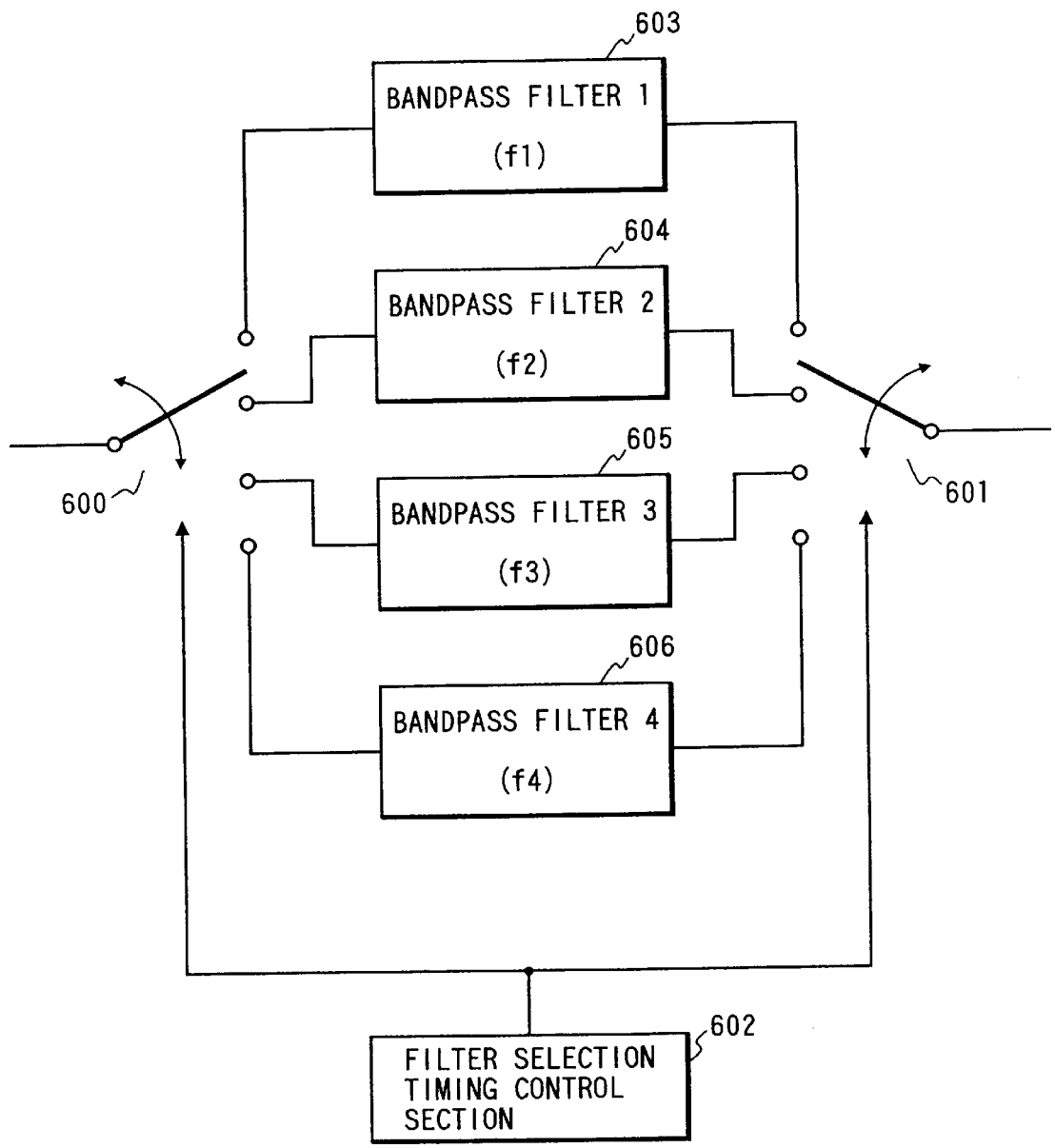
FIG. 49 is a circuit diagram of an example of a section of a variable band-pass filter used by a base station in the embodiment of FIG. 48.

Each of the variable band-pass filter sections of the variable frequency filter 144 can for example be configured as shown in FIG. 49. Here, respective ones of a set of four band-pass filters 603, 604, 605, 606, which pass the frequencies F1, F2, F3, F4 (corresponding to the control signal frequencies f1, f2, f3, f4 as described above) are successively selected during the four subintervals of each time slot, by switches 600, 601 which are controlled by a filter selection timing control section 602.

Thus with the embodiment described above, the frequencies and time slots of control signals which are transmitted by the mobile stations are randomly selected, so that a base station can obtain the incoming directions of radio waves from the mobile stations by altering the passband center frequency of a variable frequency filter, and hence it becomes possible for a base station to detect the respective directions of a number of mobile stations which is greater than the total number of elements of the array antenna of the base station.

It will be apparent that this embodiment could be modified to provide a mobile station position estimation function, as described for preceding embodiments. In that case, the respective positions of a number of mobile stations which is greater than the total number of elements of the array antenna of the base station could be estimated.

Figure 52:
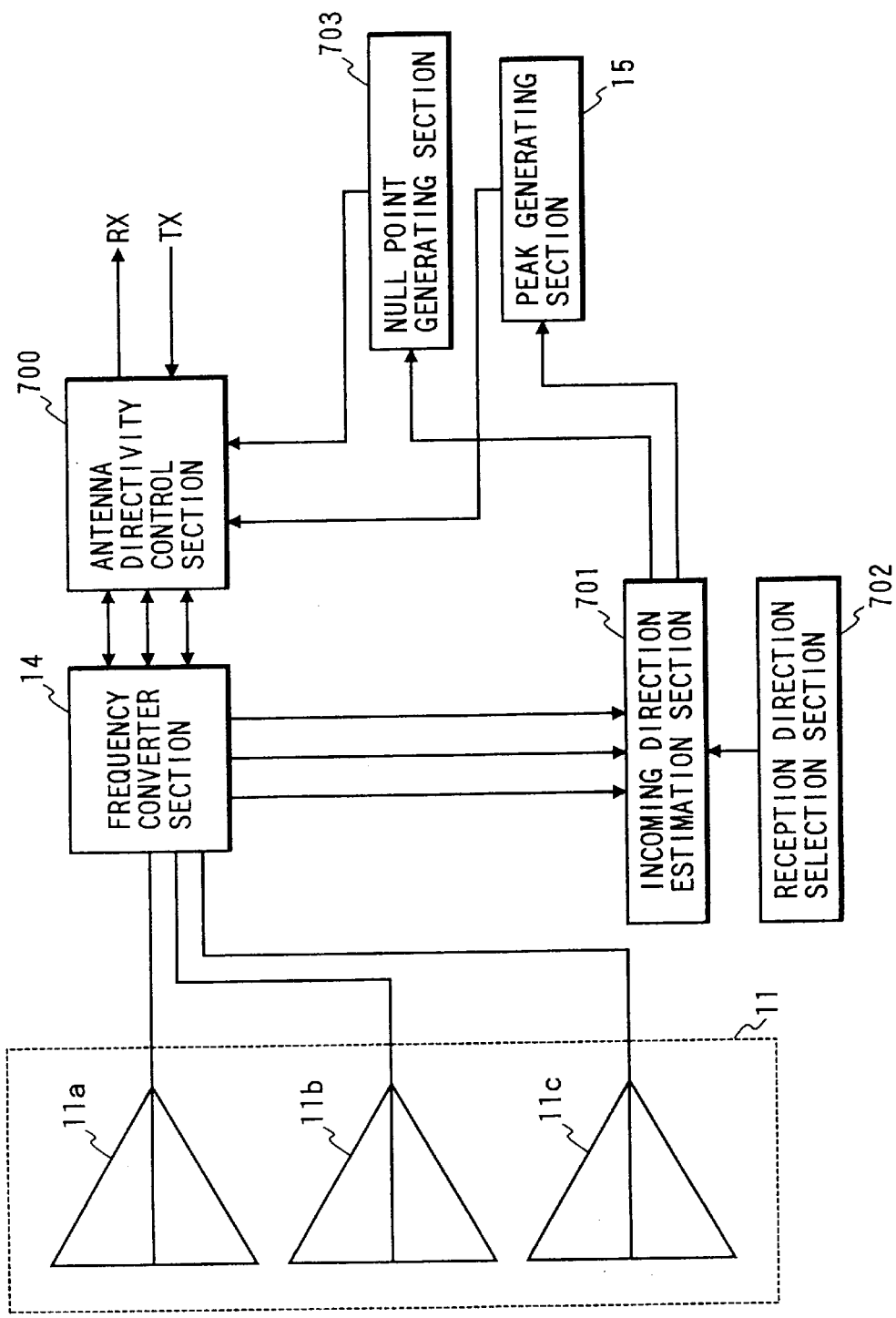
FIG. 52 a general system block diagram of a tenth embodiment of the present invention, enabling null points of antenna directivity of a base station antenna to be produced, oriented in respective directions of mobile stations with which the base station is not currently in communication.

FIG. 52 is a system block diagram of an eleventh embodiment of a directivity control antenna apparatus according to the present invention. This embodiment differs from the preceding embodiments in that the antenna directivity of a base station can be shaped such as to form a single peak which is oriented in the direction of a mobile station that is currently in communication with the base station, while nulls of the antenna directivity are also formed, respectively oriented in the directions which have been estimated for other mobile stations that are within the service area of the base station. As a result, it becomes possible to minimize the possibility of interference with communication being performed between other adjacent base stations and mobile stations, even if such communication is being performed using the same frequency channel.

In FIG. 52, an array antenna 11, a frequency converter section 14 and a peak generating section 15 respectively function in the same manner as described for the corresponding sections of preceding embodiments. An incoming direction estimation section 701 functions in essentially the same manner as described for the incoming direction estimation section 12 of preceding embodiments, i.e. to estimate the respectively directions of mobile stations with respect to the antenna 11, i.e. a total of N mobile stations. However in addition, the incoming direction estimation section 701 is controlled by data supplied from a reception direction selection section 702 to select one of these N directions as an antenna peak direction, and the remaining estimated (N−1) directions as antenna null directions. In addition, an antenna directivity control section 700 functions in essentially the same manner as described for the antenna directivity control section 13 of preceding embodiments, i.e. to perform phase and amplitude control of transmission or received signals of the antenna elements of the antenna 11 such as to provide a specific shape of directivity. However in addition, referring to FIG. 5 of the first embodiment, each of the amplifiers 13*d*, 13*e* in the antenna directivity control section 700 is controlled by a pair of amplification factor control signals, i.e. a first signal which is supplied from a null point generating section 703 and a second signal which is supplied from the peak generating section 15. Thus, the directivity which is established for the antenna 11 is determined by a combination of control signals produced from the peak generating section 15 and the null point generating section 703.

Data specifying the aforementioned antenna peak direction is supplied by the incoming direction estimation section 701 to the peak generating section 15, while data specifying the respective null point directions are supplied from the incoming direction estimation section 701 to the null point generating section 703. The antenna directivity control section is thereby controlled by the null point generating section 703 and peak generating section 15 to establish an antenna directivity having a single peak which is oriented in the estimated peak direction, and having respective null points at each of the other estimated directions of mobile stations.

The reception direction selection section 702 successively selects respective ones of the directions estimated by the incoming direction estimation section, to be the antenna peak direction, e.g. during each of fixed-duration communication intervals. In that way each of the mobile stations which are within the service area of the base station can sequentially communicate with the base station, through a time-division multiplexing form of operation.

Figure 53:
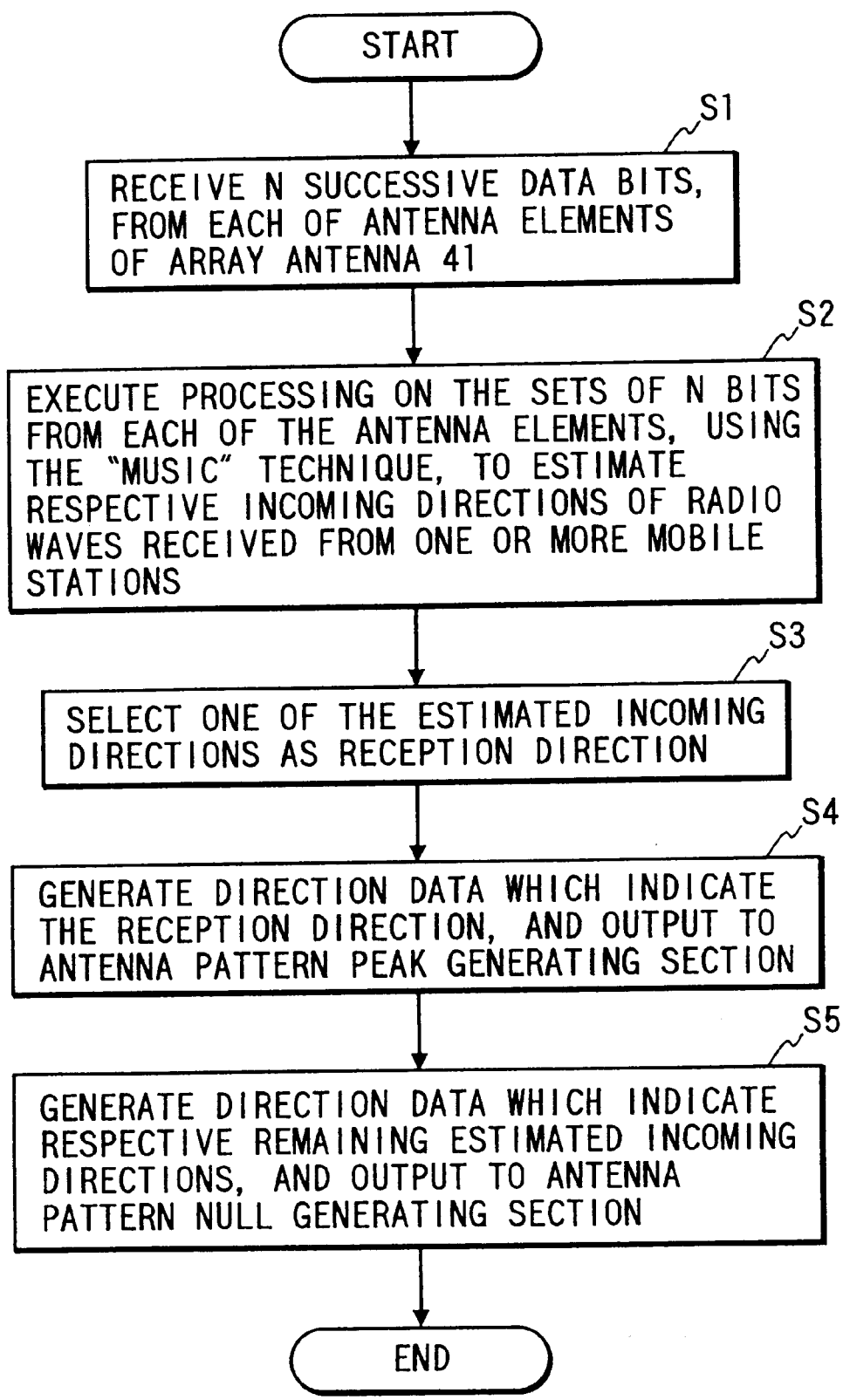
FIG. 53 is a flow diagram of the operation of an incoming direction estimation section in the embodiment of FIG. 52.

FIG. 53 is a flow diagram of the processing performed by the incoming direction estimation section 701 of this embodiment to achieve the operation described above, for supplying data specifying the peak direction to the peak generating section 15, and data specifying the respective null point directions to the null point generating section 703.

Figure 54:
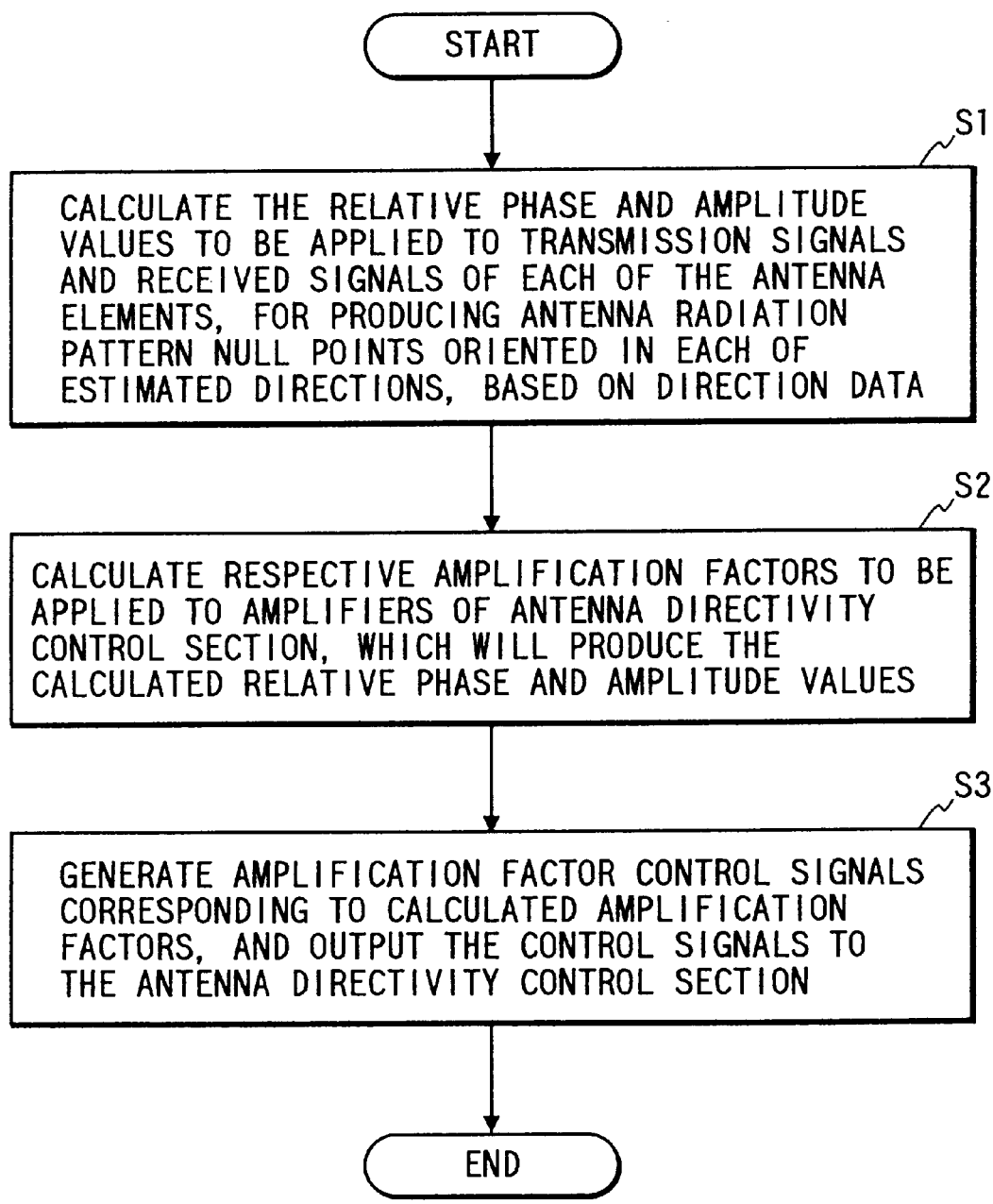
FIG. 54 is a flow diagram of the operation of a null point generating section in the embodiment of FIG. 52.

FIG. 54 is a flow diagram of the operations performed by the null point generating section 703 for generating control signals, applied to the antenna directivity control section 700, to establish null points for each of the directions which have been selected as null point directions, in response to the direction data supplied from the incoming direction estimation section 701.

Figure 55:
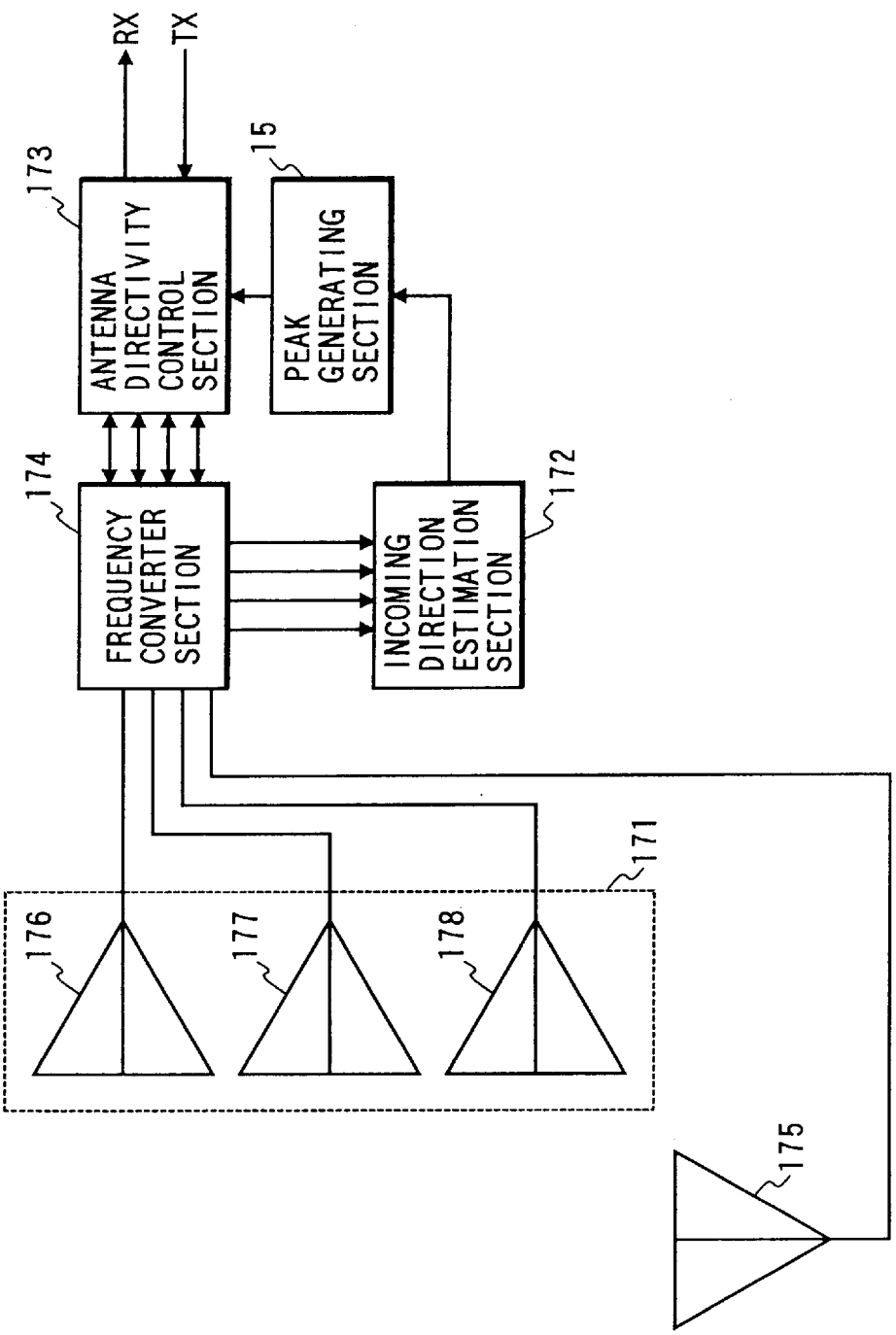
FIG. 55 a general system block diagram of an eleventh embodiment of the present invention, wherein a base station utilizes the difference between the directional characteristics of a linear array antenna and an antenna element which is offset from the axis of the array antenna, for obtaining the direction of a mobile station.

FIG. 55 is a system block diagram of a twelfth embodiment of a directivity control antenna apparatus according to the present invention. In FIG. 55, 171 is an array antenna, 172 is an incoming direction estimation section, 15 is a peak generating section, 173 is an antenna directivity control section, and 174 is a frequency conversion section. 175 is an offset antenna element, while 176, 177 and 178 are first, second and third elements of the array antenna 171. It will be assumed that antenna 171 is a linear array antenna, so that only azimuth angles of incoming radio waves can be estimated. As a practical example, the array antenna 171 could consist of three dipole antennas each provided with a rear reflector element, arrayed horizontally in line, while the offset antenna 175 could consist of a single dipole antenna having a rear reflector which is offset by a suitable azimuth angle (e.g. 90°) from the array direction of the antenna 171. However it will be apparent that other forms of antenna configuration could be envisaged for use with this embodiment.

Figure 57:
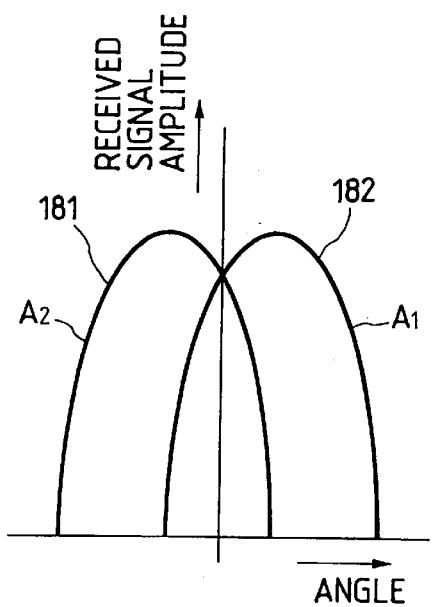
FIG. 57 is a graph illustrating respective directivity characteristics of first and second sets of antenna elements used in the embodiment of FIG. 55.
Figure 58:
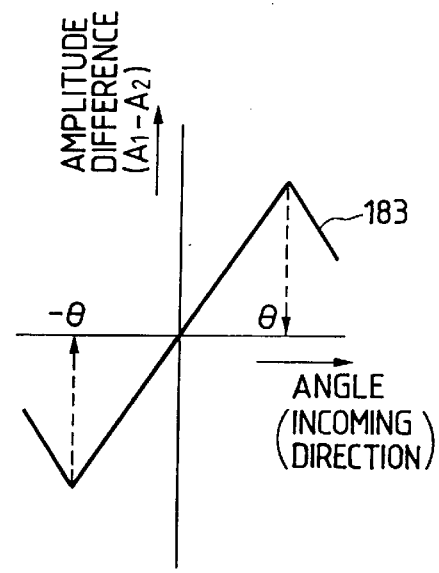
FIG. 58 is a graph illustrating a relationship between incoming direction of radio waves and values of difference between the characteristics of FIG. 57.

FIGS. 57, 58 are diagrams for illustrating the principles of operation of the incoming direction estimation section 172. In FIG. 57, 181 is the antenna directivity characteristic (of received signal amplitude versus azimuth angle of the transmitting mobile station) which results from a first set of antenna elements which is formed of only elements of the array antenna 171, 182 is the antenna directivity characteristic which results from a second set of antenna elements which includes the offset antenna element 175. In FIG. 58, 183 indicates the relationship between azimuth angle of the transmitting mobile station and values of difference between the combined received signal amplitudes obtained from the first set of antenna elements and the combined received signal amplitudes obtained from the second set of antenna elements, i.e. a characteristic which expresses the difference between the characteristics 181, 182 of FIG. 57. It will be understood that the characteristic 181 is only reliably accurate for the range of angular values within which both of the characteristics 181, 182 have non-zero values of signal amplitude, i.e the range $-\Theta$ to $\Theta$ in FIG. 58.

The operation of this embodiment is as follows. When radio waves from a mobile stations are received by the array antenna 171 and by the offset antenna element 175, the incoming direction estimation section 172 combines the received signals of respective sets of antenna elements, and estimates the azimuth angle of the incoming radio waves, i.e. of the transmitting mobile station, based on the differences between the magnitudes of the respective received signals from the first and second sets of antenna elements. The sets of antenna elements can for example consist of a first antenna element set that is formed of the first element 176 and second element 177 of the array antenna 171 and a second set of antenna elements which is formed of the third element 178 of the array antenna and the offset antenna element 175.

The characteristic 183 shown in FIG. 57 establishes a relationship between radio wave incoming direction and the magnitude of difference between the combined signals of the first antenna element group and the combined signals of the second antenna element group. The incoming direction estimation section can thereby estimate the azimuth direction at which a mobile station is located.

The direction information is then supplied to the peak generating section 15, which generates control signals for causing the antenna directivity control section 173 to apply amplification and phase control of the received and transmission signals such as to produce a peak in the antenna directivity, as described for the preceding embodiments.

Figure 56:
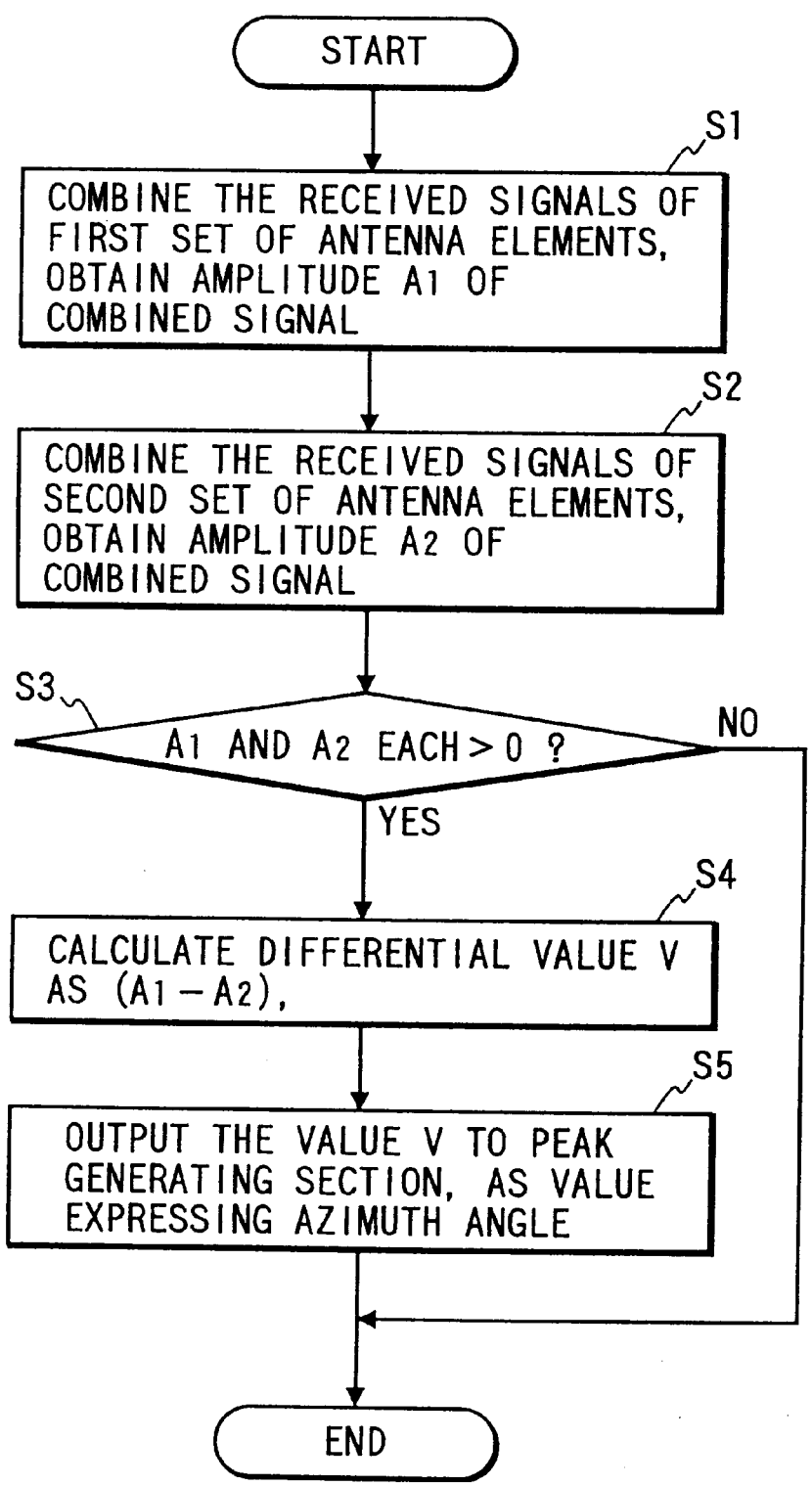
FIG. 56 is a flow diagram of the operation of an incoming direction estimation section in the embodiment of FIG. 55.

FIG. 56 is a flow diagram showing an example of a simple algorithm which can be periodically performed by the incoming direction estimation section of this embodiment, to obtain estimated direction values based on the respective combined received signals from the first and second sets of antenna elements.

Thus with the embodiment of the present invention described above, by suitably using an array antenna and an offset antenna element in combination, it becomes possible to estimate the direction of a mobile station by using antenna directivity.

It would of course be possible to utilize a greater number of elements in the array antenna 171 and offset antenna 175 than those shown in the example of FIG. 55. Also, in order to provide a sufficient range of directional coverage, a plurality of sets of antennas such as is shown in FIG. 55 could be utilized, with the array antennas oriented at respectively different angles. Alternatively, rotation of the antenna structure could be employed, as for the embodiment shown in FIG. 40, to enable incoming radio wave directions to be estimated in an azimuth range of 360°.

With the present invention, as described above, the respective directions of one or more mobile stations can be estimated by a base station of a mobile communication system, and the directivity of an array antenna of the base station can be adaptively controlled in accordance with the estimated directions, thereby enabling transmission frequencies and transmission power to be efficiently utilized, i.e. enabling the possibility of interference with communication between other base stations and mobile stations of the mobile communication system to be reduced.

As described above, it is possible to configure an apparatus according to the present invention such that the antenna directivity is formed with a peak which is shaped for communication with one specific mobile station, i.e so that respectively different peaks are formed in accordance with the base station executing communication with respectively different mobile stations, or alternatively, such that the antenna directivity is formed with a peak which is shaped such as to enable communication with each of a plurality of mobile stations that located at estimated positions which are not far apart, as illustrated in the example of FIG. 47.

It will be apparent that various features of embodiments described above could be combined with those of other embodiments, so that the above description of specific embodiments is not to be understood as limiting the scope of the invention, as set out in the appended claims.

What is claimed is:

1. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station, wherein said incoming direction estimation means estimates said incoming direction of radio waves from said mobile station by utilizing a method that is based upon phase relationships and values of amplitude of said intermediate frequency signals or baseband signals respectively corresponding to individual ones of said antenna elements, and wherein said antenna directivity control means comprises means responsive to said control signals from said peak generating means for controlling the phase and amplitude of respective received signals of said antenna elements and transmission signals of said antenna elements, which are at said intermediate frequency or said baseband frequency.

2. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station;

further comprising means for controlling said antenna directivity control means to establish a substantially uniform directivity of said antenna, wherein said incoming direction estimation means derives said estimated direction only while said condition of uniform directivity is established, and wherein said antenna directivity control means comprises means responsive to said control signals from said peak generating means for directly controlling the phase and amplitude of respective transmission signals and received signals of said antenna elements, which are at said transmission frequency.

3. In a mobile communication system having a base station and a plurality of mobile stations, a directivity control antenna apparatus for said base station, comprising a first array antenna having an array of antenna elements, for receiving radio waves from one or more mobile stations which are located within a predetermined service area of the base station, a second array antenna having an array of antenna elements, for transmitting and receiving radio waves for communication with a selected one of said mobile stations, frequency conversion means for converting respective received signals from said antenna elements of said first and second array antennas to corresponding intermediate frequency signals or corresponding baseband frequency signals during a receiving mode of operation of said base station, and for converting a transmission signal at the intermediate frequency or baseband frequency to transmission signals at a transmission frequency, respectively corresponding to said antenna elements of said second array antenna, and supplying said transmission signals to the corresponding antenna elements of said second array antenna during a transmission mode of operation of said base station, incoming direction estimation means for operating on said intermediate frequency signals or baseband signals derived by said frequency converter means from said received signals of the antenna elements of said first array antenna to thereby estimate respective incoming directions of radio waves from said mobile stations which are within the service area, for generating direction data indicative of said estimated directions, and for utilizing said direction data to estimate a total number of said mobile stations which are within said service area, antenna directivity control means for controlling the phase and amplitude of said received signals corresponding to said antenna elements of the second array antenna during said receiving mode and of said transmission signals respectively corresponding to said antenna elements of the second array antenna during said transmission mode such as to determine a directivity of said second array antenna, and peak generating means responsive to said direction data for generating control signals during said transmission mode and said receiving mode, to control said antenna directivity control means such as to form a peak of directivity of the second array antenna, oriented in an estimated direction of said selected mobile station.

4. A directivity control antenna apparatus according to claim 3, further comprising means for judging whether said number of mobile stations obtained as said estimate from said incoming direction estimation means is equal to or greater than the number of elements of said first array antenna, means functioning, when said estimated number of mobile stations is judged to be equal to or greater than said number of elements of the first array antenna, for executing control whereby respective received signals obtained from all said elements of the first array antenna and all said elements of the second array antenna are used in combination by the incoming direction estimation means for estimating the incoming direction of radio waves from mobile stations, and are used to derive a corrected estimated number of said mobile stations which are within the service area of said base station.

5. A directivity control antenna apparatus according to claim 4, further comprising means for judging whether said corrected estimated number of mobile stations within the service area is equal to or greater than the total number of elements of said first array antenna and said second array antenna, means functioning, when said number of mobile stations obtained as said estimate is judged to be equal to or greater than said total number of elements, for controlling said peak generating means to generate said control signals during said receiving mode of the base station such that said antenna directivity control means controls the phase and amplitude of said respective received signals of said antenna elements to produce a single peak of said radiation pattern, and to sweep said peak through an entire range of directivity variation of said first array antenna, and means, functioning during said peak sweeping to successively detect reception of transmitted radio waves from respective mobile stations which are within said service area, to thereby obtain respective detected directions of said mobile stations with respect to said base station;

wherein said base station successively executes communication with each of said mobile stations for which respective directions are thereby detected, during successive intervals in which said peak has been swept to said respective directions.

6. In a mobile communication system having a base station and a plurality of mobile stations, a directivity control antenna apparatus for said base station, comprising a linear array antenna, having elements thereof spaced along an array axis, at least one offset antenna element, having directivity in a direction which is offset from said array axis of said array antenna by a fixed angle, incoming direction estimation means for receiving respective received signals of said offset antenna element and of a set of elements of the array antenna as received signals of a first antenna element set and receiving respective received signals of remaining elements of the array antenna as received signals of a second antenna element set, during a receiving mode of operation of said base station, for combining the received signals of the elements of the first antenna set and combining the received signals of respective elements of the second antenna set to thereby obtain two combined received signals, for obtaining the magnitude of the difference between these combined received signals, for estimating the direction at which a mobile station is located, based on that difference between the magnitudes, and generating direction data indicative of said direction, antenna directivity control means for controlling the phase and amplitude of said received signals corresponding to said antenna elements of the array antenna during said receiving mode and of transmission signals respectively corresponding to said antenna elements during a transmission mode of operation of said base station, such as to determine a directivity of said array antenna, and peak generating means responsive to said direction data for generating control signals during said transmission mode and said receiving mode, to control said antenna directivity control means such as to form a peak of directivity of said array antenna, oriented in said estimated direction.

7. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station, wherein said mobile communication system includes a plurality of base stations and wherein said base stations are connected by communication lines for interchange of data, wherein each of said base stations has a fixed number of communication channels available thereto for communication with mobile stations, wherein each of said base stations further comprises means for deriving respective identification information for mobile stations which are within said service area of the base station, wherein said incoming direction estimation means utilizes said estimated incoming directions of radio waves from mobile stations to estimate a total number of said mobile stations which are currently located within said service area of said base station, wherein said incoming direction estimation means of each base station is further capable of deriving estimated direction data for mobile stations which are located within service areas which are outside said service area of said base station, and wherein each of said base stations further comprises mobile station position estimating means for receiving said direction data from said incoming direction estimation means, and for utilizing said direction data to estimate respective positions of mobile stations and generate position data indicative of said positions, and antenna directivity pattern selection means for receiving said estimated number of mobile stations from said incoming direction estimation means and said position data from said mobile station position estimating means, and for operating on said number of mobile stations and position data by based on said estimated number of mobile stations and allocated number of communication channels, determining a number of communication channels which are currently available to said base station or a number of mobile stations for which no communication channels are available, when it is found that that one or more communication channels are available, receive data from one or more other base stations specifying respective identification information for selected mobile stations which are located within service areas of said other base stations, obtain from said mobile station position estimating means respective position data for said selected mobile stations in addition to position data for the mobile stations which are located within the service area, and generate and supply to said antenna directivity control means control signals for controlling said antenna directivity control means to produce peaks of antenna directivity as required for communication by said base station with said mobile stations which are within the service area and with said selected mobile stations which are located within said service areas of the other base stations, and when it is found from said judgement operation that there is an insufficient number of communication channels available, sending to other base stations identification information for selected mobile stations which are within the service area of said base station.

8. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station, wherein each of said mobile stations further comprises control signal transmitting means, for executing radio transmission using randomly selected frequency channels in randomly determined fixed duration time slots which are selected from a fixed sequence of time slots, said frequency channels being selected from a number N of frequency channels where N is a fixed integer, wherein said incoming direction estimation means of said base station performs said direction estimation based on respective received signals from said antenna elements after conversion to an intermediate frequency by said frequency converter means, and wherein said base station further comprises a set of variable-frequency bandpass filters for respectively transferring said intermediate frequency signals of said antenna elements to said incoming direction estimation means, and means for successively changing a passband of each of said variable-frequency filters in successive ones of N fixed-duration sub-intervals of each of said time slots, to enable said each variable-frequency filter to sequentially pass intermediate frequency values which corresponding to successive ones of said frequency channels, in successive ones of said sub-intervals, in each of said time slots.

9. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station, wherein said incoming direction estimation means estimates said incoming direction of radio waves from said mobile station by utilizing a method that is based upon phase relationships and values of amplitude of said intermediate frequency signals or baseband signals respectively corresponding to individual ones of said antenna elements.

10. A directivity control antenna apparatus according to claim 9, further comprising means for detecting that a signal is being received from a mobile station which is within said service area, and wherein said incoming direction estimation means further comprises means for deriving an estimated number of mobile stations which are currently located within said service area, means for judging whether said estimated number of mobile stations within the service area is equal to or greater than the total number of elements of said array antenna, and means functioning, when said number of mobile stations obtained as said estimate is judged to be equal to or greater than said total number of elements, for controlling said peak generating means to generate said control signals during said receiving mode of the base station such that said antenna directivity control means controls the phase and amplitude of said respective received signals of said antenna elements to produce a single peak of said directivity and to sweep said peak through an entire range of directivity variation of said array antenna;

whereby respective directions of mobile stations within said service area are obtained by said incoming direction estimation means as corresponding directions at which said detection of received signals occur, and wherein said base station successively executes communication with each of said mobile stations for which respective directions are thereby detected, during successive intervals in which said peak has been swept to said respective directions.

11. A directivity control antenna apparatus according to claim 9, wherein said mobile communication system comprises a plurality of base stations having respective service areas and mutually connected by communication lines for interchange of data, and wherein each said base station further comprises:

mobile station position estimation means for receiving from said incoming direction estimation means of said base station said direction for a mobile station and for receiving, from respective incoming direction estimation means of at least two other base stations, direction data for said mobile station with respect to said other base stations, for processing said data to obtain an estimated position of said mobile station and generating position data indicative of said estimated position, and supplying said position data to said peak generating means;

and wherein said peak generating means is responsive to said position data for generating control signals supplied to said antenna directivity control means for controlling said antenna directivity control means such as to determine both the orientation of a peak of said directivity and the shape of said peak, in accordance with said estimated position.

12. A directivity control antenna apparatus according to claim 9, wherein said mobile communication system comprises a plurality of base stations having respective mutually adjacent service areas and mutually connected for exchanging data expressing estimated directions of mobile stations, wherein each said array antenna of a base station is a linear array antenna having elements thereof spaced along an array axis, wherein each said base station further comprises:

mobile station position estimation means for receiving, from said incoming direction estimation means of said base station, first direction data indicative of the estimated incoming direction of radio waves received from a mobile station, for processing said direction data in conjunction with known data expressing a height of said array antenna above ground level to obtain first ground line data expressing a first range of possible positions of said mobile station, and for receiving, from respective incoming direction estimation means of at least two other base stations, second and third direction data indicative of respective incoming directions of radio waves from said mobile station with respect to said other base stations, for processing said second and third direction data to obtain second and third ground line data respectively indicative of a second and third ranges of possible positions of said mobile station, for deriving from said first, second and third ground line data an estimated position of said mobile station and generating position data indicative of said estimated position, and supplying said position data to said peak generating means;

and wherein said peak generating means is responsive to said position data for generating control signals supplied to said antenna directivity control means for controlling said antenna directivity control means such as to determine both the orientation of a peak of the directivity and the shape of said peak, in accordance with said estimated position.

13. A directivity control antenna apparatus according to claim 12, wherein each said linear array antenna is configured to provide azimuth directivity within a range of 180°, and wherein each said range of possible positions of said mobile station is derived as an estimated line of intersection between said ground and one half of a conic surface having said array axis as a central axis thereof, said conic surface having an apex angle which is twice the value of an angle formed between said direction of incoming radio waves from said mobile station and said array axis.

14. A directivity control antenna apparatus according to claim 9, wherein said array antenna is a linear array antenna having elements thereof spaced along an array axis, further comprising electric field strength measurement means for measuring a value of electric field strength of radio waves received from a mobile station, and position estimation means for converting said combined signal strength value to a value of estimated line-of-sight distance of said mobile station from said array antenna, for operating on said estimated distance value in conjunction with a known value of height of said array antenna above ground to obtain ground line data expressing a range of possible positions of said mobile station, for operating on said ground line data in conjunction with said estimated direction data for said mobile station supplied from said incoming direction estimation means, to obtain position data expressing an estimated position of said mobile station with respect to said array antenna, and supplying said position data to said peak generating means;

wherein said peak generating means is responsive to said position data for generating control signals supplied to said antenna directivity control means for controlling said antenna directivity control means such as to determine both the orientation of a peak of said directivity and shape of said peak, in accordance with said estimated position.

15. A directivity control antenna apparatus according to claim 14, wherein each said linear array antenna is configured to provide azimuth directivity within a range of 180°, and wherein each said range of possible positions of said mobile station is derived as an estimated line of intersection between said ground and one half of a conic surface, said conic surface having a central axis along said array axis and having an apex angle which is twice the value of angle formed between said direction of incoming radio waves from said mobile station and said array axis.

16. A directivity control antenna apparatus according to claim 9 wherein each said mobile station comprises displacement vector generating means for deriving a displacement vector expressing a difference between a position of said mobile station at a first time point($t_1$) and a position of said mobile station at a second time point ($t_2$) subsequent to said first time point, and means for transmitting data expressing said displacement vector to said base station by radio; and wherein said wherein said array antenna of said base station is a linear array antenna having elements thereof spaced along an array axis, said base station further comprising mobile station position estimating means operating at said first time point ($t_1$) to operate on said estimated direction data for said mobile station, supplied from said incoming direction estimation means distance detection means, in conjunction with a known value of height of said array antenna above ground level, to derive first ground line data expressing a first range of possible positions of said mobile station, and operating at said second time point ($t_2$) to operate on said estimated direction data for said mobile station and said height value to derive second ground line data expressing a second range of possible positions of said mobile station, for operating on said displacement vector value in conjunction with said first ground line data and second ground line data to estimate the position of said mobile station at said second time point ($t_1$), for generating position data indicative of said estimated position and supplying said position data to said peak generating means;

wherein said peak generating means is responsive to said position data for generating control signals supplied to said antenna directivity control means for controlling said antenna directivity control means such as to determine both the orientation of a peak of said directivity and the shape of said peak, in accordance with said estimated position.

17. A directivity control antenna apparatus according to claim 16, wherein said linear array antenna is configured to provide azimuth directivity within a range of 180°, and wherein each said range of possible positions of said mobile station is derived as an estimated line of intersection between said ground and one half of a conic surface, said conic surface having a central axis along said array axis and an apex angle which is twice the value of an angle formed between said direction of incoming radio waves from said mobile station and said array axis.

18. A directivity control antenna apparatus according to claim 9, wherein said wherein said array antenna of said base station is a linear array antenna having elements thereof spaced along an array axis, further comprising antenna rotation means for rotating said array antenna with said array axis rotating within a horizontal plane, and position estimation means for receiving said direction information, and for operating on at least first direction data from said incoming direction estimation means expressing a first estimated direction, derived when said array axis is at a first angular position, and second direction data expressing a second estimated direction, derived when said array axis has rotated to a second angular position, to estimate the position of said mobile station and generate position data indicative of said estimated position;

wherein said peak generating means is responsive to said position data for generating control signals supplied to said antenna directivity control means for controlling said antenna directivity control means such as to determine both the orientation of a peak of said directivity and the shape of said peak, in accordance with said estimated position.

19. A directivity control antenna apparatus according to claim 18, wherein said linear array antenna is configured to provide azimuth directivity within a range of 180°, and wherein said position estimating means operates on said first direction data in conjunction with a known value of height of said array antenna above ground level to derive a first range of possible positions of said mobile station as a first estimated line of intersection between said ground and one half of a conic surface, said conic surface having a central axis along said array axis and an apex angle which is twice the value of an angle formed between said direction of incoming radio waves from said mobile station and said array axis, operates on said second direction data in conjunction with said height value to derive a second range of possible positions of said mobile station as a second estimated line of intersection between said conic surface and ground, and obtains a point of intersection between said first and second estimated lines of intersection, as said position of said mobile station.

20. A directivity control antenna apparatus according to claim 9, further comprising propagation delay time estimation means for estimating the propagation delay time of radio waves received from a mobile station, electric field strength measurement means for measuring the respective strengths of electric fields of radio waves received as direct waves and radio waves received as reflected waves, from said mobile station, and propagation path equalization means for receiving said incoming direction data from said incoming direction estimation means and an estimated value of propagation delay time from said propagation delay time estimation means, and functioning, when results of estimation of radio wave incoming direction by said incoming direction estimation means indicate that said mobile station is the only mobile station within said service area of said base station, to compensate a signal received from said mobile station for the effects of multi-path propagation signals, based on said estimated radio wave propagation delay time and a ratio of said electric field strengths of said direct waves and reflected waves.

21. A directivity control antenna apparatus according to claim 20, wherein said propagation path equalization means comprises a plurality of delay elements connected in cascade for applying successive increments of delay to said received signal, and means for combining respective output signals of said delay elements in proportions which are determined in accordance with said estimated radio wave propagation delay time and said ratio of electric field strengths of direct waves and reflected waves.

22. A directivity control antenna apparatus according to claim 9, further comprising null point generating means functioning, when respective incoming radio wave directions have been estimated for N mobile stations by the incoming direction estimation means, to establish null points of the directivity of said array antenna, respectively oriented in the directions of (N−1) of the mobile stations, where N is an integer which is greater than one.

23. A directivity control antenna apparatus according to claim 9, wherein said incoming direction estimation means estimates said incoming direction of radio waves from said mobile station by periodically operating on said intermediate frequency signals or baseband signals from said frequency converter means during said receiving mode for a duration of a time interval in which at least a predetermined minimum number of data bits are successively conveyed by said intermediate frequency signals or baseband signals, to estimate said incoming direction of radio waves from said mobile station.

24. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station, wherein, in said transmission mode of operation, said antenna directivity control means controls the phase and amplitude of said transmission signals corresponding to and respectively provided to said respective antenna elements by applying to each individual transmission signal input to said frequency conversion means for output to a respective one of said antenna elements a respective phase relationship and amplitude control value.

25. In a mobile communication system having at least one base station and a plurality of mobile stations, a directivity control antenna apparatus for said base station, comprising:

an array antenna having an array of antenna elements, for transmitting and receiving radio waves to and from a mobile station which is located within a predetermined service area of the base station, frequency conversion means for converting respective received signals from said antenna elements to corresponding intermediate frequency signals or baseband signals during a receiving mode of operation of said base station, and for converting a transmission signal at the intermediate frequency or baseband frequency to transmission signals respectively corresponding to said antenna elements, at a transmission frequency, and supplying said transmission signals to said antenna elements during a transmission mode of operation of said base station, incoming direction estimation means for operating on said intermediate frequency signals or baseband signals from said frequency converter means during said receiving mode to estimate an incoming direction of radio waves from said mobile station, to thereby derive an estimated direction of said mobile station with respect to said base station, and for generating direction data indicative of said estimated direction, antenna directivity control means for controlling the phase and amplitude of said received signals corresponding to said antenna elements during said receiving mode and of said transmission signals respectively corresponding to said antenna elements during said transmission mode such as to determine a directivity of said array antenna, and peak generating means responsive to said direction data for generating control signals during said transmitting mode and said receiving mode to control said antenna directivity control means such as to form a peak of said directivity, oriented in said estimated direction of said mobile station, wherein in said receiving mode of operation, each of said respective antenna elements provides only a single received signal to said frequency conversion circuit, said frequency conversion circuit converting said received signals from each of said respective antenna elements into a plurality of intermediate frequency signals or baseband signals each respectively corresponding to only one of said received signals.

* * * * *